(12) United States Patent
Ryan et al.

(10) Patent No.: US 12,083,561 B2
(45) Date of Patent: Sep. 10, 2024

(54) CORRELATING INFORMATION TO FACILITATE AUTOMATED SORTATION

(71) Applicant: Dexterity, Inc., Redwood City, CA (US)

(72) Inventors: Timothy Ryan, San Francisco, CA (US); David Leo Tondreau, III, San Francisco, CA (US); Erik Trewitt, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

(21) Appl. No.: 18/120,562

(22) Filed: Mar. 13, 2023

(65) Prior Publication Data

US 2023/0286019 A1    Sep. 14, 2023

Related U.S. Application Data

(60) Provisional application No. 63/319,523, filed on Mar. 14, 2022.

(51) Int. Cl.
*B07C 5/36* (2006.01)
*B07C 3/08* (2006.01)
*G06K 7/14* (2006.01)
*G06V 30/10* (2022.01)

(52) U.S. Cl.
CPC .............. *B07C 5/362* (2013.01); *B07C 3/082* (2013.01); *G06K 7/1404* (2013.01); *G06V 30/10* (2022.01)

(58) Field of Classification Search
CPC ........ G06V 30/10; B07C 5/362; B07C 3/082; B07C 2501/0063; B07C 3/02; B07C 5/3412; B07C 5/36; B07C 3/14; G06K 7/1404
See application file for complete search history.

(56) References Cited

U.S. PATENT DOCUMENTS

| 2004/0215480 | A1 | 10/2004 | Kadaba |
| 2006/0113387 | A1 | 6/2006 | Baker |
| 2023/0399136 | A1* | 12/2023 | Budu .................... B25J 9/0084 |

FOREIGN PATENT DOCUMENTS

WO    WO-2011161304 A1 *   12/2011  .............. B25J 13/08

\* cited by examiner

*Primary Examiner* — Jacob S. Scott
*Assistant Examiner* — Miraj T. Patel
(74) *Attorney, Agent, or Firm* — Van Pelt, Yi & James LLP

(57) ABSTRACT

The present application discloses a system, a method, and a computer system for correlating information to facilitate automated sortation. The method includes (i) receiving, by one or more processors, a first optical sensor data comprising a first element of routing data required to route an item but not a second element of routing data required, in addition to the first element, to route the item, (ii) obtaining the second element of routing data from a second optical sensor data, and (iii) causing the item to be routed based at least in part on the first element of routing data and the second element of routing data.

32 Claims, 26 Drawing Sheets

CORRELATING INFORMATION TO FACILITATE AUTOMATED SORTATION

CROSS REFERENCE TO OTHER APPLICATIONS

This application claims priority to U.S. Provisional Patent Application No. 63/319,523 entitled CORRELATING INFORMATION TO FACILITATE AUTOMATED SORTATION filed Mar. 14, 2022 which is incorporated herein by reference for all purposes.

BACKGROUND OF THE INVENTION

Parcel and other distribution centers may receive an arbitrary mix of items of various sizes, dimensions, shape, weight, rigidity, and/or other attributes, often in a cluttered arbitrary mix. Each item may have machine readable information, such as text and/or optically or otherwise encoded information, which can be machine read and used to route the item, e.g., via an automated sorting/routing system and/or processing. To read the information for a given item, in a typical approach the items are separated from one another via a process known as "singulation."

Typically, singulation has been performed manually by human workers. A mix of items arrives at a workstation, e.g., via a chute or other conveyance, and each of a set of one or more human workers manually separates items and places them in a defined space for a single item on a conveyor belt or the like. For each item, its destination (or at least next leg of transport) is determined by machine-reading information on the item, and the item is routed to a destination associated with the next leg, such as a bag, bin, container, or other receptacle and/or a delivery vehicle or staging area associated with the next leg.

Manual singulation processes are labor-intensive and can be inefficient. For example, a downstream human worker may have few locations on which to place singulated items, e.g., as a result of upstream workers filling many of the single item spots. Collective throughput may be suboptimal.

Use of robots to perform singulation is challenging due to the arrival of a cluttered mix of items at a workstation, the dynamic flow of items at each station and overall, and the result that it may be difficult to identify, grasp, separate (singulate) items using a robotic arm and end effector in an automated manner, and to adapt to changing states or conditions with respect to the workstation or the items therein.

BRIEF DESCRIPTION OF THE DRAWINGS

Various embodiments of the invention are disclosed in the following detailed description and the accompanying drawings.

DETAILED DESCRIPTION

Figure 1:
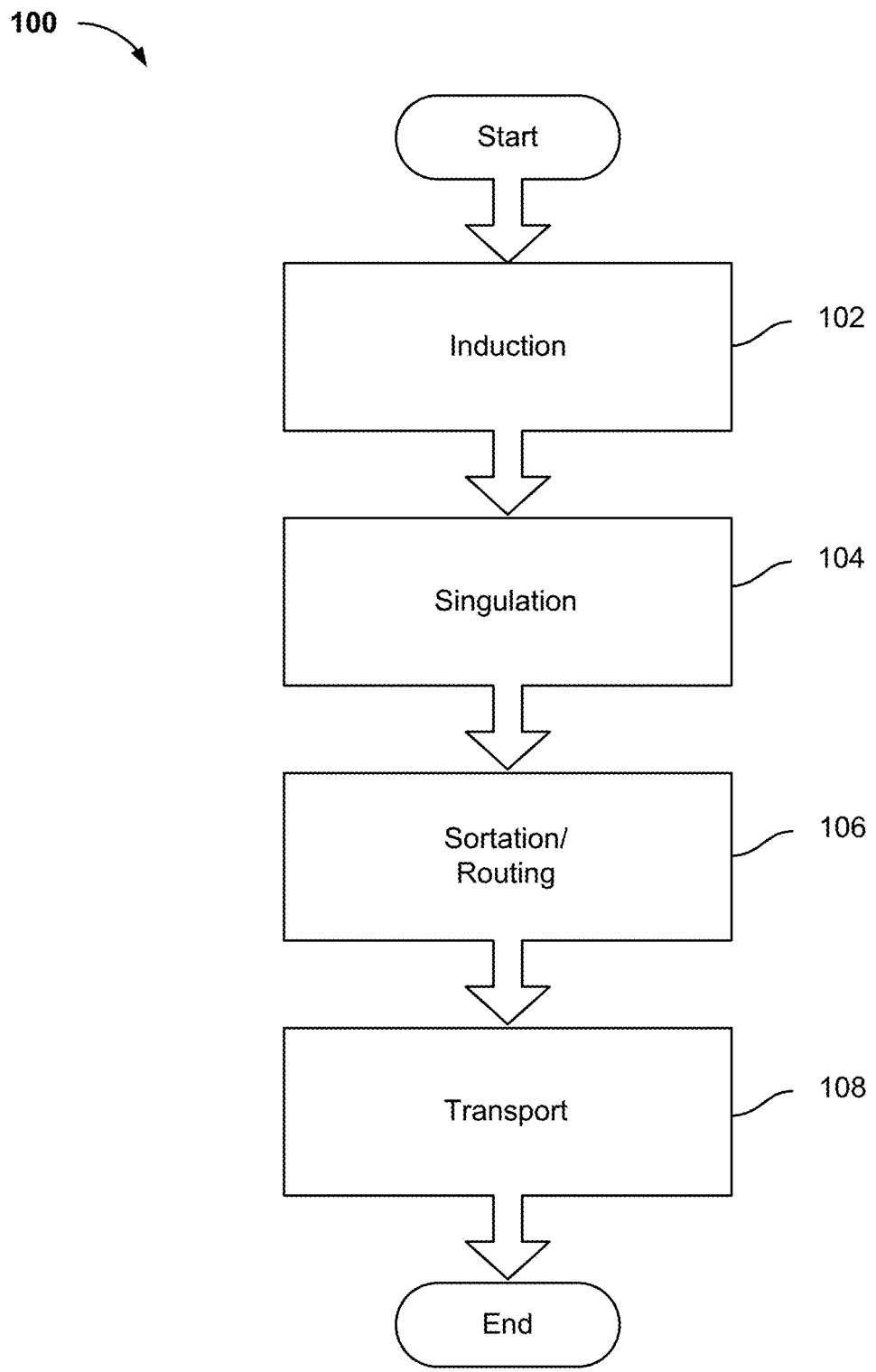
FIG. 1 is a flow diagram illustrating a process to receive, sort, and transport items for distribution and delivery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356 and U.S. patent application Ser. No. 17/202,040, the entireties of which are hereby incorporated herein for all purposes.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure.

An example palletization/depalletization system and/or process for palletizing/de-palletizing a set of items is further described in U.S. patent application Ser. No. 17/343,609 and U.S. patent application Ser. No. 17/837,775, the entireties of which are hereby incorporated herein for all purposes.

As used herein, kitting includes the picking of one or more items/objects from corresponding locations and placing the one or more items in a predetermined location in a manner that a set of the one or more items corresponds to a kit. An example of a kitting system and/or process for kitting a set of items is further described in U.S. patent application Ser. No. 17/219,503, the entirety of which is hereby incorporated herein for all purposes.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of items on the pallet), any combination of the foregoing, and/or a sensor array comprising a plurality of sensors of the foregoing, etc.

Techniques are disclosed to programmatically use a vision system comprising one or more sensors (e.g., camera, infrared sensor, a light sensor, such as a bar-code scanner, etc.) to obtain routing data for items and/or to cause the items to be routed according to the routed data. One or more robotic systems may be controlled in connection with obtaining the routing data or routing the items. In some embodiments, the system captures an image of an item (e.g., a label on the item) and parses the image to determine the routing data. In response to determining that the system obtains only a subset of the routing data (e.g., a required element of the routing data has not been read/determined), the system captures another subset of the routing data based on information captured by another sensor in the workspace or based on a further processing of the image (e.g., the system performs an optical character recognition (OCR) with respect to alphanumeric characters represented in the image), and the system obtains the other subset of routing data based on such further processing.

Various embodiments include a system, method, and/or device for routing items. The system includes a communication interface and one or more processors coupled to the communication interface. The communication interface may be configured to receive information from one or more sensors within a workspace (e.g., a vision system in a workspace of a robotic arm). The one or more processors are configured to: (i) receive via the communication interface a first optical sensor data comprising a first element of routing data required to route an item but not a second element of routing data required, in addition to the first element, to route the item, (ii) obtain the second element of routing data from a second optical sensor data, and (iii) cause the item to be routed based at least in part on the first element of routing data and the second element of routing data.

Related art systems use sensors and computer systems to obtain routing data, such as by capturing information comprised on labels affixed to the items. Information (e.g., the routing data) typically must be determined to enable downstream handling of the item, such as by determining a destination and/or a class of service. In some related art systems, cameras or other optical sensors or scanners are used to read optical codes, such as bar codes and/or QR codes, and/or to read text information, such as by performing OCR to determine information printed in human-readable form (e.g., text and/or numbers) on an item, such as a shipping label affixed to the item. However, optical codes, such as bar codes, may be difficult to read. For example, information on an item may range from easy-to-read data to hard-to-read data. As another example, data comprised on shipping labels range from less information to a lot of information. Related art systems may capture easiest to read information on the shipping label and attempt to determine routing based on such information. For example, the bar code on the shipping label that is easiest to read may be captured. However, some bar codes do not contain sufficient information to sort the item. Accordingly, related art systems send the item to a secondary or manual sortation in response to determining that insufficient information is captured from the shipping label. Related art systems thus can result in loss of a volume of items that can be automatically sorted (e.g., related art systems generally lose several percentage points of total package volume that cannot be automatically sorted), thereby increasing the overall cost of sorting and routing the items.

According to various embodiments, the system implements techniques correlate and combine information from two or more sources to perform automated robotic singulation (e.g., sortation) of an item (e.g., a package or other object).

In various embodiments, if incomplete information is obtained from one source such as a first optical sensor (e.g., due to a partial read of a bar code or other optical code, or because an optical code that does not encode all information needed to sort/route the item), the system (e.g., a robotic singulation system) as disclosed herein obtains and correlates information from additional processing and/or sources (e.g., a second optical sensor) to complete the information. As an example, the first optical sensor is disposed at an induction location at which items are introduced to the robotic singulation system, and the second optical sensor is disposed further downstream in the robotic singulation system, such as downstream a conveyance structure that carries singulated item to a next stage, or mounted to the robotic arm, etc.

A barcode reading system working with a sorter is used to scan the item barcodes (e.g., barcodes included on a label affied to the item), associate the barcode with an identifier (ID) associated with the item, such as associating the barcode with ab ID of the tray or position on the sorter (e.g., a segment of a segmented conveyance structure) where the item is located, and then communicate this paired information to the a control system (e.g., a sorter control system, such as a system that controls operation of the robotic arm).

Advanced barcode scanner systems can decode multiple barcodes in a single image. In various embodiments, if one of the high information barcodes is properly decoded, then a system as disclosed herein simply passes to the sorter system (e.g., the control system) the information pair comprising the item barcode, and ID associated with the item (e.g., an item ID, a tray ID in which the item is located/placed, a segment ID in which the item is located/placed, etc.). However, if only a low information barcode was successfully scanned, the system requests the raw image from the barcode reader and runs the raw image through processing (e.g., OCR processing) to extract a second element of routing data, such as a service class (or other required information), from the image. In some embodiments, the system may use other means (e.g., process a different image of the package from a different time or location), or some other algorithm, based on (for example) package characteristics, to complete the information required for sortation. For example, if the system first obtains only a first element of routing data, such as destination information, the system may extract or generate a second element of routing data, such as the service class (or other required) information from one or more other sources. In response to obtaining the routing data (e.g., the first element of routing data and the second element of routing data), the system provides the routing data to the sorter system. For example, the system stores the first element of routing data and the second element of routing data in a data structure in a manner that associates the first element of routing data and the second element of routing data. In some embodiments, the system communicates the routing data to the sorter system in response to determining that all the required routing data is received (e.g., destination, service class, internal routing identifier such as tray or segment ID in which the item is placed). As an example, the system may provide to the sorter system the routing information, including correlated barcode, service class, and tray ID.

In various embodiments, information from multiple sources is combined to obtain the complete information to sort. The multiple sources may correspond to different fields or markings on a label for the item. For example, if only the "420 code" (e.g., only destination info, such as postal code or zip code) is read, a sortable instruction is created by acquiring the service class information (or other required information) elsewhere and pairing that information with the destination bar code.

In some embodiments, the system determines the service class information from one or more of other locations/areas of the label on the item or other marking on the item. For example, the system obtains the service information from one or more of (i) text associated with a class of service (e.g., "ground", "air", "same day", "next day"), (ii) the 2 digits in the human readable 1Z code, and (iii) partial read of the 1Z bar code.

According to various embodiments, the system uses one or more sensors that capture an image of an item or a robotic arm workspace including the item. For example, many bar code readers use full images to read barcodes on items. In some embodiments, if only the destination barcode is read, the system requests the full image and runs additional analysis to extract the service class (or other required) information.

In some embodiments, service class information (or other required information not captured in the destination barcode) may be obtained from another source. For example, an image captured at a different time or location, possibly by a different camera (e.g., a camera further downstream in the sortation/singulation process).

In some embodiments, a robotic singulation system includes a camera or other scanner mounted on an end effector affixed to a free-moving end of a robotic arm. The arm may be moved, under automated robotic control, to position the end effector mounted camera in a location and orientation to obtain an image usable to read the additional code and/or text. The robotic singulation system may control the robotic arm to re-scan the item until the required information is obtained (e.g., scanned and determined from the image), or until a threshold number of scanning attempts has been performed or threshold period of time has elapsed. For example, the robotic arm may be controlled to change an orientation of the item relative to the scanner with each scanning attempt.

In some embodiments, an algorithm or heuristic may be used to pick the service class. For example, the system determines the service class based on an item attribute (e.g., package dimensions, weight, destination, etc.). The system may use the algorithm or heuristic in response to determining that the service class was not obtained by an image, such as based on a determination that the initial image does not comprise the service class and/or rescanning attempts have failed. The system may store a mapping of heuristics to service classes. In some embodiments, the heuristics are determined based on implementing a machine learning process against a training set of data comprising routing data for items and attributes of the items.

A robotic system to perform singulation is disclosed. In various embodiments, singulation is performed based on data associated with a workspace or an item within the workspace. A plan (e.g., to singulate an item) is determined based at least in part on an attribute of an item in the workspace. The attribute of the item may be determined based at least in part on the sensor data obtained with respect to the workspace. As used herein, a workspace may include a chute or other conveyance structure and/or receptacle on which a source pile/flow of items is disposed, a destination conveyance structure on which an item from the chute is to be singly placed, and a robotic structure that includes a robotic arm that picks one or more items from the chute (or other source) and places the one or more items singly, each in a corresponding location on the destination conveyance structure. The workspace can further include a control computer that obtains sensor data associated with the workspace, and/or an on-demand teleoperation device that a human operator can use to control an element within the workspace such as the robotic arm and/or the conveyance structure. As used herein, the term slot or tray may be used interchangeably in connection with describing a particular location on the conveyor.

A robotic system includes a robotic arm and end effector used to pick items from a source pile/flow and place them on a segmented conveyor or similar conveyance to be sorted and routed for transport to a downstream (e.g., ultimate addressed/physical) destination. In some embodiments, multiple robots are coordinated to implement a desired collective throughput. One or more robots may be employed at a singulation station. For example, a robotic system includes multiple stations. As an example, each station corresponds to a distinct workspace (e.g., a distinct chute comprising the source pile/flow). Human workers may be employed at one or more stations. The robotic system is configured to invoke (request) the assistance of a human worker, e.g., by teleoperation of a robotic arm, manual task completion, etc., for example to handle an item the robot cannot handle by fully automated processing and/or an item the robot has dropped, etc. In some embodiments, a plurality of robotic arms operating at the same workspace work independently to singulate the plurality of items. In connection with the singulation of an item, a plan or strategy can be determined for singulating the item from the source pile/flow at which the item is located to a corresponding location on the conveyor. The corresponding location on the conveyor can be a particular slot or tray on the conveyor. In some embodiments, a slot or tray on the conveyor is associated with an identifier (e.g., a unique identifier with respect to the conveyor within the robotic system), such as a tray ID. As an example, the system stores an association between information pertaining to an item (e.g., item identifier, item attribute(s), routing data) and the tray ID.

According to various embodiments, the plan or strategy includes an indication of an item (e.g., from the source pile/flow) to be singulated, a location on the conveyor at which the item is to be singly placed, and a path or trajectory along which the item is to be moved from the source pile/flow to the location on the conveyor. The plan or strategy includes information pertaining to the location on the conveyor at which the item is to be singly placed, such as an identifier of a slot or tray on the conveyor in which the item is to be placed (e.g., the trad ID). In some embodiments the plan or strategy includes instructions that the robotic system that is to singulate the item uses in order to singulate the item. As an example, the instructions provide an indication of the manner according to which the robotic structure is to control the corresponding robotic arm to pick the item from the chute (or other pick up zone), to move the item along the path or trajectory, and to place the item at the determined location on the conveyor.

The path or trajectory along which an item is to be singulated is determined according to various embodiments based at least in part on sensor data. The robotic system may obtain a plurality of sensors that output information pertaining to the workspace, including the items or objects within the workspace. The sensor data is obtained based on the information output from one or more sensors and used in connection with determining the path or trajectory. In some embodiments, the path or trajectory is determined based at least in part on one attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item, etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc.

According to various embodiments, a set of paths or trajectories for singulating an item is determined, and the path or trajectory along which the item is to be singulated is selected from the set of paths or trajectories. The path or trajectory can be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

According to various embodiments, a robotic singulation system performs an active measure in order to improve the singulation of an item (e.g., to successfully pick the item from a source pile/flow and place the item on the conveyor). The robotic system dynamically updates the path or trajectory of the item during singulation based on a context of the workspace (e.g., a state or condition of the item, a property of the item, another item within the workspace, etc.). For example, in response to determining that a detected state or condition impedes implementation of a current plan to autonomously operate the robotic structure to pick one or more items from the workspace and place each item singly in a corresponding location in a singulation conveyance structure, the robotic structure performs one or more active measures to improve the likelihood of successful singulation (e.g., the robotic structure can determine an active measure that is expected to improve the likelihood of successful singulation based at least in part on the detected state or condition).

In some embodiments, the active measure includes using a robotic arm, an end effector of the robotic arm, a movement of a chute or other element of the workspace, or an air blower to reconfigure the source pile/flow or to reconfigure one or more items or debris on the workspace. The active measure can be performed to improve a scanning of a label or identifier on an item to be singulated, to improve the likelihood that an item can be picked up, to improve the grip on an item being singulated, to improve the release of an item from the robotic arm, or to improve operation of two robotic arms that are independently singulating items from the same workspace (e.g., the same source pile/flow).

Parcel carriers, postal services, delivery services, large retailers or distributors, and other enterprise and government entities that handle, transport, and deliver items to and from diverse locations typically receive large quantities of items from various source locations, each to be delivered to a corresponding one of a variety of destination locations.

In a typical manual induction/sortation process, manually (or machine) fed chutes via which parcels of a variety of shapes and sizes arrive in bulk in various orientations; parcels may have different dimensions, shapes, rigidity, packaging, etc.; typically human workers take packages from a chute feeding a station at which each works and places them one by one on an open partitioned or otherwise defined segment of a conveyor; finally, many workers each at a station populate locations on one or more conveyors with singulated parcels, to facilitate downstream machine processing, such as reading the code or tag and taking automated sorting action based thereon, such as routing each parcel to a location within the facility that is associated with a destination to which the parcel is to be delivered. The location may involve further sorting (e.g., more destination-specific location within the facility) and/or packing/loading the parcel for further shipment (e.g., truck or aircraft to further destination where further sorting and delivery will occur, loading on a truck for local delivery, etc.).

FIG. 1 is a flow diagram illustrating a process to receive, sort, and transport items for distribution and delivery. In the example shown, process 100 begins with an induction process 102 by which items are provided to one or more workstations for singulation via singulation process 104. In various embodiments, the singulation process 104 is at least partly automated by a robotic singulation system as disclosed herein. The singulation process 104 receives piles or flows of dissimilar items via induction process 102 and provides a stream of singulated items to a sortation/routing process 106. For example, the singulation process 104 may place items one by one on a segmented conveyor or other structure that feeds items one by one into a sortation/routing machine. In some embodiments, items are placed with an orientation such that a label or tag is able to be read by a downstream reader configured to read routing (e.g., destination address, service class, etc.) information and use the routing information to sort the item to a corresponding destination, such as a pile, bin, or other set of items destined for the same next intermediate and/or final destination. Once sorted, groups of items heading to a common next/final destination are processed by a transport process 108. For example, items may be placed in containers, loaded into delivery or transport trucks or other vehicles, etc., for delivery to the next/final destination.

A robotic system configured to determine a plan that takes into consideration an attribute of the item to be singulated and/or an attribute of another item within the workspace (e.g., an item on the conveyor) is disclosed. The related process 100 of FIG. 1 further fails to disclose that the attribute of the item to be singulated and/or the attribute of the item within the workspace is determined based at least in part on sensor data. In various embodiments, a plan for singulating an item is determined (and implemented) to avoid collisions between the item being singulated and another item in the workspace and/or an object in the workspace. The plan may be determined based on a determination of an expected collision and an active measure that is to be implemented to avoid the expected collision. Various embodiments determine a plan to facilitate improvement in the efficiency of paths or trajectories in connection with singulating an item and/or to improve the effectiveness of the singulation of items (e.g., the items may not be properly placed on the conveyor, a label may not be read by a sensor in the system in connection with singulating the item, etc.). According to various embodiments, singulation of items from a source pile/flow is improved through the use of a dynamic singulation method or system that determines a path or trajectory for singulation of an item using one or more of an attribute of the item to be singulated and an attribute of another item within the workspace (e.g., an item on the conveyor). The dynamic singulation method or system can include an updating of the path or trajectory for singulation of an item in response to detecting one or more of an attribute of the item to be singulated and an attribute of another item within the workspace (e.g., an item on the conveyor).

Figure 2A:
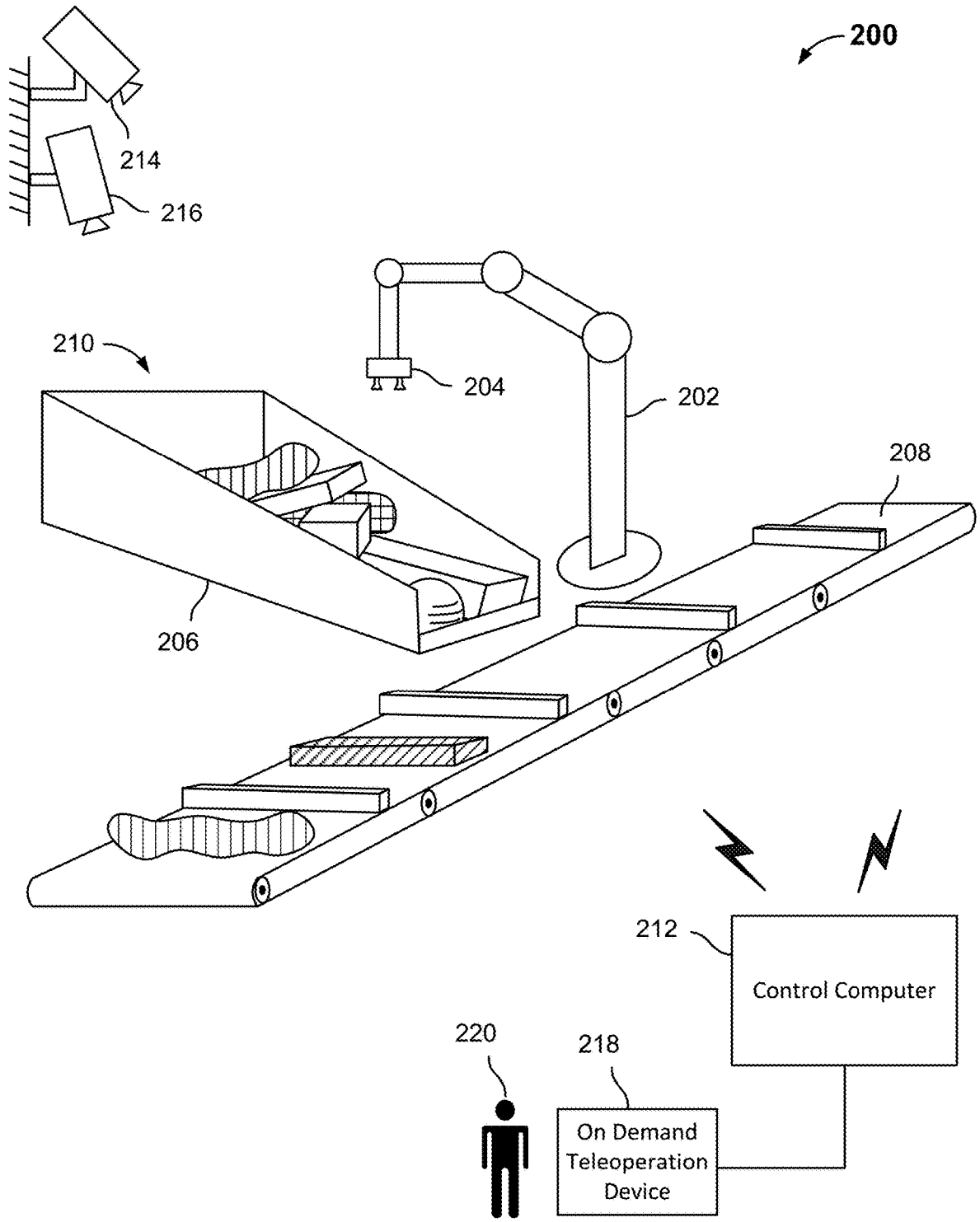
FIG. 2A is a diagram illustrating a robotic singulation system according to various embodiments.

FIG. 2A is a diagram illustrating a robotic singulation system according to various embodiments. In the example shown, system 200 includes a robotic arm 202 equipped with a suction-based end effector 204. While in the example shown the end effector 204 is a suction-based end effector, in various embodiments, one or more other types of end effectors may be used in a singulation system as disclosed herein, including without limitation a pinch-based end effector or other types of actuated grippers. In some embodiments, end effector 204 comprises one or more suction-based ends (e.g., one or more suction cups). As an example, end effector 204 is actuated by one or more of suction, air pressure, pneumatics, hydraulics, or another actuation. Robotic arm 202 and end effector 204 are configured to be used to retrieve items (e.g., parcels or other objects) that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206.

In the example shown, one or more of robotic arm 202, end effector 204, and conveyor 208 are operated in coordination by control computer 212. In some implementations, control computer 212 is configured to control a plurality of robotic arms operating at one or more workstations. In various embodiments, a robotic singulation as disclosed herein may include one or more sensors from which an environment of the workspace is modeled. In the example shown in FIG. 2A, system 200 includes a vision system that includes image sensors, including in this example 3D cameras 214 and 216. Various other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like.

In various embodiments, control computer 212 includes a workspace environment state system such as a vision system used to discern individual items, debris on the workspace, and each item's orientation based on sensor data such as image data provided by image sensors, including in this example 3D cameras 214 and 216. The workspace environment state system in some embodiments includes sensors in the robotic arm to detect a weight of an item (e.g., a grasped item) or to detect information from which an estimated weight is determined. For example, information pertaining to an amount of current, voltage, and/or power used by one or more motors driving movement of the robotic arm is used to determine the weight (or an estimated weight) of the item. As another example, the chute includes a weight sensor, and the weight of the item is determined based on a difference of the weight on the chute as measured by the weight sensor before the item is picked up and after the item is picked up. As another example, information pertaining to an output from one or more sensor arrays is used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays). As another example, information pertaining to an output from one or more sensor arrays is used to determine a dimension or size of an item to be singulated and/or another item or object within the workspace. As another example, information pertaining to an output from one or more sensor arrays is used to determine routing data for the item, such as a destination, a service class, etc.

In some embodiments, the vision system comprises sensors that are disposed at different locations within the workspace. For example, the vision system comprises a camera at an induction location or chute to which items are input to the system and from which items are picked by robotic arm 202. As another example, the vision system comprises one or more sensors mounted to robotic arm 202, such as a sensor mounted to end effector 204. As another example, the vision system comprises one or more sensors disposed in proximity to conveyor 208 (e.g., the sensor may be configured to capture information pertaining to items being carried by conveyor 208, such as an image of an item or a label on the item).

The workspace environment state system produces output used by the robotic system to determine and implement a plan to autonomously operate a robotic structure to pick one or more items from the workspace and place each in a corresponding available defined location for machine identification and sorting, such as a partitioned section of segmented conveyor 208. In some embodiments, the workspace environment state system produces an output (e.g., sensor data or information otherwise characterizing the workspace and/or items within the workspace) used by the robotic system to detect a state, condition, and/or attribute associated with one or more items in the workspace, a state or condition associated with the robotic arm or other element of the workspace, and/or routing data for the item (e.g., a first element of routing data, such as a destination, and a second element of routing data, such as service class). According to various embodiments, in response to detecting (e.g., determining) the state, condition, and/or attribute or routing data associated with one or more items in the workspace, the robotic system implements one or more active measures in connection with singulating an item. As an example, the active measure includes updating the plan to autonomously operate a robotic structure to pick one or more items from the workspace and place each item singly in a corresponding location in a singulation conveyance structure. As another example, the active measure or the updating the plan includes operating the robotic structure to change or adapt to the detected state, condition, and/or attribute (e.g., implement a change or manner by which an item is singulated, change a path or trajectory along which the item is singulated, change a manner by which the item is grasped, change a location on the item at which the item is grasped, etc.).

In some embodiments, the active measure includes rescanning the item or otherwise moving or orienting the item in a manner that a sensor in the vision system captures the routing data for the item (e.g., capture an image of a label or other marking on the item). For example, in response to determining that the routing data was not captured by a sensor while the item was in chute 206 or picked up by robotic arm 202, system 200 (e.g., control computer 212) determines to rescan the item using the same sensor or another sensor in the workspace (e.g., a sensor mounted on robotic arm 202, or directed to capture information pertaining to conveyor 208, etc.). In connection with rescanning the item, control computer 212 controls the sensor to capture additional information (e.g., another image) and/or robotic arm 202 to move the item to be rescanned while in a different orientation. For example, robotic arm 202 may be controlled to move the item within proximity of the sensor (e.g., in the case of a barcode reader, to move the object over the range/area within which barcode reader is configured to read barcodes).

System 200 determines to rescan the item or further process the information initially captured by the vision system based at least in part on determining that the routing data was not successfully obtained or that all required information for the routing data has not been obtained. In some embodiments, the routing data includes destination information (e.g., a destination to which the item is to be delivered), service class information (e.g., an indication of a type of service according to which the item is to be delivered, such as ground, air, next day, etc.). As an example, if the routing data comprises two required pieces of information, such as destination information and service class information, and system 200 determines that one of the pieces of information is not successfully obtained (e.g., a first element of routing data is obtained but a second element of routing data is missing/not obtained), then system 200 determines to rescan the item or otherwise process the captured information (e.g., perform an OCR with respect to an image of the label).

In response to obtaining the required routing data (e.g., the first element of routing data and the second element of routing data), system 200 stores the routing data in association with the item. For example, the first element of routing data and the second element of routing data are correlated and stored in a data structure that is queried when determining how to route the item. In some embodiments, system 200 further associates the routing data for an item with a location within the workspace, such as a tray ID or an identifier associated with a particular segment of conveyor 208 on which the item was placed.

In various embodiments, a robotic system as disclosed herein includes and/or does one or more of the following, e.g., by operation of a control computer such as control computer 212:

Computer vision information is generated by merging data from multiple sensors, including one or more of 2D cameras, 3D (e.g., RGBD) cameras, infrared, and other sensors to generate a three-dimensional view of a workspace that includes one or more sorting stations. The robotic system determines characteristics of items and/or debris or other abnormalities in the three-dimensional view of the workspace.

Robotic system coordinates operation of multiple robots to avoid collisions, getting in each other's way, and contending to pick up the same item and/or place an item in the same destination location (e.g., segmented part of the conveyor) as another robot. The robotic system coordinates operation of a plurality of robots operating within a same workspace to singulate a plurality of items. For example, in various embodiments, the plurality of robots operate independently to pick and place items. If a risk of collision is detected, responsive action is taken to ensure the plurality of robots do not collide with one another during singulation.

Robotic system coordinates operation of multiple robots to ensure all items are placed and only one per slot/location/tray. For example, if robot A drops an item, the system tasks robot B to pick it up; item placed but with improper orientation is picked up and adjusted or moved to another location by the same or another robot; two or more items in a single destination slot result in the robot downstream station picking one of the two or more items off the conveyor and placing the item in a new location; etc.

Robotic system continuously updates motion planning for each robot and all of the robots together to achieve a desired collective throughput (e.g., to maximize collective throughput, to attain a predefined threshold of collective throughput, etc.). In response to determining that two or more robots have collided or will collide if moving according to their respective plans for singulation of items, the robotic system implements an active measure to ensure that the two or more robots avoid collision or otherwise reset independent operation of the two or more robots.

In response to a determination that two robots independently are tasked to acquire the same item, the system picks one at random to get that item and the other moves on to the next item (e.g., identify, select, determine grasp strategy, pick, move according to plan, and place).

The robotic system may manage the independent operation of a plurality of robots to ensure that the robots select items at different times to avoid the same item being selected for singulation by two different robots.

The robotic system may analyze all possible robotic arm-objects combinations and attempts to find a suitable pair. If no pair is found, then the best item for a particular robot (e.g., the primary robot) is selected as the item to be singulated by the particular robot. If there is no item for the particular robot (e.g., the particular robot) we default to an item for the secondary bot.

Conveyor movement and/or speed is controlled as needed to avoid empty locations and achieve a desired robot productivity (throughput)

In response to a determination that an item is misplaced or dropped, the system assigns a robot or, if needed, a human worker to pick it up and place it back in the retrieving robot's own source pile or, if available or more optimal, on a next open slot on the conveyor.

Upstream robots are controlled to intentionally leave some slots open for downstream robots to place items on the conveyor.

Downstream robots are controlled to correct errors from an upstream robot placing an item on the conveyor (e.g., to correct the placement of an item that rests in more than one slot/tray, to update a data structure with an association between an identifier for the item with the slot in which the upstream robot placed the item, etc.).

Failure that cannot be corrected by the same or another robot results in an alert to obtain human (or other robotic) intervention to resolve.

In response to a determination that a grip strength (e.g., a pressure attained by the end effector) is abnormal (e.g., less than is expected during normal operation), perform a diagnostic process that includes testing the grip strength on a predefined surface and in connection with determining whether remedial action is necessary with respect to the end effector.

Move/remove the debris within the workspace, or reconfigure an item to be singulated (e.g., to improve the likelihood that the item is successfully picked from the source pile/flow and placed on the conveyance structure).

Control a chute conveyor to reconfigure items within the workspace (e.g., to bring an item selected for singulation closer to a front of the chute for quicker and easier access by the robotic arm, to reposition one or more items to improve the ability of a robotic arm to grasp an item, etc.).

Use sensor data from workspace environment state system (e.g., from one or more sensors within the workspace) to model chute flow (or model the workspace environment), detect a deviation from an expected chute flow (or from an expected workspace environment), use the sensor data to detect a clog or abnormality within the chute flow or workspace environment, and to implement an active measure to clear the clog.

Use sensor data from the workspace environment state system to detect one or more characteristics (e.g., attributes) of the item selected for singulation, determine that grasping or releasing of the item is expected to improve in response to implementation of an active measure, and implement the active measure to improve the grasping or releasing of the item.

Use sensor data to determine that the robotic arm has grasped a plurality of items in connection with singulation of one of the items, and determine a plan for releasing the plurality of items in order to place each item singly in a corresponding location in a singulation conveyance structure (e.g., selecting different locations in the singulation conveyance structure at which the corresponding items are to be placed, and/or determine a strategy for operating the end effector to release a first subset of the plurality of items at a different time from a second subset of the plurality of items).

Select a slot on the conveyance structure in which to place a selected item based on a size of the selected item and/or one or more characteristics of an item within a slot on the conveyance structure. For example, a slot is chosen to ensure that the selected item is not placed in a slot that is adjacent to a slot comprising a tall or large item.

Select a path for singulating an item on the conveyance structure based on an attribute of the item (e.g., a size of the selected item, a weight of the item, etc.) and/or one or more attributes (e.g., characteristics) of an item within a slot on the conveyance structure. For example, a path is determined to place the item in a slot that is adjacent to a slot comprising a tall or large item.

Determine a movement and speed of the robotic arm that singulates an item based at least in part on a speed of a conveyor belt.

Determine a trajectory of the item to be singulated based at least in part on one or more of a characteristic of the item, a characteristic of the workspace environment, and/or a characteristic of the conveyance structure (e.g., a speed of the conveyor belt).

Determine a probability of successful singulation corresponding to one or more paths/trajectories of an item to be singulated, and select a path/trajectory along which the item is to be singulated based on the corresponding probability of success.

Determine a positioning of a robot arm and/or an end effector of the robot arm to obtain a successful grasp (e.g., as determined based on a probability of grasp success, a type of packaging of the item, a dimension of the item, an expected grip strength in relation to a threshold value, etc.). The positioning of the end effector can include controlling the robot arm or a wrist of the robot arm to move in order for the end effector to be orthogonal to a surface of the item.

Update the ability of the robotic system to detect an empty slot or tray. For example, the definition of an empty slot/tray used by the robotic system to identify an empty slot/tray is updated over time.

Determine a manner by which the system captures routing data, such as rescanning an item or reprocessing information captured by a vision system (e.g., performing OCR with respect to an image of the item or label on the item).

Correlating elements of the routing data and storing the elements of routing data in association with the item, or a segment/slot/tray/location at which the item is placed.

In various embodiments, an arbitrary mix of items to be singulated may include items (e.g., parcels, packages, and/or letters) of a variety of shapes and sizes. Some items may be standard packages, one or more attributes of which may be known, others may be unknown. Sensor data such as image data is used, in various embodiments, to discern individual items (e.g., via image segmentation). The boundaries of partially occluded items may be estimated, e.g., by recognizing an item as a standard or known type and/or extending visible item boundaries to logical estimated extents (e.g., two edges extrapolated to meet at an occluded corner). In some embodiments, a degree of overlap (i.e., occlusion by other items) is estimated for each item, and the degree of overlap is taken into consideration in selecting a next item to attempt to grasp. For example, for each item a score is computed to estimate the probability of grasp success, and in some embodiments the score is determined at least in part by the degree of overlap/occlusion by other items. Less occluded items may be more likely to be selected, for example, other considerations being equal.

According to various embodiments, in some embodiments, system 200 selects and item and/or determines a strategy for grasping the item based on one or more item attributes.

If a source pile/flow has an arbitrary mix of items to be singulated, the source pile/flow generally includes items that have different types of packaging, such as a cardboard box packaging, a paper envelope packaging, a polybag packaging (e.g., polyethylene bags), etc. System 200 (e.g., control computer 212) determines the packaging of an item based on vision data obtained from the sensors, or based on a pressure attained between the end effector and the item when the robotic arm attempts to pick up the item. The sensor data can be used to discern a type of packaging corresponding to a particular item in the source pile/flow. In some embodiments, the robotic system determines a strategy for grasping the item based at least in part on the type of packaging corresponding to the item. For example, relatively heavier items packaged in a polybag will generally experience "tenting" between end effector suction cups. Tenting can cause sub-optimal suction from the end effector of the robotic arm, and thus the grasping of such an item is sub-optimal.

In response to determining that the item is relatively heavy (e.g., that the weight exceeds a predefined threshold) and that the item is packaged in a poly-bag, or in response to determining that tenting is being caused while grasping the item, the system 200 (e.g., robotic arm 202) performs an active measure to change or adapt to the "tenting" or to the determination of the type the packaging of the item. As an example, system 200 (e.g., robotic arm 202) performs an active measure to partially lift the package and drag the package from the chute to the corresponding slot in the conveyance structure.

System 200 (e.g., control computer 212) determines a path or trajectory (or a trajectory of the robotic arm/end effector in approaching the item for grasp) based at least in part on a type of packaging of the item in order to avoid tenting or to otherwise improve a grasping of the item. As an example, the robotic arm (e.g., a wrist) and/or the end effector is controlled to be orthogonal to a surface of the item from which the item is grasped. As another example, the path or trajectory of the robotic arm and/or end effector can be determined to knock an item over or otherwise reposition the item before grasping the item.

In various embodiments, multiple 3D and/or other cameras are used to generate image data. A 3D view of the scene may be generated, and/or in some embodiments a combination of cameras is used to look at the scene from different angles and the camera that is least occluded, e.g., with respect to a workspace and/or one or more specific items in the workspace, is selected and used in connection with the grasping and moving of the one or more items. The image data can be used to detect debris on the chute or within the workspace, a clog in the chute flow of items through the workspace, a number of items grasped by the robotic structure during singulation of a selected item, an attribute(s) of one or more items occupying slots on the conveyance structure or disposed in the chute or other pick up zone, etc. In some embodiments, the image data is used to determine a characteristic (e.g., an attribute) of one or more items in the workspace. As an example, the image data is used in connection with determining (e.g., estimating) a height or dimension of an item. As another example, the image data is used to obtain one or more elements of routing data, such as information pertaining to a destination, a service class, a sender, a recipient, an item/package identifier, etc.

The multiple cameras serve many purposes, in various embodiments. First they provide a richer full 3D view into the scene. Next they operate in cohesion to minimize the errors due to package shininess when light reflecting off a package and into a camera may disrupt its operation; in this case another camera at a different location provides a backup. In some embodiments, various cameras are selectively triggered by a predictive vision algorithm that determines which camera has the best viewing angle and/or lowest error rate for picking a particular package; as such each package has the optimal camera looking at it. In some embodiments, one or more cameras are mounted on an actuated base, of which the system can change the position and orientation to provide a more optimal perception (e.g., view) of a package. In some embodiments, one or more cameras are mounted on the robotic structure (e.g., on robotic arm 202 or on end effector 204 of robotic arm 202, etc.).

Another purpose served by cameras is, in various embodiments, to detect any sort of unforeseen error in robot operation or any disruption to the environment. Cameras placed on the robot (e.g., robotic arm 202) and on the environment have different error and accuracy profiles. Because cameras on the robot rigidly fixed to the robot, such cameras o can be more accurate but slower to use because use of such cameras requires the robot to slow down or stall. Cameras in the environment (e.g., the workspace of the robot) have a stable view and are effectively faster because the robot can multi-task and do something else while a camera is taking a photo. But if someone moves or shakes the camera stand, the cameras may become out of sync with the robot and cause errors. In various embodiments, images from robot and non-robot cameras are combined (e.g., occasionally or on a package miss) to detect if the robot is in sync with non-robot cameras. If the cameras are determined to be out of sync, the robot takes corrective action, such as performing a calibration or synchronization process, alerting a human operator, etc. In some embodiments, a camera may not be mounted rigidly on a robotic arm, and in some such embodiments gyros and/or accelerometers on the cameras may be used to filter or compensate for the motion of the mounting base.

According to various embodiments, system 200 may include one or more sensors other than or in addition to a plurality of cameras, such as one or more of an infrared sensor array, a laser array, a scale, a gyroscope, a current sensor, a voltage sensor, a power sensor, and the like. Information received from the various other sensors is used in determining one or more attributes of the item to be singulated and/or attributes of another item or object within the workspace, etc.

Referring to FIG. 2A, in various embodiments, robotic arm 202 is to be driven by one or more motors, e.g., one or more motors at each movable joint or mount location. In some embodiments, the work required to drive robotic arm 202 (e.g., to move the robotic arm as the robotic arm attempts to singulate an item) is indicative of one or more characteristics of the item to be singulated. For example, a weight of the item is computed (or estimated) based on the work required to drive the robotic arm 202 while the item is in its grasp. The work required to drive the robotic arm 202 may be measured using a current sensor, a voltage sensor, a power sensor, and/or the like, or some combination thereof. In response to determining the weight of the item during singulation, system 200 determines a path/trajectory of an item to be singulated based at least in part on the weight of the item. System 200 may perform an active measure to adapt to the weight of the item such as, for example, updating the path or trajectory in response to determining the weight of the item. As an example, in response to determining that the weight of the item is greater than a predefined threshold, system 200 adjusts the plan to singulate the item via partially picking up the item and dragging the item to the corresponding location on the conveyance structure (e.g., in contrast to wholly picking up the item and moving the arm to place the item on the conveyance structure). As another example, in response to determining the weight of the item, system 200 adjusts the speed at which the robotic arm (and the item) is moved. The larger the weight of the item, the greater the shear forces are between the item and end effector 204 as robotic arm 202 is moved. Further, the shear forces can increase as the speed at which robotic arm 202 is operated increases (e.g., the speed at which the robotic arm moves the item). Accordingly, system 200 can control the speed of robotic arm 202 based at least in part on the weight of the item to ensure that the item remains firmly grasped by robotic arm 202. Although the description hereof describes the weight being measured based on using a current sensor, a voltage sensor, a power sensor, and/or the like, the weight can also be measured using a force sensor configured in the robotic arm 202 or the end effector 204. However, force sensors are relatively expensive and thus low-level hardware information, such as motor torque or a measure of the work used by the motor is an effective manner by which to determine (e.g., estimate) the weight of the item.

In various embodiments, output from one or more sensor arrays is used to determine locations of objects/items within the workspace (e.g., packages, surfaces, conveyors, robotic arms, etc.) and one or more attributes for the objects/items. Information pertaining to an output from one or more sensor arrays can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

Information pertaining to an output from one or more sensor arrays can be used to determine an attribute of an item to be singulated and/or another item or object within the workspace. The attribute of an item may include routing data, dimensional data, weight data (or estimated weight data), packaging data, deformability data, fragility data, etc. As an example, information received from the one or more sensor arrays may be used in connection with determining a height of the item to be singulated and/or another item or other object within the workspace. In some embodiments, system 200 determines a path or trajectory (or updates the path or trajectory) based at least in part on height of the item to be singulated and/or another item or other object within the workspace. For example, the robotic system determines a location on the conveyor at which the item is to be placed based at least in part on a height (or other dimension) of one or more other items on the conveyor. Planning to place an item in a slot/tray adjacent to another slot/tray comprising a relatively large (e.g., tall, wide, etc.) item can increase the likelihood of a collision during singulation. In addition, a relatively large item on the conveyor can impede the ability of the robotic system to obtain information for adjacent items. The line of sight of the vision system may be blocked by a relatively large item and thus the sensor data may not include accurate information for adjacent items (or other items within close proximity to the large item). As another example, if the item includes an identifier or label on a side facing a relatively large item, or on a surface close to the large item, the vision system may be unable to locate or read the identifier or label.

Referring further to FIG. 2A, in the example shown, system 200 further includes an on-demand teleoperation device 218 usable by a human operator 220 to operate one or more of robotic arm 202, end effector 204, and conveyor 208 by teleoperation. In some embodiments, control computer 212 is configured to attempt to grasp and place items in a fully automated mode. However, if after attempting to operate in fully automated mode control computer 212 determines it has no (further) strategies available to grasp one or more items, in various embodiments, control computer 212 sends an alert to obtain assistance from a human operator via teleoperation, e.g., by human operator 220 using teleoperation device 218. For example, in some embodiments, in response to detecting a state or condition affecting item flow through chute 206, control computer 212 may attempt to perform one or more actions to facilitate singulation. If fully automated attempts to respond to the detected state or condition are determined not to have resolved the state or condition, control computer 212 may prompt human operator 220 to address the state or condition, e.g., via teleoperation using on-demand teleoperation device 218. In various embodiments, control computer 212 may display a user interface or other interface that identifies the state or condition and/or presents human selectable options to control the robotic arm 202, end effector 204, and/or other elements and instrumentalities as disclosed herein (e.g., blowers, shakers, chute conveyors, etc.) to alter the state or condition.

In various embodiments, control computer 212 uses image data from cameras such as cameras 214 and 216 to provide a visual display of the scene to human operator 220 to facilitate teleoperation. For example, control computer 212 may display a view of the pile of items in chute 206. In some embodiments, segmentation processing is performed by control computer 212 on image data generated by cameras 214 and 216 to discern item/object boundaries. Masking techniques may be used to highlight individual items, e.g., using different colors. Human operator 220 may use the visual display of the scene to identify the item(s) to be grasped and use teleoperation device 218 to control the robotic arm 202 and end effector 204 to pick the item(s) from chute 206 and place each in a corresponding location on conveyor 208. In various embodiments, once the item(s) for which human intervention was prompted have been placed on the conveyor, system 200 resumes fully automated operation. In various embodiments, in the event of human intervention, system 200 observes the human worker (e.g., manual task completion, task completion using a robotic arm and end effector via teleoperation) and attempts to learn a strategy to (better) complete the task in an autonomous mode in the future.

In some embodiments, system 200 invokes assistance from human operator 220 in response to determining that an abnormality in the operation of system 200 exists. An example of an abnormality is a lack of a threshold pressure being attained between end effector 204 and the item during singulation of the item. In response to detecting that the pressure attained between end effector 204 and the item is less than a threshold pressure value, robot system 200 can perform a diagnostics process in connection with assessing whether robot system 200 is performing normally. For example, system 200 can perform a diagnostic of the ability of end effector 204 to engage an item and attain a predetermined threshold pressure value. In response to determining that system 200 is not performing normally (e.g., that the end effector 204 is not able to engage an item and attain a predetermined threshold pressure value), system 200 invokes assistance from human operator 220. In some embodiments, control computer 212 sends an alert to human operator 220. The alert can indicate the basis of the problem (e.g., an indication that the end effector is unable to engage the item and attain a predetermined threshold pressure value). For example, the alert can provide a recommended or requested remedial action to human operator 220.

Figure 2B:
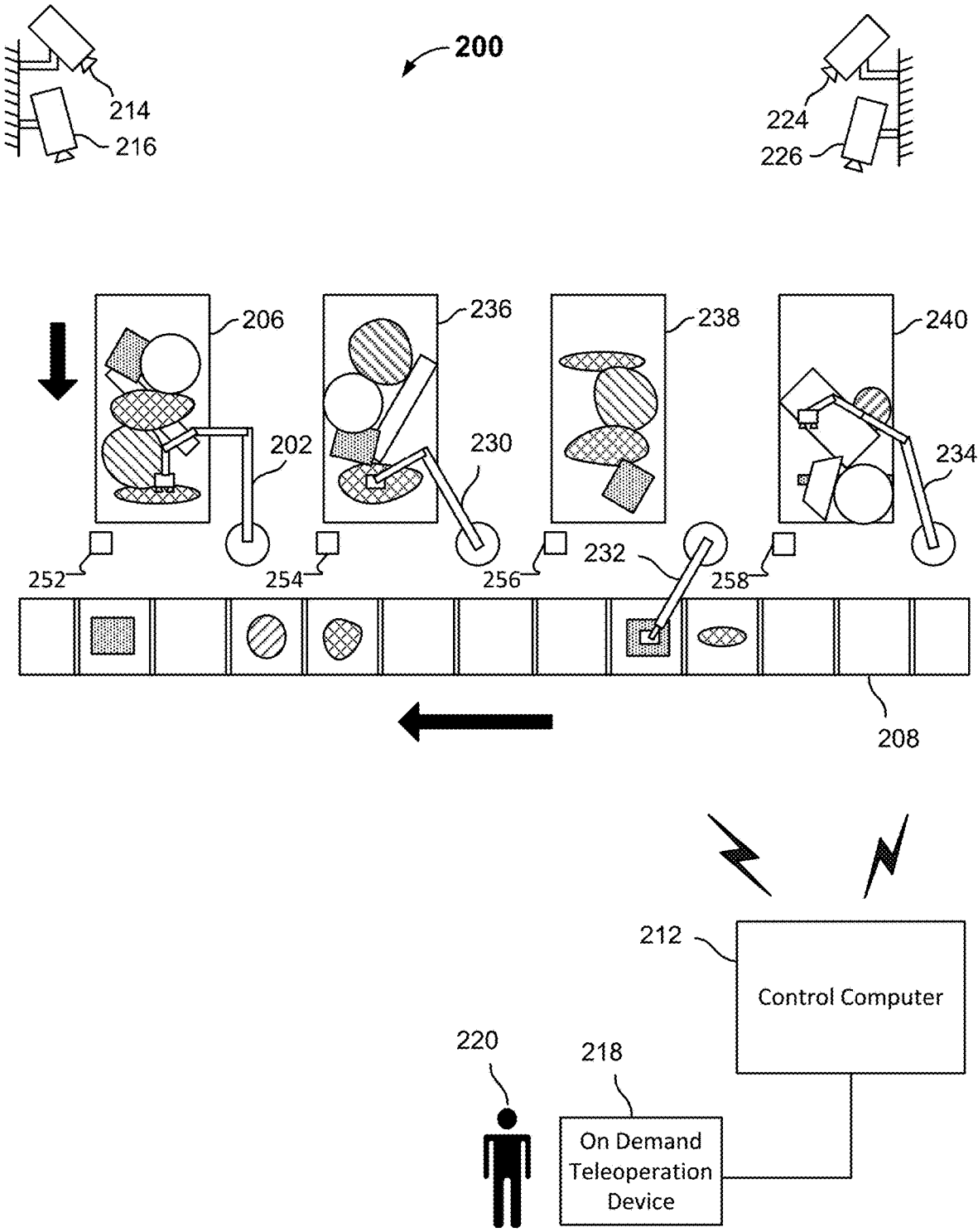
FIG. 2B is a diagram illustrating a robotic singulation system according to various embodiments.

FIG. 2B is a diagram illustrating a robotic singulation system according to various embodiments. In the example shown, the robotic singulation system of FIG. 2A has been expanded to include a plurality of singulation stations. Specifically, in addition to robotic arm 202 configured to pick items from chute 206 and place each item on a corresponding available and/or assigned location on segmented conveyor 208, the system shown in FIG. 2B includes three additional stations: robotic arms 230, 232, and 234 positioned and configured to pick/place items from chutes 236, 238, and 240, respectively. Additional cameras 224 and 226 are included, in addition to cameras 214 and 216, to provide a 3D view of the full scene, including each of the four stations/chutes 206, 236, 238, and 240, as well as conveyor 208.

In some embodiments, system 200 further comprises one or more additional sensors that are used to capture data pertaining to an item to be singulated. In the example shown, system 200 comprises sensors 252, 254, 256, and 258. Sensors 252-258 may be respectively disposed in proximity to a robotic arm and/or corresponding chute. As an example, sensors 252-258 are barcode readers/scanners or other sensors that capture data pertaining to a label affixed to the item (e.g., routing data, identifier data, etc.). A robotic arm may determine a path/trajectory for singulating an item to conveyor 208 based on a location of a sensors to be used to capture data from (e.g., an image of) a label on the item. For example, in the case of robotic arm 202, robotic arm 202 can control to move an item over the detection range of sensor 252 to capture routing data on the label of the item. System 200 may control robotic arm 202 to move the item being singulated from chute 206 to conveyor 208 to within detection range of sensor 252 in response to determining that the vision system (e.g., cameras 214, 216, 224, and/or 226) was unsuccessful in capturing the label data. In some embodiments, system 200 controls robotic arm 202 to try multiple re-scanning attempts of an item using sensor 252, until the earlier of (i) label data is successfully captured, and (ii) a threshold number of attempts have been tried or a threshold time period has elapsed. The rescanning attempts may include repetitively moving the item across the detection range, such as at different orientations in order for the sensor to capture the label data.

In various embodiments, control computer 212 coordinates operation of the four robotic arms 202, 230, 232, and 234 and associated end effectors, along with conveyor 208, to pick/place items from the chutes 206, 236, 238, and 240 to conveyor 208 in a manner that achieves a desired collective throughput of the system (e.g., a collective throughput that satisfies a throughput threshold, etc.). The plan or trajectory of an item during singulation at one station can be determined based at least in part on an attribute of an item to be singulated at another station, or based at least in part on a plan or trajectory of an item to be singulated at the other station. For example, the path or trajectory of an item to be singulated can be determined so as to avoid a collision (e.g., intersect) with the path or trajectory of another item to be singulated.

While in the example shown in FIG. 2B each station has one robotic arm, in various embodiments two or more robots may be deployed at a station, operated under control of an associated control computer, such as control computer 212 in the example shown in FIG. 2B, in a manner that avoids the robots interfering with each other's operation and movement and which maximizes their collective throughput (or attains a desired collective throughput such as in relation to a collective throughput threshold), including by avoiding and/or managing contention to pick and place the same item. In some embodiments, a plurality of robotic arms operating at the same workspace work independently to singulate the plurality of items. One or more of the plurality of robotic arms can perform an active measure to avoid a collision between two robotic arms in response to detecting a collision or a potential for a collision between the two robotic arms. For example, control computer 212 can coordinate operation of the plurality of robots to enable the plurality of robots to operate independently while ensuring that the plurality of robots and/or the items grasped by the plurality of robots do not collide with one another during singulation. The active measure can include updating a plan for singulating the item, such as changing a path or trajectory along with an item to be singulated. As an example, the robots (or control computer 212) access information from which their respective positions and the positions of one or more other robots are determined, and the robots are controlled to avoid an intersection between their respective positions and the positions of the one or more other robots at a certain time. In some embodiments, a first robot reserves an airspace (e.g., a certain position) that is to be used by the first robot during singulation of an item. The airspace can include the path or trajectory along which the item is to be singulated. In connection with a second robot scheduling singulation of an item, the second robot determines the plan to singulate the item based at least in part on the airspace reserved by the first robot. For example, in connection with scheduling singulation of the item, the second robot determines that the plan cannot include movement through the airspace reserved by the first robot and the second robot determines a plan that does not require the second robot or the item to move through the airspace reserved by the first robot during the time at which the airspace is so reserved. The second robot determines a path or trajectory along which the second item is to be singulated based on the airspace reserved for singulation of the first item and/or an attribute of the second item or first item such as a size of the first item or second item.

In various embodiments, a scheduler coordinates operation of a plurality of robots, e.g., one or more robots working at each of a plurality of stations, to achieve desired throughput without conflict between robots, such as one robot placing an item in a location the scheduler has assigned to another robot. The desired throughput can be a collective throughput that exceeds a predetermined throughput threshold.

A robotic system as disclosed herein may coordinate operation of multiple robots to one by one pick items from a source bin or chute and place the items on an assigned location on a conveyor or other device to move items to the next stage of machine identification and/or sorting. In some embodiments, each of at least a subset of a plurality of robots working at a workspace picks an item independent from the other robots of the plurality of robots and a corresponding plan for singulation of the item is determined. The at least the subset of the plurality of robots can pick in a predefined order such that no two robots select or pick an item at the same time. Each of the at least the subset of the plurality of robots can select or pick an item based on items that are currently available at the time of such selection. Accordingly, a second robot of the at least two subset of the plurality of robots that picks after a first robot will select an item to singulate that is different from the item selected or picked by the first robot.

System 200 can include multiple robots that may pick from a same chute or other source receptacle. In the example shown in FIG. 2B, for example, robotic arm 202 may be configured to pick from either chute 206 or chute 236. Likewise, robotic arm 230 may pick from chute 236 or chute 238 and robotic arm 232 may pick from chute 238 or chute 240. In some embodiments, two or more robotic arms configured to pick from the same chute may have different end effectors. A robotic singulation system as disclosed herein may select the robotic arm most suitable to pick and singulate a given item. For example, the system determines which robotic arms can reach the item and selects one with the most appropriate end effector and/or other attributes to successfully grasp the item.

While stationary robotic arms are shown in FIG. 2B, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

According to various embodiments, a robotic singulation system as disclosed herein, such as system 200 of FIG. 2A or the multi-station system of FIG. 2B, manages a distributed data structure pertaining to the operation of one or more robots comprising the system and/or a state of the conveyance structure. For example, the distributed data structure may include one or more fields associated with each slot in the conveyance structure. The one or more fields may include a set of one or more fields for routing data (e.g., for elements of the routing data). For example, the set of one or more fields for routing data includes a field for destination data, a field for service class, etc.

According to various embodiments, the distributed data structure operates at a speed far in excess of the speed at which robots in the system operate. For example, the distributed data structure operates (e.g., is updated) on the order of 1 μs or 1 ms, and time at which the robots physically operate/move is on the order of 100 ms. In some embodiments, the control loop for a particular robot is substantially equal to, or on the order of, 800 Hz, and the control loop for the control computer (e.g., the dispatcher) sending targets to the robot is substantially equal to, or on the order of, 100 Hz. The data structure may be atomic in that if one robot is updating the status of a slot, then another robot will not be able to read that information until the write is complete. Accordingly, the distributed data structure can be updated based on operation of a robot or a plan for singulation associated with a robot. Because the speed at which the robots operate is slower than the speed at which the distributed data structure operates, the distributed data structure is updated to reflect changes in the state of the workspace (e.g., the state of the conveyance structure) relatively quickly and the distributed data structure is likely to have been updated with the latest state by the time the robotic obtains and/or uses information from the distributed data structure in connection with determining a plan/strategy for singulating an item (e.g., selecting/claiming a slot in the conveyor). In some implementations, the relative speed of the distributed data structure reduces the likelihood that two robots would claim a slot on the conveyor at the same time and cause a fault in the distributed data structure. Accordingly, the distributed data structure can be updated based on operation of a robot or a plan for singulation associated with a robot.

In various embodiments, each (mostly) independently operated singulation robot comprising a system associated with an output conveyor updates the distributed data structure with information pertaining to a plan or with information pertaining to one or more characteristics associated with the workspace (e.g., whether a slot in the conveyor is occupied or claimed for use by a robot in the system as a planned destination to place an item on the conveyor). As an example, if the robot receives an error in connection with an attempt to write information to the distributed data structure (e.g., to claim a slot on the conveyor for its use), the robot waits a predetermined interval and re-attempts to write such information to the distributed data structure. If the data cannot be written because another robot has already written data to that location (e.g., already claimed an associated slot on the output conveyor), the robot chooses another slot determined to be available by reading another location in the data structure. In response to the data structure being updated by one robot, the data structure may be automatically updated with respect to one or more other robots within system 200. For example, in response to determining that an update (e.g., a write or delete operation) is performed, the update is distributed to the other robots within system 200.

The data structure may be a shared data structure to which a plurality of robots within a system have access (e.g., to read, write, etc.). In some embodiments, a distributed data is hosted on one machine (e.g., computer system), and all robots within a system have an active network connection to that machine (e.g., computer system) and can individually read/write data (e.g., to the data structure). The information pertaining to the data structure may be stored on a server.

In various embodiments, a robot may update the distributed data structure with information pertaining to a plan or with information pertaining to one or more characteristics associated with the workspace (e.g., whether a slot is occupied). For example, in response to the robot updating a plan to singulate an item (e.g., the path or trajectory along which the item is to be singulated), the robot may update the distributed data structure with information pertaining to a plan or with information pertaining to one or more characteristics associated with the workspace.

According to various embodiments, the distributed data structure comprises a field associated with a slot in the conveyance structure that is used to indicate whether the slot is occupied or reserved for an item in connection with singulation of the item by the robot. For example, a value in the field associated with a slot is indicative of whether the slot can be reserved or used by another robot for scheduling an item. In some embodiments, when a robot is determining (or updating) a plan to singulate an item, a slot on the conveyance structure is reserved. The slot in the conveyance structure (or tray on the conveyance structure) is reserved based at least in part on the distributed data structure pertaining to the state of the conveyance structure. For example, a slot associated with a field indicating that the slot is empty or unreserved can be reserved for singulation of an item. Occasionally, a robot arm can erroneously release an item in a slot different from a slot that corresponded to the singulation plan, or in a manner that the item straddles two slots (e.g., adjacent slots). The corresponding robot (or a downstream robot or sensor/camera) can detect that a slot has an item therein in contradiction to the corresponding field in the distributed data structure (e.g., such field indicating that the slot is empty or not reserved). In response to detecting that the slot has an item therein in contradiction to the corresponding field in the distributed data structure, the robot system updates the data structure to indicate that the slot is occupied or reserved.

According to various embodiments, the distributed data structure includes information pertaining to a timestamp, a speed of the conveyor, and one or more characteristics of a slot in the conveyor (e.g., an indication of whether the slot is occupied or reserved). The distributed data structure can include information pertaining to one or more attributes of one or more items within a slot or tray on the conveyor and/or an attribute of an item to be singulated by a robot within the robot system. The robot system can determine a plan for singulating an item from a source pile/flow to a slot in the conveyor based at least in part on the distributed data structure. For example, system 200 determines, based on the timestamp and the speed of the conveyor, a set of slots in which an item picked from the source pile/flow can be placed. System 200 can select a slot, from among the set of slots, that is empty or not reserved as a slot in which the item is to be singulated. The timestamp and the speed of the conveyor are used because system 200 can determine one or more slots with which the path or trajectory of the item being singulated can be caused to intersect based on operating the corresponding robot.

Figure 3:
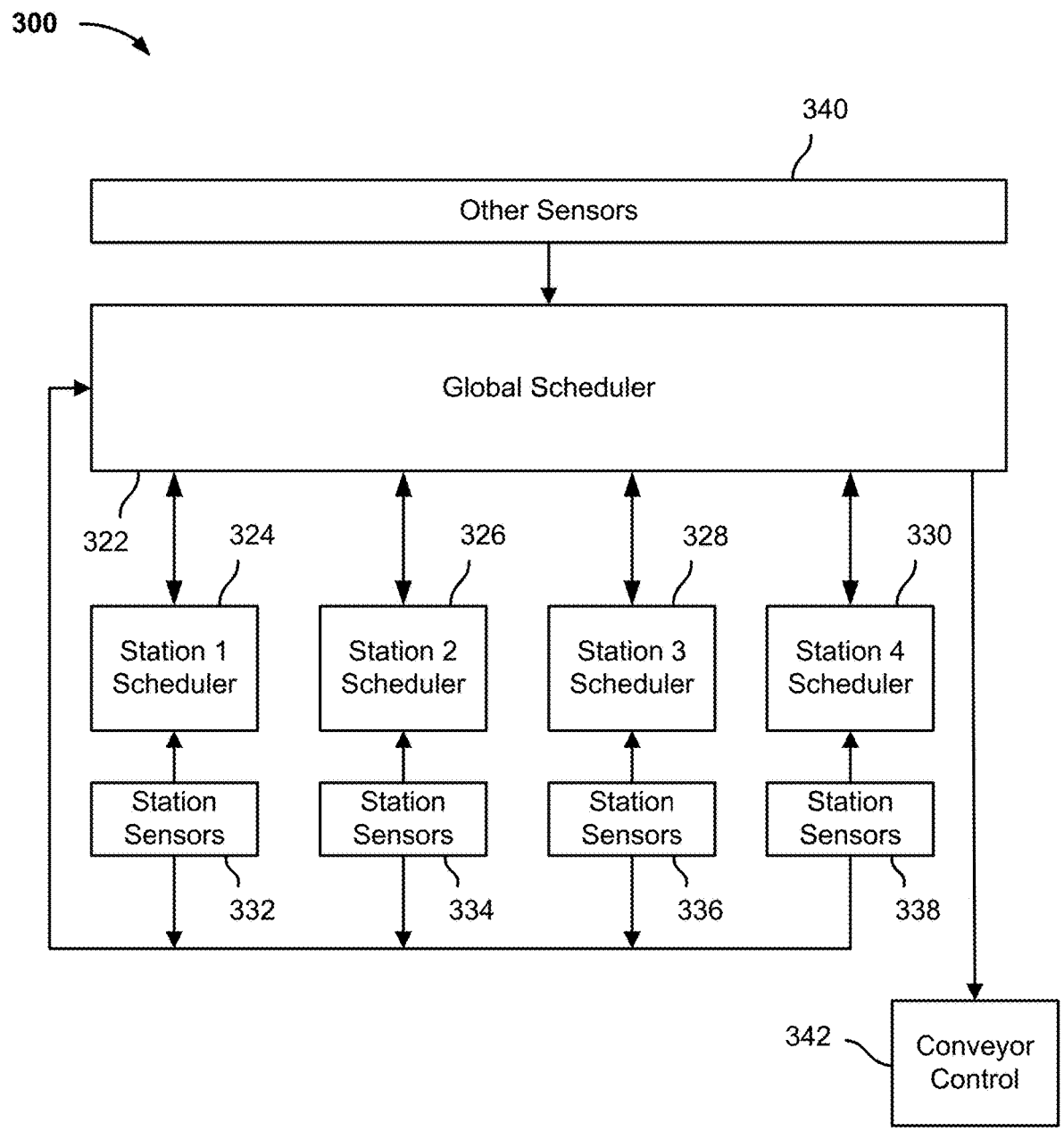
FIG. 3 is a diagram of a hierarchical scheduling system according to various embodiments of a robotic singulation system.

FIG. 3 is a diagram of a hierarchical scheduling system according to various embodiments of a robotic singulation system. In various embodiments, the hierarchical scheduling system 300 of FIG. 3 is implemented at least in part on a computer, such as control computer 212 of FIGS. 2A and 2B, control computer 512 of FIGS. 5A and 5B, control computer 815 of FIG. 8A, control computer 917 of FIG. 9, and control computer 1028 of FIG. 10A. In the example shown, hierarchical scheduling system 300 includes a global scheduler 322 configured to optimize throughput (or attain a desired throughput) by coordinating the operation of a plurality of robotic singulation stations and a segmented conveyor (or similar structure) on which the robotic singulation stations are configured to place items. According to various embodiments, the global schedule 322 is configured to coordinate operation of a plurality of robotic arms within a single workspace to ensure a desired throughput is attained while ensuring that the plurality of robots do not collide. Global scheduler 322 can be configured to implement an active measure in response to determining that a plurality of robotic arms (e.g., operating within a single workspace) have collided or are expected to collide (e.g., if the plurality of robots were to continue implementing their respective plans or strategies for singulating an item). The active measure can include causing one or more paths or trajectories of an item to be singulated by the plurality of robotic arms to be updated to ensure that the expected collision is avoided. Global scheduler 322 may be implemented as a processing module or other software entity running on a computer. The global scheduler supervises and coordinates work among the robotic singulation stations at least in part by monitoring and as needed controlling and/or otherwise providing input to a plurality of robotic singulation station schedulers 324, 326, 328, and 330.

In some embodiments, a robotic singulation station includes a single robotic arm that is controlled to singulate an item within a workspace, and a workspace can include a plurality of robotic singulation stations. A robotic singulation station includes a plurality of robotic arms that are coordinated to singulate a plurality of items within a workspace. In some cases, if the robotic singulation station includes a plurality of robotic arms, a particular workspace can include a single robotic singulation station.

Each of the robotic singulation station schedulers 324, 326, 328, and 330 is associated with a corresponding robotic singulation station and each controls and coordinates the operation of one or more robotic arms and associated end effectors to pick items from a corresponding chute or other item receptacle and place them singly on a segmented conveyor or similar structure. Each of the robotic singulation station schedulers 324, 326, 328, and 330 is associated with a corresponding set of one or more station sensors 332, 334, 336, and 338, respectively, and each uses the sensor data generated by its station's sensors to perform automated singulation at its robotic singulation station. In some embodiments, each implements and performs process 400 of FIG. 4A, process 420a of FIG. 4B, process 420b of FIG. 4C, process 600 of FIG. 6, process 850 of FIG. 8B, process 875 of FIG. 8C, and process 1050 of FIG. 10B, and process 1075 of FIG. 10C.

In various embodiments, each of the robotic singulation station schedulers 324, 326, 328, and 330 reports to global scheduler 322 one or more of image and/or other station sensor data; object identification, grasp strategy, and success probability data; pick/place plan information; path or trajectory information; and expected item singulation throughput information. Global schedule 322 is configured to use information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations, each under the control of its station-specific scheduler 324, 326, 328, and 330, and to control the operation (e.g., speed) of the segmented conveyor via conveyor controller 342, so as to optimize (e.g., maximize) the collective singulation throughput of the system.

In various embodiments, the global scheduler 322 employs one or more techniques to implement collision avoidance between a plurality of robots comprising the robotic singulation system while using the plurality of robots to perform singulation, e.g., to maximize overall throughput or to attain a desired overall throughput level. For example, a particular workspace can include a plurality of robots operating to singulate items within the particular workspace (e.g., the plurality of robots pick items from a same source pile/flow in a chute and singly place the respective items in corresponding slots of the conveyance structure). Because the workspace includes a plurality of robotic arms to singulate items therein, the robotic arms can have respective ranges of motion that overlap with each other. In some embodiments, the global scheduler 322 detects an expected collision event based at least in part on information received from the robotic singulation station schedulers 324, 326, 328, and 330—along with sensor data received from other sensors 340, such as cameras pointed at the segmented conveyor and/or other parts of the workspace not covered or covered well or completely by the station sensors—to coordinate work by the respective robotic singulation stations. According to various embodiments, global scheduler 322 uses the information received from the respective robotic singulation station schedulers 324, 326, 328, and 330 to determine locations of the plurality of robots and determine a probability that two of the plurality of robots will collide with each other or that a robot will collide with another object within the workspace at which the robot operates. For example, the global scheduler detects an expected collision event based at least in part on a location of at least one robot and a path or strategy (for singulating an item) for at least one robot. In some embodiments, the expected collision event is detected based on a determination that a location or path of a first robot (or item grasped by the first robot) is planned to intersect with a location or path of a second robot (or item grasped by the first robot) at a particular time.

In some embodiments, each robot operating in a workspace in which a plurality of robots pick items from a common source, such as the same chute, operates mostly independently to identify and grasp items to be picked by that robot from the source. Conflicts may be minimized or avoided by configuring each robot to pick from potentially overlapping assigned regions of the chute or other source. For example, each robot may pick (primarily) from the side of the chute nearest to that robot. Or, in some embodiments, one robot may be configured to pick (primarily) from the back of the chute (farthest from destination conveyor) and another from the front of the chute (nearest to the destination conveyor). In some embodiments, in the event of a detected (risk of) collision, each robot implements a random wait interval and resumes operation. If the different/random waits result in no risk of collision, both resume and continue operation. In some embodiments, a heuristic or logic may be applied to resolve/avoid collisions, such as by allowing the robot targeting an item further back in the chute to reach and grasp first, followed by the robot targeting an item nearer the front (i.e., nearer the destination conveyor). In some embodiments, the robot that picked from nearer to the end of the chute may move first to place its item, followed by the robot that grasped an item from farther back.

In some embodiments, the plurality of robots operating at a single workspace operate to implement respective processes to singulate items in parallel, and each of the plurality of robots contemporaneously operates to implement a particular step or set of steps in a sequence of steps of the respective processes to singulate items before either of the plurality of robots moves to the next step or set of steps in the sequence of steps. For example, each of the plurality of robots operate to pick an item from a source pile/flow and each of the plurality of robots wait until the other robot(s) correspondingly pick an item before progressing to the next step or sequence of steps in the process to singulate items from the workspace. As another example, each of the robots operate to move the items from the chute area from which an item was grasped to a particular location at the conveyance structure at which the item is to be placed, and each of the plurality of robots wait until the other robot(s) correspondingly move the items in their grasp to corresponding locations at the conveyance structure before progressing to the next step or sequence of steps in the process to singulate items (e.g., to place the items on the conveyance structure). In the foregoing manner, a plurality of robots operate independently to determine plans and strategies for singulating items within a workspace, however, the plurality of robots are coordinated in progressing through the singulation process. According to various embodiments, a collision event is detected based on a determination that a location or path of a first robot (or item grasped by the first robot) is planned to intersect with a location or path of a second robot (or item grasped by the first robot) at a particular step in a singulation sequence. In such a manner, a location or path of a robot is only used by a single robot during a particular step or set of steps in the singulation process.

According to various embodiments, the robotic singulation station schedulers 324, 326, 328, and 330 register with global scheduler 322 plans or strategies for operating corresponding robots to singulate items, or otherwise store such plans or strategies in a storage location that is accessible to global scheduler 322. The robotic singulation station schedulers 324, 326, 328, and 330 can independently determine the plans or strategies for operating corresponding robots to singulate items. In some embodiments, although the robotic singulation station schedulers 324, 326, 328, and 330 operate independently to determine their respective plans or strategies, the robotic singulation station schedulers 324, 326, 328, and 330 determine their respective plans or strategies at different times (e.g., so that a same item is not selected for singulation by two robots, etc.). In some embodiments, the robotic singulation station schedulers 324, 326, 328, and 330 operate independently to determine their respective plans or strategies, and the robotic singulation station schedulers 324, 326, 328, and 330 register with their respective plans or strategies global scheduler 322 at different times, and global scheduler 322 can send a fault to a robotic singulation station scheduler if during registration of its plan or strategy global scheduler 322 that such plan or strategy conflicts with an existing registered plan or strategy. Examples of instances in which plans or strategies are deemed to conflict include a plurality of plans or strategies pertaining to singulation of a same item from the workspace, a plurality of plans or strategies using a same path or trajectory, a plurality of plans or strategies using intersecting paths or trajectories, a plurality of plans or strategies including moving a part of the robotic arm or item to a same location, a plurality of plans or strategies selecting a same slot at the conveyance structure in which corresponding items are to be placed, etc. Various other conflicts between plans or strategies are possible.

Although the robotic singulation station schedulers 324, 326, 328, and 330 operate independently to determine plans or strategies for operating corresponding robots to singulate items, in various embodiments, global scheduler 322 provides oversight over the entire robotic system to detect an expected collision event and to implement an active measure to prevent the expected collision event. In some embodiments, implementing the active measure includes sending a fault to a robotic singulation station scheduler (e.g., corresponding to at least one of the robots identified to be associated with the expected collision event). For example, in response to sending the fault to the robotic singulation station scheduler, global scheduler 322 can require the robotic singulation station scheduler to update its current plan or strategy (e.g., in a manner that avoids the expected collision event). The fault sent to the robotic singulation station scheduler can include an indication of the reason for the fault (e.g., an indication of the expected collision event, and/or information pertaining to the expected collision event such as an indication of the manner by which the plan or strategy of the robotic singulation station scheduler conflicts with the plan or strategy of another robotic singulation station scheduler). In response to global scheduler 322 determining that a path or trajectory for singulation of a first item intersects with a path or trajectory of another item or with a location of an object within the workspace, global scheduler 322 sends a fault to the robotic singulation station scheduler for the robotic structure to singulate the first item and causes such robotic singulation station scheduler to update the path (e.g., the path or trajectory) for singulating the first item in a manner that avoids such a collision.

In various embodiments, the global scheduler 322 employs one or more techniques to optimize the use of a plurality of robots comprising the robotic singulation system to perform singulation, e.g., to maximize overall throughput or to attain a desired overall throughput level. For example, if there are four robots in sequence, the lead (or other upstream) robot may be controlled to place packages in a manner that leaves open slots so that a downstream robot is not waiting for an empty slot. This approach has impacts because downstream robots wait for some unknown/random amount of time because of package flow etc. As a result, a naive strategy (say lead robot places into every empty 4th slot) may not optimize collective throughput. Sometimes it might be better for the lead robot to put 2-3 packages into successive slots in sequence if its packages are not flowing, but overall the system makes such decisions with awareness of state and flow at each station. As an example, the optimal strategy for leaving open slots for downstream robots is based on an anticipated request for an open slot by the downstream robot (as a function of their package flow, for example). In some embodiments, information from the local station scheduler is used to anticipate the maximum throughput of each station and to control conveyor speeds and how many slots are left empty by upstream robots to ensure downstream robots have access to empty slots in proportion to the speed at which they are (currently) able to pick/place. In some embodiments, when the segmented conveyor is full due to some bottlenecks in the downstream sortation process, a robotic singulation system as disclosed herein may pre-singulate one or more packages, for example, inside its corresponding chute or in a nearby staging area, while keeping track of the poses of each pre-singulated package. Once some empty spaces are available from the segmented conveyor, the system/station moves the pre-singulated packages onto the segmented conveyor, singly and in rapid succession, without additional vision processing time.

In some embodiments, the presence of humans working alongside robots has an impact on the placement and multi-robot coordination strategy because the robots or associated computer vision or other sensor system must now also watch what humans do and adapt the robot's placements in real-time. For example, if a human took over a conveyor belt slot that was scheduled to be used by a robot, the system must adjust its global and local schedules/plans accordingly. In another example, if a human disrupts a robot's picked package and causes it to register as not picked the system adapts to correct the error. Or, if a human corrects a robot's errors in picking (robot was commanded to put a package into slot A but accidentally placed the item straddling across slot A and adjacent slot B; and the human places the item into slot B though the system memory says the package is in slot A), the system must observe the human's action and adjust downstream robot actions.

In various embodiments, the global scheduler 322 may cause a station to operate more slowly than its maximum possible throughput at a given time. For example, the global scheduler 322 may explicitly instruct the local station scheduler (e.g., 324, 326, 328, and 330) to slow down and/or may make fewer slots available to the local station, e.g., explicitly by assigning fewer slots to the station or indirectly, such as by allowing upstream stations to fill more slots.

In various embodiments, the global scheduler 322 communicates faults to one or more local station schedulers (e.g., 324, 326, 328, and 330) in response to detecting a state or condition associated with one or more items in the workspace. The fault can be communicated in connection with causing one or more of the local station schedulers to perform an active measure to change or adapt to the detected state or condition (e.g., to change or update a plan for singulation to modify the path or trajectory along which the item is to be singulated). For example, if the global scheduler 322 determines that a robot places two items into a single slot of the conveyor (e.g., based on sensor data pertaining to the conveyor, or in response to receiving an indication from the robotic structure corresponding to the robot), global scheduler 322 sends a fault to one or more local station schedulers downstream from the robot that placed two items into the single slot or downstream from the slot comprising two items. In response to receiving the fault, a local station scheduler can determine a plan or strategy to implement an active measure to pick one of the two items from the slot and to singly place the item in another slot on the conveyor (and to update the distributed data structure with an association between the item(s) and the slot(s)).

In some embodiments, the global scheduler 322 communicates a fault to one or more local station schedulers (e.g., 324, 326, 328, and 330) in response to a determination that an item placed on the conveyor straddles two different slots. The global scheduler 322 communicates the fault to cause the local station scheduler downstream from the item to determine a plan and strategy to reposition the item into a single slot on the conveyor, and to cause a corresponding robot to implement the plan or strategy to reposition the item. The distributed data structure can be correspondingly updated with an association between the item and the slot in which the item occupies after repositioning.

Figure 4A:
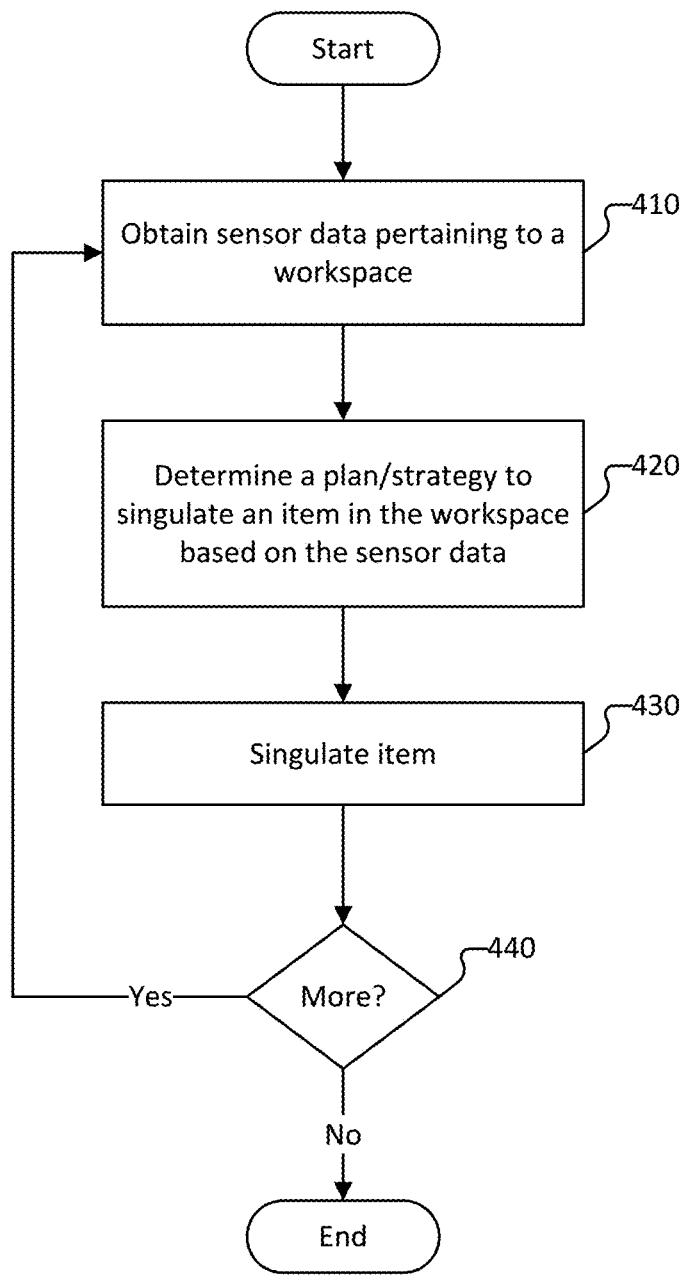
FIG. 4A is a diagram of a process to pick and place items for sorting according to various embodiments.

FIG. 4A is a diagram of a process to pick and place items for sorting according to various embodiments. In some embodiments, process 400 is implemented by a robot system operating to singulate one or more items within a workspace, such as system 200 of FIG. 2A and FIG. 2B. The robot system may include one or more processors that operate to cause a robotic structure (e.g., a robotic arm) to pick and place items for sorting.

At 410, sensor data pertaining to a workspace is obtained. In some embodiments, a robotic system obtains the sensor data pertaining to the workspace from one or more sensors operating within the system. As an example, the sensor data is obtained based at least in part on outputs from image sensors (e.g., 2D or 3D cameras), an infrared sensor array, a laser array, a scale, a gyroscope, a current sensor, a voltage sensor, a power sensor, a force sensor, a pressure sensor, and the like.

According to various embodiments, the obtained sensor data pertaining to the workspace comprises information from which a model of the workspace may be generated. For example, one or more characteristics associated with the workspace may be determined based at least in part on the sensor data. The sensor data can be used in connection with determining at least one characteristic (e.g., attribute) of one or more items within the workspace such as items in the source pile/flow of the chute, or an item grasped by the robotic arm, and the item already positioned in a slot/tray on the conveyor, etc. In some embodiments, the sensor data is used in connection with determining one or more characteristics of the conveyance structure such as determining the slots on the conveyor that are empty or unreserved, determining a speed of the conveyor, and/or determining the characteristics of at least one slot or of at least one item already on the conveyor.

In some embodiments, the sensor data comprises (or is used to obtain) routing data. For example, the sensor comprises a first element of routing data, a second element of routing data, etc. The system may have a set of predefined required elements of routing data for which the system uses various sensors in the workspace to collect. As an example, the required elements of routing data may include a destination (e.g., a first element of routing data) and a service class (e.g., a second element of routing data).

At 420, a plan or strategy to singulate an item in the workspace is determined based at least in part on the sensor data. In some embodiments, a robotic system determines the plan or strategy to pick at least one item from a source pile/flow in the workspace and to singly place the at least one item in a slot on the conveyor. The plan or strategy to singulate the one or more items is determined in various embodiments on a robot-by-robot basis such that if the robotic system includes a plurality of robots, each robot operates independent of the other robot(s).

According to various embodiments, the plan or strategy to singulate the one or more items in the workspace is determined based at least in part on the sensor data, such as sensor data including data associated with an item present in a workspace (e.g., the item to be singulated and/or an item already located on the conveyor) or another object included in the workspace. For example, the plan or strategy to singulate the one or more items includes selecting an item within the source pile/flow that is to be singulated. The selected item can be identified from among other items or objects within the workspace based at least in part on the sensor data (e.g., the boundaries of the item and other items or objects within the workspace can be determined). As an example, one or more characteristics (or attributes) pertaining to the selected item is determined based at least in part on the sensor data. The one or more characteristics pertaining to the selected item can include a dimension of the item, a packaging of the item, one or more identifiers or labels on the item (e.g., an indicator that the item is fragile, a shipping label on the item, etc.), a height of the item, a length of the item, an estimated weight of the item, routing data and the like, or any combination thereof. As another example, the plan to singulate the one or more items includes determining a location on the conveyance structure (e.g., a slot on the conveyor) at which the robotic structure (e.g., the robotic arm) is to singly place the item. The location on the conveyance structure at which the item is to be placed can be determined based at least in part on a timestamp, a speed of the conveyor, and one or more characteristics of a slot in the conveyor (e.g., an indication of whether the slot is occupied or reserved), and the like, or any combination thereof. As another example, the plan or strategy to singulate the one or more items includes determining a path or trajectory of the item along which the robotic arm is to move the item during singulation. The path or trajectory of the item along which the item is to be moved can be determined based at least in part on a location of one or more other objects within the workspace such as a frame of the chute, other items in the source pile/flow, items on the conveyor, other robots operating within the workspace, a reserved airspace for operation of other robots, sensors within the workspace, etc. For example, the path or trajectory of the item is determined to move a part of the item comprising an identifier (e.g., a shipping label) to an area at which a scanner is able to scan the identifier, or the path or trajectory of the item is determined to maximize a likelihood that the identifier on the item is read by one or more scanners along the path or trajectory.

In some embodiments, the determination of the plan to singulate an item includes a determination of a manner by which the applicable robotic arm is to grasp the item. The plan to singulate the item can indicate a particular end effector to be used to pick up the item from the source pile, and one or more settings associated with the end effector in connection with grasping the item such as a grasp strength, a pressure to apply on a suction-based end effector, etc. The plan to singulate the item can indicate an orientation of one or more of the robotic arm, a wrist on the robotic arm, and the end effector. In some embodiments, the end effector is positioned to be orthogonal to the item when grasping the item. To so position the end effector in relation to the item, the robotic structure can control to operate the orientation of one or more of the robotic arm, a wrist on the robotic arm, and the end effector.

In some embodiments, the plan/strategy for singulating the item is determined based at least in part on the routing data pertaining to the item. The system obtains the routing data by capturing label data or other markings on the item, such as by processing information captured by one or more sensors within the workspace. The system may determine a particular tray, segment of a conveyor, or conveyor at which an item is to be singulated (e.g., moved to and placed in). For example, the item may be differently routed according to the routing data, such as the destination or service class.

At 430, the item is singulated. In some embodiments, the item is singulated in response to the plan or strategy for singulating the item being determined. For example, a robotic arm is operated to pick one or more items from the workspace and place each item singly in a corresponding location in a singulation conveyance structure. The singulation of the item comprises picking the item from the workspace (e.g., from the source pile/flow) and singly placing the item on the conveyance structure. The robotic system singulates the item based at least in part on the plan or strategy for singulating the item. For example, the robotic system singulates the item along a path or trajectory according to the plan or strategy to singulate the item.

At 440, a determination is made as to whether further items are to be singulated. If there are more items, a further iteration of steps 410, 420, and 430 is performed, and successive iterations are performed until it is determined at 440 that there are no more items in the chute (or other receptacle or source) to be picked and placed.

Figure 4B:
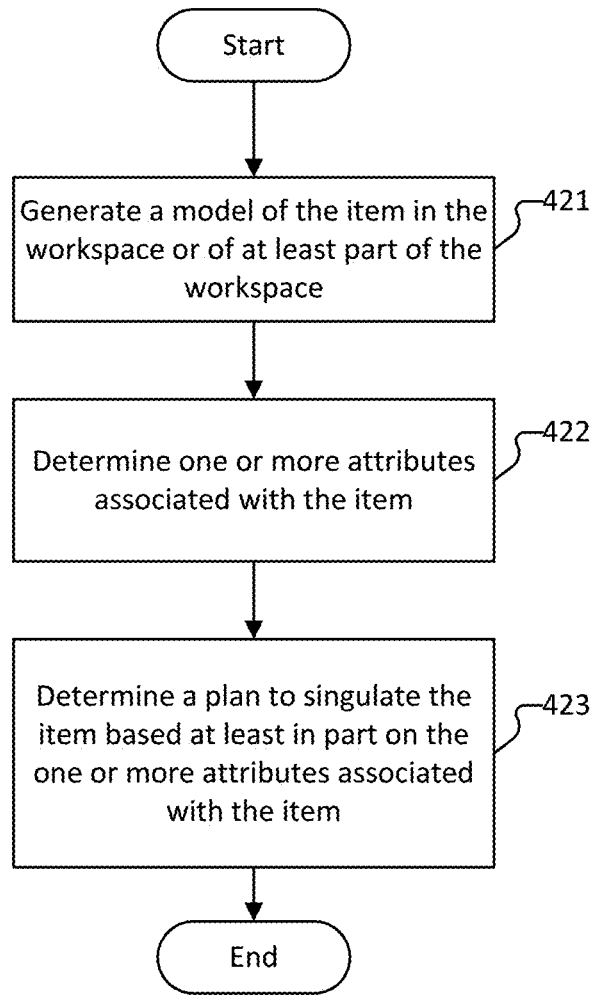
FIG. 4B is a diagram of a process to determine a plan to pick and place items for sorting according to various embodiments.

FIG. 4B is a diagram of a process to determine a plan to pick and place items for sorting according to various embodiments. In various embodiments, process 420*a* of FIG. 4B implements step 420 of the process 400 of FIG. 4A.

At 421, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 422, one or more attributes associated with the item are determined. In some embodiments, the one or more attributes associated with the item are determined based at least in part on the model of the item in the workspace. As an example, the robotic system determines an attribute of an item to be singulated based on identifying the item to be singulated, and obtaining information in the model pertaining to the item. The one or more attributes that are determined based on the model can be attributes that are to be used in connection with determining or updating a plan for singulating the item. In some cases, the robotic system obtains attributes of a first item within the workspace in connection with determining a plan for singulating a second item (e.g., to assess whether or how the first item within the workspace would impact singulation of the second item).

In some embodiments, the determining the one or more attributes associated with an item includes determining routing data associated with the item. For example, the system determines whether the required routing information has been obtained (e.g., captured by one or more sensors in the workspace). In response to determining that the system has not successfully determined the routing data, the system re-attempts to capture the routing data. As an example, the re-attempt to capture the routing data includes processing the information obtained by one or more sensors, such as performing an OCR with respect to an image of a label on the item. As another example, the re-attempt to capture the routing data includes capturing another image or rescanning the item (e.g., using a barcode scanner) using the same or different sensor(s). The system may determine that the routing data was not successfully obtained if not all the required routing data is obtained (e.g., if a destination is obtained but a service class has not been obtained).

At 423, a plan to singulate the item is determined. In some embodiments, the plan to singulate the item is determined based at least in part on the one or more attributes associated with the item. The plan can include one or more instructions used to operate a robotic structure to pick the item from the source pile/flow and singly place the item on the conveyor, or information from which the robotic structure can derive such instructions for singulating the item. According to various embodiments, the plan includes (or defines) a path or trajectory along which the item is to be moved during singulation.

As an example, in the case of the one or more attributes including the weight of the item, determining the plan to singulate the item may include determining whether the robotic arm can lift the item, and if so, determining the grasp strength required to pick the item from the source pile/flow. The robotic structure can determine the amount of pressure to attain between suction-based end effectors and the item. In response to determining that the robotic arm cannot lift the item, the determining the plan to singulate the item can include determining a path to partially lift and drag (or push) the item from the source pile/flow to a corresponding location on the conveyor.

As another example, in the case of the one or more attributes including a location of a label on the item, determining the plan to singulate the item may include determining a manner of singulating the item that optimizes the likelihood that the label will be read by a sensor within the workspace. Based on the location of one or more sensors within the workspace, the robotic system can determine a side of the item that includes the label, determine a side by which to grasp the item, and a path/trajectory along which the item is to be singulated to expose the label on the item to the one or more sensors (e.g., the vision system or other sensor array such as a barcode reader).

As another example, in the case of the one or more attributes including a size or dimension of the item, determining the plan to singulate the item may include determining a manner by which to pick up the item, and a location on the conveyor on which the item is to be placed such as in a manner to optimize the likelihood that one or more labels or identifiers will be exposed to one or more sensors of the workspace. The system determines whether a slot/tray on the conveyor is occupied by a relatively large item, and determines that the slot/tray in which the item to be singulated is a slot/tray that is not adjacent to the relatively large item, or that such slot/tray is a predefined distance or spacing from the relatively large item. In some embodiments, in response to detecting a relatively large item on the conveyor, the system selects to place an item a predefined minimum distance or spacing from the relatively large item. For example, in response to detecting a relatively large item on the conveyor, the system determines a distance/spacing that is sufficient in order to ensure that the relatively large item does not block the one or more sensors from capturing information on the item to be singulated.

According to various embodiments, the determining the location in a manner to optimize the likelihood that one or more labels or identifiers will be exposed to one or more sensors includes determining a set of locations in which the item may be placed and corresponding probabilities that a label or identifier on the item would be scanned if the item were singulated to that location, and selecting a location that has a highest corresponding probability. As an example, a location having a corresponding probability that exceeds a threshold probability, or that is within a predefined percent or number of the set of locations having the highest corresponding probabilities is determined. As another example, a location and corresponding probability that the label or identifier on the item would be scanned if the item were singulated to that location are determined, and the probability is compared to a predefined threshold for a minimum desired probability. In response to determining that the probability corresponding to a particular location does not exceed the predefined threshold for a minimum desired probability, a new location and corresponding probability are determined. The system can continue to iterate determining the location and corresponding probability until the robotic system determines that the corresponding probability exceeds the predefined threshold for a minimum desired probability.

Although various embodiments have been described in connection with determining the plan to singulate an item based on at least one attribute for the item to be singulated, various embodiments include determining the plan to singulate the item based on an attribute of another item or object within the workspace. As an example, the plan to singulate the item may be determined based at least in part on an attribute of another item located on the chute and/or an attribute of another item within a slot on the conveyor.

Figure 4C:
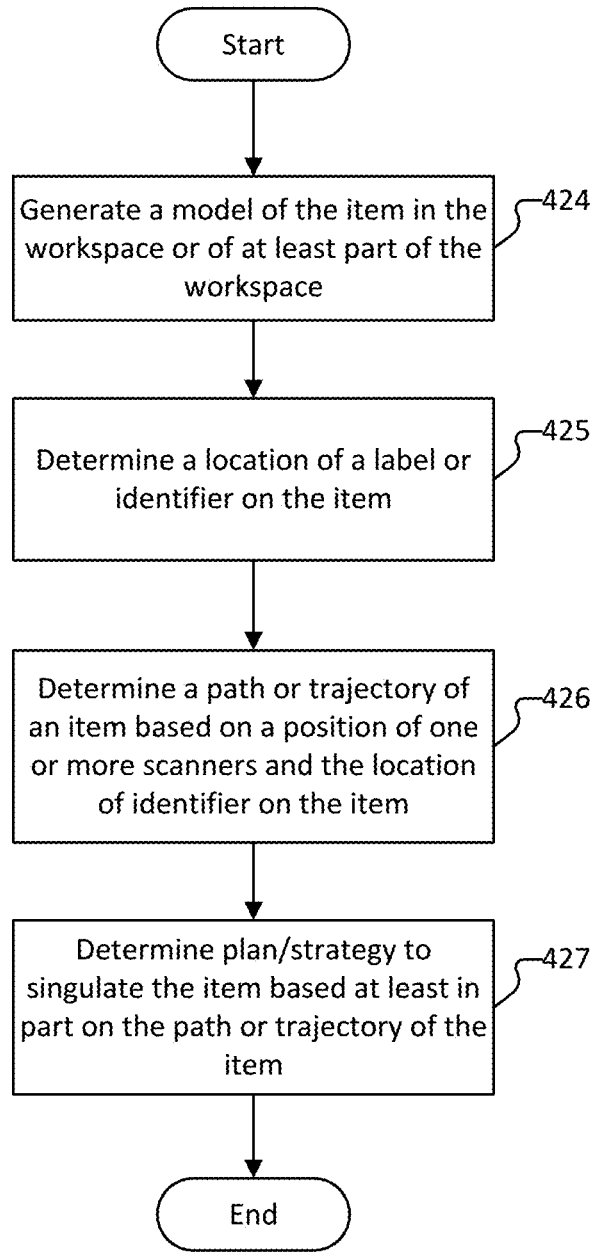
FIG. 4C is a diagram of a process to determine a plan to pick and place items for sorting according to various embodiments.

FIG. 4C is a diagram of a process to determine a plan to pick and place items for sorting according to various embodiments. In various embodiments, process 420b of FIG. 4C implements step 420 of the process 400 of FIG. 4A.

At 424, a model of the item in the workspace or of at least part of the workspace is generated. In some embodiments, the robotic system generates the model of the item within the workspace. The model of the item within the workspace can be part of a larger model of the workspace, including the one or more items within the workspace. The robotic system generates the model using the sensor data that is determined based at least in part on information obtained from one or more sensors (e.g., the vision system, sensor arrays, weight sensors, pressure sensors, etc.). The model can be indicative of one or more characteristics of various elements of the workspace such as the source pile/flow of items on the chute, a speed of the conveyor, a mapping of empty and occupied slots or trays on the conveyor, attributes of items on the conveyor, attributes within the source pile/flow, etc.

At 425, a location of a label or identifier on the item is determined. In some embodiments, the robotic system determines a location of the label or identifier on the item using the model of the item in the workspace or of the workspace. For example, sensor data based on information obtained from the vision system is analyzed to determine whether the item comprises an identifier or label on a visible side.

In some embodiments, in response to determining that the label or identifier is not visible on the surfaces of the item, the system can deem a non-visible surface (e.g., the bottom surface) to include the item and identifier. In some implementations, in response to determining that a label or identifier is not visible on the item, the robotic system can determine a mapping of probabilities to locations on the item at which the label may be located. For example, if one surface of the item is completely non-visible and another surface of the item is partially occulated by another item on the workspace, the robotic system can determine respective likelihoods that the item or label is located on a particular surface or in a particular area. The system may determine the location or the label or identifier based on the mapping of probabilities to locations on the item.

In some implementations, several similar items are singulated from the source pile/flow. The robotic system can build a model of an item based on markings (e.g., branding logos, labels, identifiers) on the item. For example, the robotic system may build a model that indicates for a particular item a certain logo is on a front of the package, and a label is on the reverse side. Accordingly, if label or identifier is not visible based on current information from the vision system, etc. but the logo is visible, the robotic system can determine the location of the label or identifier based on the determination of a location of the logo. The robotic system can use the model of the item or set of items to determine the location of the identifier or label based at least in part on determining the location of the logo, etc. As such, various embodiments use a model of an item that is based on historical information pertaining to similar items.

At 426, a path or trajectory of an item is determined based on a position of one or more scanners and the location of the identifier/label on the item. In some embodiments, the path or trajectory is determined to achieve a desired probability that the identifier/label on the item is successfully scanned. As an example, the path or trajectory may be determined to optimize the likelihood that the identifier/label is scanned. In some embodiments, the path or trajectory is determined to achieve a desired probability that the item is successfully singulated.

In some embodiments, the determining the path or trajectory includes determining a set of possible paths or trajectories of the item and determining corresponding probabilities that the particular path/trajectory would result in a successful scan. The robotic system may then select the path or trajectory along which the item is to be singulated from among the set of possible paths or trajectories. As an example, the robotic system selects the path or trajectory corresponding to a highest likelihood that the identifier/label is successfully scanned, or scoring function that takes into account the cost of singulating the item along the path or trajectory and the likelihood that the identifier/label is successfully scanned (e.g., provided that the selected path/trajectory satisfies a minimum threshold likelihood that the identifier/label is scanned). The robotic system can select the path or trajectory along which the item is to be singulated based at least in part on a relative probability that the identifier/label is expected to be successfully scanned (e.g., relative to the probabilities of other paths/trajectories in the set), and one or more of an amount of time to singulate the item according to a particular path/trajectory, an expected collision with another item/object along the path/trajectory, a probability that the item will be successfully singulated if moved along the particular path/trajectory, etc. The robotic system may select the path or trajectory according to a determination that the probability of successful scanning of the identifier/label is greater than a predefined threshold value.

At 427, a plan or strategy to singulate the item is determined based at least in part on the path or trajectory of the item. The plan or strategy can include one or more instructions used to operate a robotic structure to pick the item from the source pile/flow, to move the item from the source pile/flow to a selected location of the conveyor, and singly place the item on the conveyor. In some cases, the plan or strategy includes information from which the robotic structure can derive such instructions for singulating the item.

In some embodiments, the plan includes a strategy for grasping the item. For example, the strategy for grasping the item can include an indication of a side from which the item is to be grasped. The robotic system can use the model to determine a location of an identifier/label on the item, and determine the side from which the item is to be grasped based at least in part on the location of the identifier/label. The manner by which the item is grasped can be selected to ensure that the identifier/label is exposed to the one or more sensors for scanning the identifier/label. The strategy for grasping the item on a particular side can include repositioning/reconfiguring the item to allow for the end effector to engage the item on the particular side. For example, the strategy for grasping the item can include pulling the item from the source pile/flow or knocking the item over onto a different side, etc. to provide better access to the desired surface. As another example, the strategy for grasping the item can include a grasping strength (e.g., a pressure to be applied by the end effector). The grasping strength can be determined based at least in part on a weight of the item, a determination that the item is partially occluded and the picking of the item will experience resistance from the other items, a determination that the item may oscillate or sway during singulation, etc. As another example, the strategy for grasping the item can include an indication of a type of end effector or a particular end effector(s) among a plurality of end effectors, etc. to be used to singulate the item. The type of end effector may be selected based on a type of packaging of the item (e.g., to avoid slippage, tenting, etc.), a weight of the item, a location of the identifier/label on the item, etc.

In some embodiments, the plan includes a strategy for moving the item. As an example, the strategy for moving the item can include an indication of a speed at which the item is moved during singulation. In some cases, the speed can be impacted based on the path/trajectory of the item in relation to the location or path/trajectory of other items or objects in the workspace or on the conveyor, a speed at which the conveyor is moving, a slot/tray in which the item is to be singulated, the strategy for releasing the item (e.g., whether the item is to be "tossed" such as along a determined ballistic trajectory), etc. As another example, the strategy for moving the item can include an indication of one or more mechanisms to dampen oscillation (or swaying of the item) during singulation. The indications of the one or more mechanisms can include increasing the grasping strength, decreasing the speed of singulation, etc.

In some embodiments, the plan includes a strategy for releasing the item. For example, the plan can have a strategy to release all end effectors at the same time. As another example, the plan can have a strategy for staggering release of at least two different end effectors. In the case of suction-based end effectors, a staggered release of the end effectors can improve the speed by which the item is released because after a first end effector is released, the air flow can be reversed for that end effector and air can be dispersed therefrom. The reversed airflow serves to push the item from the other end effector(s) as such other end effector(s) are released (e.g., as pressure is ceased in the remaining end effector). In contrast, if the suction is removed at the same time across the end effectors, gravity acts on the item and release of the item is not immediate as the pressure takes a certain amount of (non-negligible) time to normalize. Accordingly, the staggered release of the end effectors can be a more efficient method for releasing an item (to the applicable location on the conveyor). In some embodiments, the strategy for releasing the item includes releasing all the end effectors at the same time and promptly reversing air flow in the suction-based system to emit air from the end effectors to push the item away from the end effector.

In some embodiments, the strategy for releasing the item includes moving the arm to a location from which the item is to be dropped, and thereafter releasing the end effectors (so that the item drops straight down to the selected location on the conveyor). In some embodiments, the strategy for releasing the item includes releasing the end effectors in a manner that serves to "toss" the item to the selected location on the conveyor. For example, the robotic system in various embodiments determines a ballistic trajectory based on a determination of a timing of releasing the end effectors while the robotic arm is moving so that a trajectory of the item will lead to the selected location on the conveyor (at the determined time so as to land within the applicable slot/tray on the moving conveyor). The strategy for releasing the item and/or the plan for the singulating the item using a ballistic trajectory may be determined based at least in part on a size of the item, such as a height of the item.

Figure 5A:
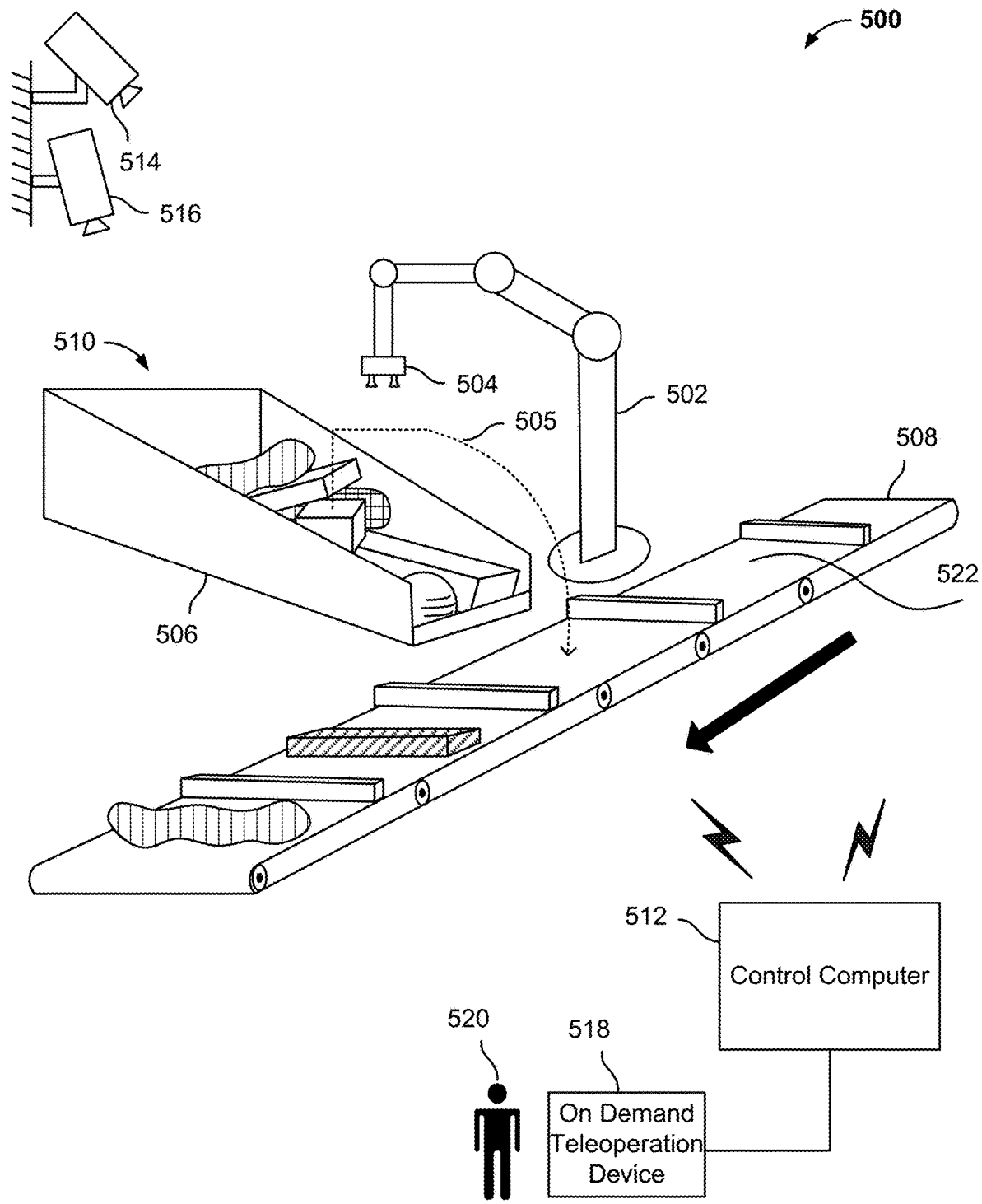
FIG. 5A is a diagram illustrating a robotic singulation system according to various embodiments.

FIG. 5A is a diagram illustrating a robotic singulation system according to various embodiments. In various embodiments, system 500 of FIG. 5A implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

In the example illustrated in FIG. 5A, system 500 includes a robotic arm 502 equipped with end effector 504. While in the example shown the end effector 504 is a suction-based end effector, in various embodiments, one or more other types of end effectors may be used in a singulation system as disclosed herein, including without limitation a pinch-based end effector or other types of actuated grippers. Robotic arm 502 and end effector 504 are configured to be used to retrieve parcels or other items that arrive via chute or bin 506 and place each item in a corresponding location on segmented conveyor 508. In this example, items are fed into chute 506 from an intake end 510. For example, one or more human and/or robotic workers may feed items into intake end 510 of chute 506, either directly or via a conveyor or other electro-mechanical structure configured to feed items into chute 506.

In the example shown, one or more of robotic arm 502, end effector 504, and conveyor 508 are operated in coordination by control computer 512. In some implementations, control computer 512 is configured to control a plurality of robotic arms operating at one or more workstations. System 500 can include one or more sensors from which an environment of the workspace is modeled. In the example shown in FIG. 5A, system 500 includes image sensors, including in this example 3D cameras 514 and 516. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, control computer 512 includes a workspace environment state system such as a vision system used to discern individual items, debris on the workspace, and each item's orientation based on sensor data such as image data provided by image sensors, including in this example 3D cameras 514 and 516.

According to various embodiments, in connection with singulating an item, system 500 determines a path/trajectory 505 for singulating the item. As illustrated in FIG. 5A, path/trajectory 505 starts from a location from which the item is to be picked, the path/trajectory along which the item is moved to conveyor 508, and a location and time at which the item is to be released to coincide in space and time with a slot, tray, or other destination selected as the location at which the item is to be placed on the destination conveyance structure, i.e., slot/tray 522 of conveyor 508 in this example. In some embodiments, system 500 determines a slot/tray 522 to which the item is to be singulated. Accordingly, the path/trajectory 505 is determined taking into account a location of the slot/tray 522 and the movement of conveyor 508. For example, system 500 determines the path/trajectory 505 to attain an intersection between the item to be singulated and the selected slot/tray 522 at a particular time. In various embodiments, system 500 reserves the slot/tray 522 to ensure that slot/tray 522 is unoccupied at the time the item is to be placed therein. For example, system 500 updates the distributed data structure to indicate that slot/tray 522 is occupied (or will be occupied). The updating the distributed data structure may include associating the routing data for the item with an identifier associated with the slot/tray. In various embodiments, the trajectory 505 includes a final, pre-release phase or stage in which the robotic arm 502 is operated to track and match a speed and direction of motion of conveyor 508, to maintain the item in position over the destination slot/tray 522 until the item is released.

Referring further to FIG. 5A, in the example shown, system 500 further includes an on-demand teleoperation device 518 usable by a human worker 520 to operate one or more of robotic arm 502, end effector 504, and conveyor 508 by teleoperation. In some embodiments, control computer 512 is configured to attempt to grasp and place items in a fully automated mode. However, if after attempting to operate in fully automated mode control computer 512 determines it has no (further) strategies available to grasp one or more items, in various embodiments, control computer 512 sends an alert to obtain assistance from a human operator via teleoperation, e.g., by human worker 520 using teleoperation device 518. In various embodiments, control computer 512 uses image data from cameras such as cameras 514 and 516 to provide a visual display of the scene to human worker 520 to facilitate teleoperation.

Figure 5B:
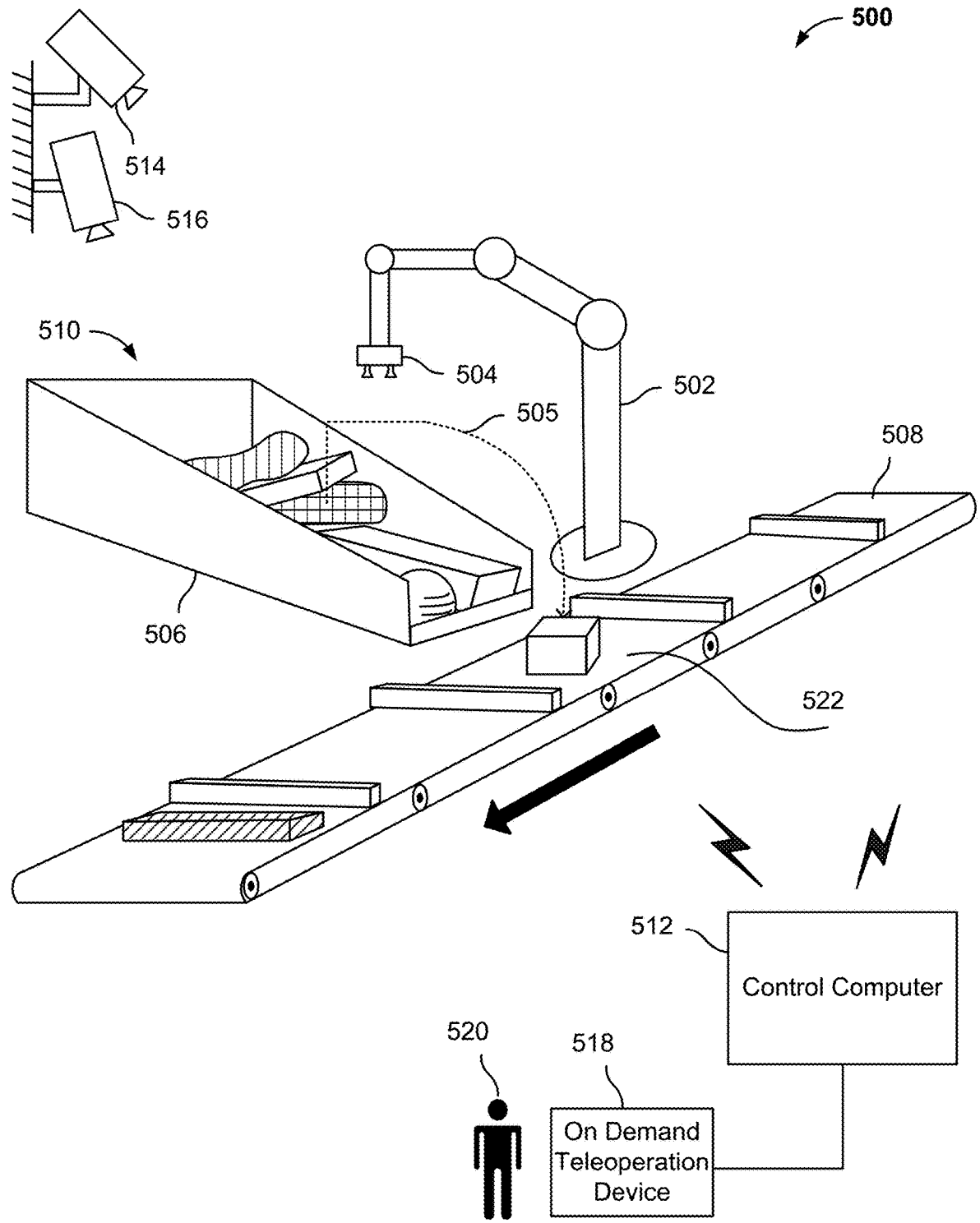
FIG. 5B is a diagram illustrating a robotic singulation system according to various embodiments.

FIG. 5B is a diagram illustrating a robotic singulation system according to various embodiments. In the example shown, the robotic singulation system of FIG. 5A has been advanced to a subsequent point in time to illustrate that the item has been picked from chute 506 and placed on slot/tray 522 of conveyor 508 according to the path/trajectory 505. System 500 models the workspace to include information pertaining to the items within chute 506 (including the item to be singulated) and information pertaining to conveyor 508. Accordingly, system 500 may determine the plan to singulate the item to a selected slot/tray 522 on conveyor 508.

Figure 6:
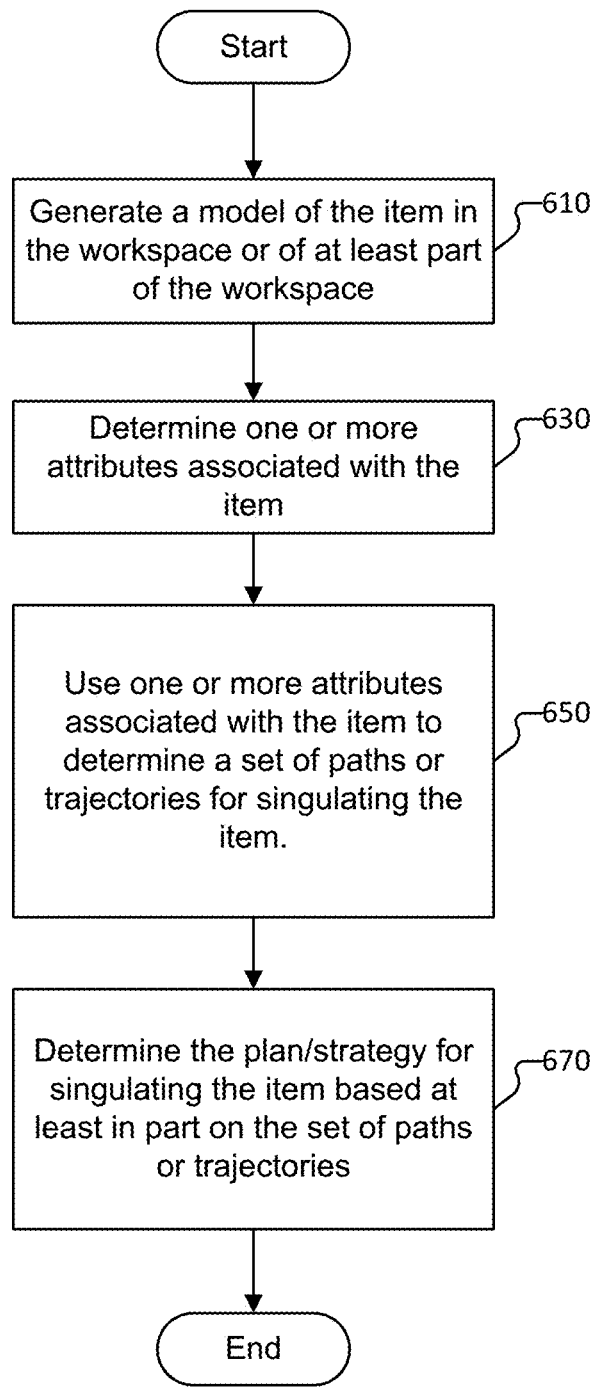
FIG. 6 is a diagram of a process to determine a plan or strategy to singulate one or more items using an attribute of an item within a workspace according to various embodiments.

FIG. 6 is a diagram of a process to determine a plan or strategy to singulate one or more items using an attribute of an item within a workspace according to various embodiments. Process 600 of FIG. 6 can be performed by system 200 of FIGS. 2A and 2B and/or system 500 of FIGS. 5A and 5B. In some embodiments, process 600 is implemented by a robot system operating to singulate one or more items within a workspace. The robot system includes one or more processors that operate to cause a robotic structure (e.g., a robotic arm) to pick and place items for sorting.

At 610, a model of the item in a workspace or of at least part of a workspace is generated. The mode of the item or the workspace may be generated in a similar manner to the model of 421 in process 420a of FIG. 4B, and/or the model of 424 in process 420b of FIG. 4C. In some embodiments, a global model of the workspace includes various models for different parts of the workspace, such as a model of the item in the workspace, a model of a conveyor, a model of other robotic arms within the workspace, etc.

At 630, one or more attributes associated with the item are determined. The one or more attributes associated with the item may be determined in a similar manner to the one or more attributes of 422 in process 420a of FIG. 4B, and/or the location of the label or identifier of 425 in process 420b of FIG. 4C.

At 650, the one or more attributes associated with the item are used in connection with determining a set of paths or trajectories for singulating the item. According to various embodiments, at least one of the set of paths or trajectories is determined in a similar manner to the path or trajectory of 426 of process 420b of FIG. 4C.

The path or trajectory along which an item is to be singulated is determined based at least in part on sensor data according to various embodiments. The robotic system may obtain a plurality of sensors that output information pertaining to the workspace, including the items or objects within the workspace. The sensor data is obtained based on the information output from one or more sensors and used in connection with determining a path or trajectory. In some embodiments, the path or trajectory is determined based at least in part on one or more attributes of the item to be singulated. Examples of attributes of the item include a weight, a size (e.g., one or more dimensions), a type of packaging, an identifier on the item, a location of an identifier or label on the item, a location of the item relative to the chute and/or conveyor, information obtained from the identifier or label on the item (e.g., routing data, such as a destination, a service class), etc. Various other attributes can be used in connection with determining the path or trajectory. Determination of the path or trajectory of the item may be further based at least in part on a location on the conveyor at which the item is to be placed, an attribute of an item(s) already on the conveyor, an attribute of an item within the workspace (e.g., an item within the source pile/flow), a grip strength with which the robotic arm has grasped the item, a speed with which the robotic arm is to move the item, etc.

According to various embodiments, a set of paths or trajectories for singulating an item is determined, and the path or trajectory along which the item is to be singulated is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be singulated, a location on the conveyor in which the item is to be singulated, a probability of success that the item is to be singulated according to the particular path or trajectory, an indication of whether another item or object within the workspace intersects with the particular path or trajectory, etc. In some embodiments, the probability of success that the item is to be singulated according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

At 670, the plan or strategy for singulating the item is determined based at least in part on the set of paths or trajectories. According to various embodiments, at least one of the set of paths or trajectories is determined in a similar manner to the plan of 423 of process 420*a* of FIG. 4B, and the plan of 427 of process 420*b* of FIG. 4C. The plan or strategy for singulating the item may be determined based at least in part on the path/trajectory selected from the set of paths or trajectories for singulating the item.

Figure 7A:
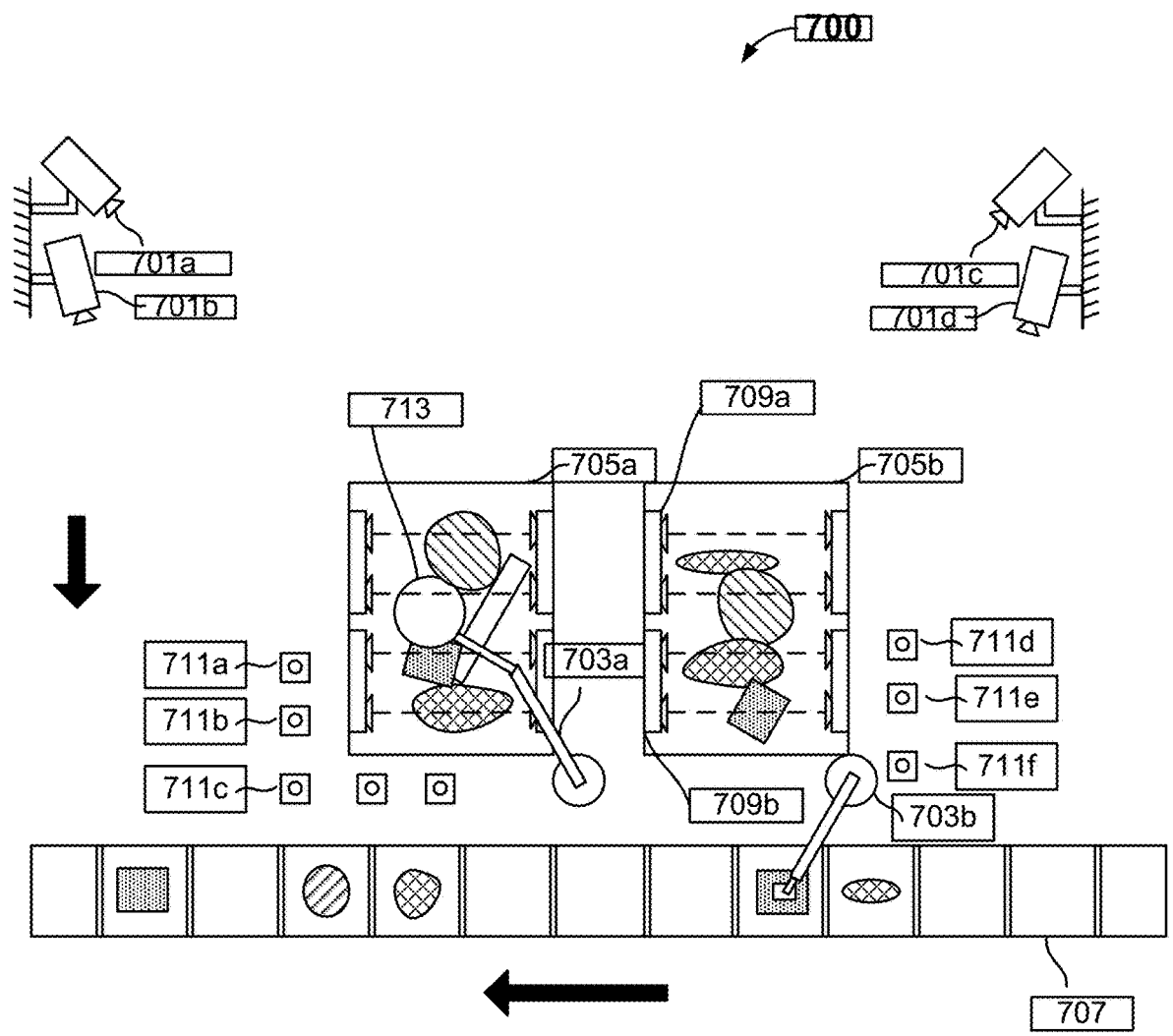
FIG. 7A is a diagram illustrating a robotic singulation system according to various embodiments.

FIG. 7A is a diagram illustrating a robotic singulation system according to various embodiments. In various embodiments, system 700 of FIG. 7A implements the hierarchical scheduling system 300 of FIG. 3, process 400 of FIG. 4A, process 420*a* of FIG. 4B, process 420*b* of FIG. 4C, process 600 of FIG. 6, process 850 of FIG. 8B, and process 875 of FIG. 8C.

In various embodiments, a robotic system comprising one or more robotic arms performs singulation/induction that includes performing one or more active measures in response to a detected state or condition associated with one or more items in the workspace of the robotic system or changing or updating the plan for singulating an item in response to determining an attribute associated with an item or an attribute associated with another item or object within the workspace. The robotic system may include one or more robotic arms each having one or more end effectors. In the example shown in FIG. 7A, system 700 includes a robotic arm 703*a* that is operated to singulate one or more items within chute 705*a* to conveyance structure 707, and robotic arm 703*b* operates to singulate one or more items within chute 705*b* to conveyance structure 707.

In various embodiments, system 700 may include one or more sensors from which an environment of the workspace is modeled. In the example shown in FIG. 7A, system 700 includes image sensors, including in this example 3D cameras 701*a*, 701*b*, 701*c*, and 701*d*. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As illustrated in FIG. 7A, system 700 includes one or more sensors arrays disposed within or around the chutes 705*a* and 705*b*. For example, chute 705*b* includes sensor arrays 709*a* and 709*b*. According to various embodiments, one or more of sensor arrays 709*a* and 709*b* include a vertical array of sensors. System 700 may include one or more sensors or sensor arrays disposed around the workspace. In the example shown, system 700 includes sensors 711*a*, 711*b*, and 711*c* disposed around chute 705*a*, and sensors 711*d*, 711*e*, and 711*f* disposed around the workspace (e.g., chute 705*b*). According to various embodiments, system 700 includes one or more sensor arrays disposed at conveyance structure 707. For example, a sensor array may be disposed at the conveyance structure in a manner that a signal (e.g., an IR beam) is emitted across the conveyance structure.

In various embodiments, a control computer (not shown) includes a workspace environment state system such as a vision system used to discern individual items, debris on the workspace, and the orientation of each item based on sensor data such as image data provided by image sensors, including in this example 3D cameras 701*a*, 701*b*, 701*c*, and 701*d*, and sensor arrays 709*a* and 709*b*. The workspace environment state system may also include sensors in the robotic arm to detect a weight of an item (e.g., a grasped item) or to detect information from which an estimated weight is determined. For example, information pertaining to an amount of current, voltage, and/or power used by one or more motors driving movement of the robotic arm may be used to determine the weight (or an estimated weight) of the item. As another example, information pertaining to an output from one or more sensor arrays (e.g., sensor arrays 709*a* and 709*b*) can be used to determine a location of the item in the workspace, a location of the item while the item is grasped and/or being moved by the robotic arm, and/or a location of the robotic arm (e.g., based on a determination of an output from a subset of sensors of the one or more sensor arrays compared to another subset of sensors of the one or more sensor arrays).

Information output from sensors within a workspace and/or a chute may be used to determine a location and/or characteristic (e.g., attribute) of one or more items such as item 713 in chute 705*a*. According to various embodiments, information output from sensor arrays 709*a* and/or 709*b* is used to determine a location and/or characteristic (e.g., attribute) of one or more items within chute 705*b*. The height of an item within chute 705*b* may be determined based at least in part on a determination of a set of sensors within sensor arrays 709*a* and/or 709*b* that are tripped by the item. In some embodiments, system 700 determines that an item within chute 705*b* is arranged such that its longest side is perpendicular (e.g., orthogonal) to the surface of the chute, and that singulation of the item would be improved if the item was grasped by a different side. Accordingly, system 700 determines and implements a plan including an active measure to rearrange the item such that the longest side thereof is parallel with surface of the chute (e.g., to knock the item over using robotic arm 703*b*, a blowing mechanism, etc.). In various embodiments, system 700 is configured to implement an active measure to rearrange an item within chute 705*b* if the height of the item is greater than a predefined height threshold. The item may be reconfigured or repositioned (e.g., by the robot or by another element within system 700) to improve the ease/access for the end effector to engage with a desired surface of the item, or to clear the item from occulting another item that is to be singulated.

According to various embodiments, the workspace environment state system produces output used by system 700 to determine and implement a plan to autonomously operate robotic arm 703*a* and/or robotic arm 703*b* to pick one or more items from chute 705*a* and/or chute 705*b* and place each in a corresponding available defined location for machine identification and sorting, such as a partitioned section of segmented conveyance structure 707. The workspace environment state system produces an output (e.g., sensor data or information otherwise characterizing the workspace and items within the workspace) used by system 700 to detect a state/condition or attribute associated with one or more items in the workspace, and/or a state/condition or attribute associated with the robotic arm or other element of the workspace. In response to detecting (e.g., determining) the state/condition or attribute associated with one or more items in the workspace, system 700 determines to implement a plan to singulate the item, which may include one or more active measures to improve singulating an item. As an example, the active measure includes updating the plan to autonomously operate a robotic structure to pick one or more items from the workspace and place each item singly in a corresponding location in a singulation conveyance structure. As another example, the active measure or the updating the plan includes operating the robotic structure to change or adapt to the detected state/condition or attribute of the item (e.g., implement a change with respect to a manner by which an item is singulated, implement to reconfigure items within the source pile/flow to make grasping a selected item easier, operate to reposition the robotic arm or end effector to increase the ability to grasp the item, etc.). As another example, the active measure includes updating the plan to comprise the robotic arm moving or re-orienting the item to enable the rescanning of the item, such as by moving the item within a detection range of a particular sensor, etc.

The output used by system 700 may correspond to sensor data including image data associated with a plurality of items present in a workspace. In various embodiments, system 700 uses the sensor data to identify items within the workspace (e.g., within chute 705a and/or chute 705b) that cannot be singulated. For example, system 700 may identify predefined items that are mapped to types of items that cannot be singulated (or that are difficult to be singulated). As another example, system 700 identifies items within chute 705a and/or chute 705b for which a plan or strategy to singulate from chute 705a and/or chute 705b to conveyance structure 707 cannot be determined. In response to determining an item that cannot be singulated, system 700 operates to implement an active measure. The active measure implemented in response to determining that the item cannot be singulated may include removing the item from the corresponding workspace, invoking human intervention (e.g., alerting a human operator), etc. In some embodiments, in response to determining that an item within chute 705a and/or chute 705b cannot be singulated, system 700 operates robotic arm 703a and/or 703b to move the item to a designated location. As an example, the designated location may be a rejected items bin or other area at which items are stored for handling outside the singulation process. Examples of items that may be identified as not to be singulated include items having a particular shape (e.g., a poster tube), items for which system 700 cannot locate a label or other predefined identifier to be scanned, items having a predefined identifier on a side thereof (e.g., a label indicating that the item comprises a fragile object therein, a label indicating that the item is not to be stacked, a label indicating that the item comprises hazardous matter, etc.), items for which a label cannot be read (e.g., the label is occluded or otherwise comprises markings that renders the label unreadable), etc.

In some embodiments, the chute in the corresponding workspace (e.g., workspace for chute 705a or chute 705b) comprises a weight sensor. System 700 may determine a weight of an item to be singulated based on determining a difference between a weight measured by the weight sensor in the chute before the item is grasped by the robotic arm and a weight measured by the weight sensor after the item is grasped (and moved completely off the chute). In response to determining the weight of the item, system 700 may use the item in connection with determining whether to implement an active measure in connection with singulating the item, and if so, to implement the active measure. For example, in response to determining the weight, system 700 can update the path or trajectory of the item according to the corresponding plan or strategy for singulating the item. If the weight of the item is greater than a predefined weight threshold, system 700 can update the plan to singulate the item based on the weight of the item. In some cases, if the weight of the item exceeds a weight threshold, the robotic arm is operated to partially lift the item from the chute and the robotic arm is operated to drag the item to conveyance structure 707.

Figure 7B:
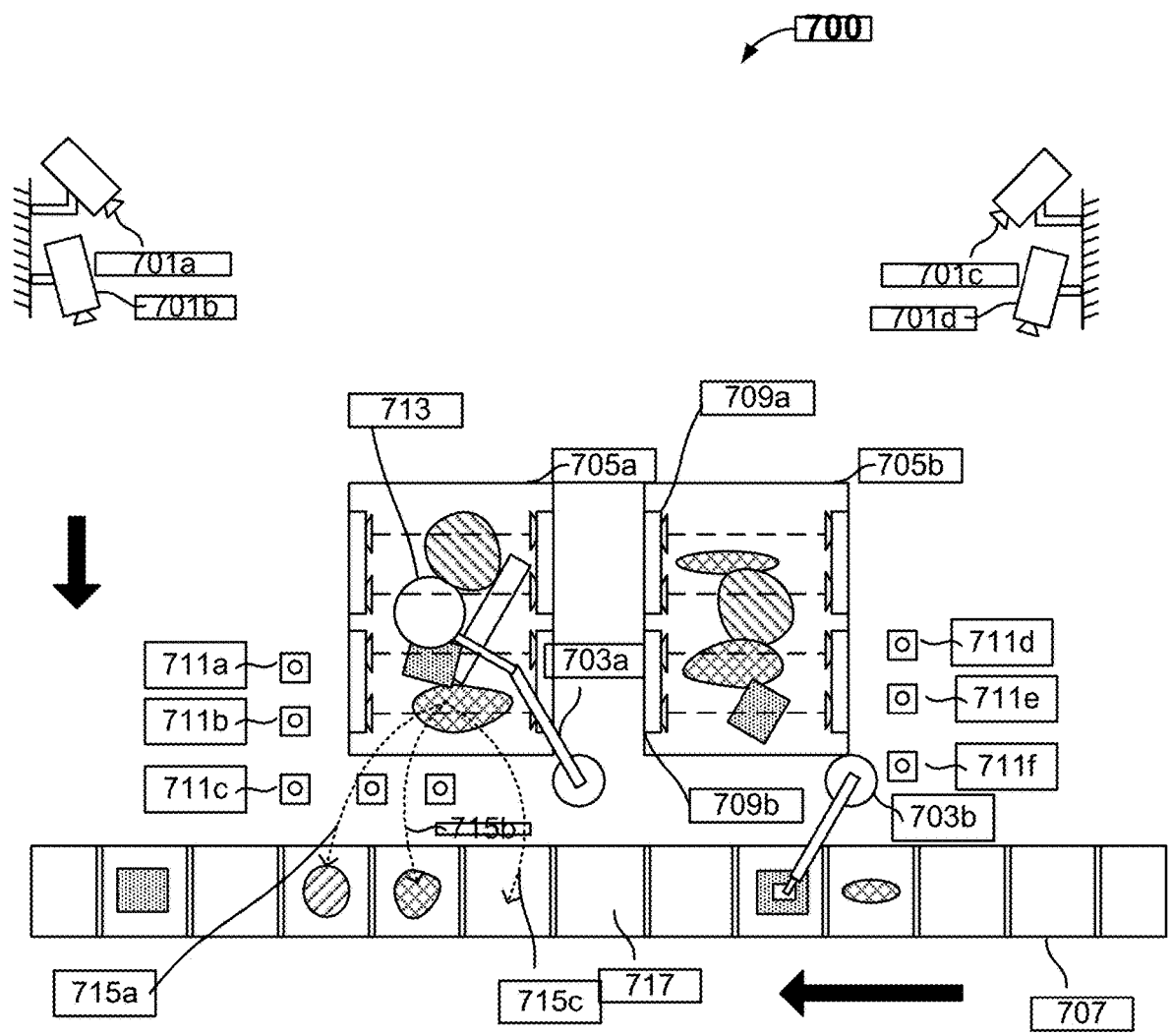
FIG. 7B is a diagram illustrating a robotic singulation system according to various embodiments.

FIG. 7B is a diagram illustrating a robotic singulation system according to various embodiments. In the example shown, system 700 of FIG. 7A has been expanded to illustrate that the one or more paths/trajectories for singulating an item from chute 705a to conveyance structure 707 can be determined. System 700 can further implement a plan to pick the item from chute 705a and place the item on slot/tray 717 of conveyance structure 707 according to a selected path/trajectory. System 700 models the workspace to include information pertaining to the items within chute 705a (including the item to be singulated) and information pertaining to conveyance structure 707 (e.g., a location of a slot/tray, an occupied/unoccupied status of a particular slot/tray, a speed of the conveyor, etc.). Accordingly, system 700 may determine the plan to singulate the item to a selected slot/tray 717 on conveyance structure 707 based on a path/trajectory defined or otherwise specified in the plan to singulate the item.

As illustrated in FIG. 7B, system 700 may determine that the item can be singulated along path/trajectory 715a, path/trajectory 715b, and path/trajectory 715c. For example, system 700 may determine the paths/trajectories for singulating the item to a selected slot/tray 717 to different positions of slot/tray 717 (e.g., the location of the slot/tray 717 is dynamic as the conveyor moves during singulation). According to various embodiments, system 700 selects one of the paths/trajectories along which to singulate the item, and determines a plan based at least in part on the selected path/trajectory. In connection with determining the plan, system 700 may obtain a speed of the conveyor, a location of the selected slot/tray 717, and thus determine a speed and timing for singulating the item along the selected path/trajectory.

Figure 7C:
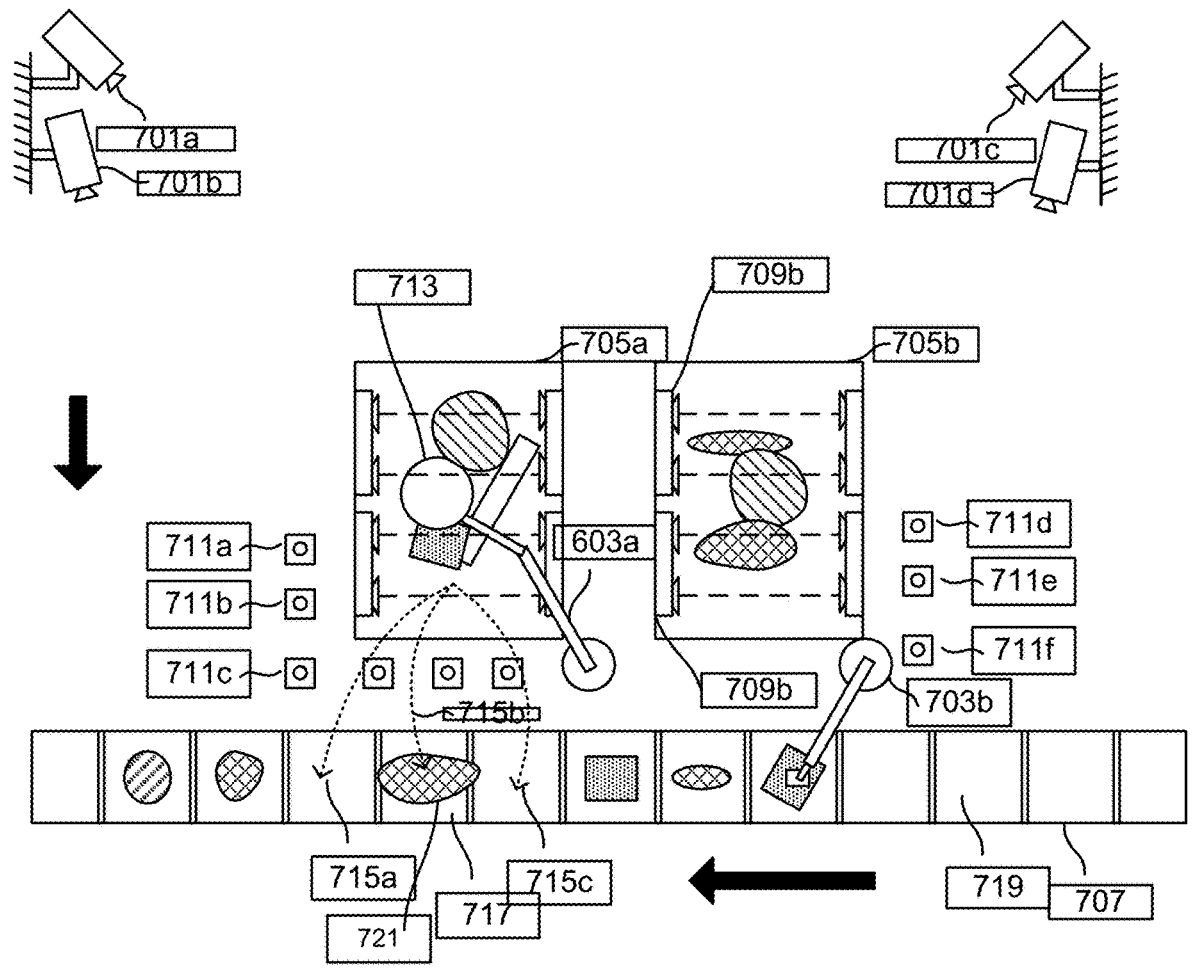
FIG. 7C is a diagram illustrating a robotic singulation system according to various embodiments.

FIG. 7C is a diagram illustrating a robotic singulation system according to various embodiments. In the example shown, system 700 of FIGS. 7A and 7B has been expanded to illustrate that item 721 was singulated from chute 705a to slot/tray 717 on the conveyance structure 707. Item 721 was picked from chute 705a, moved along path/trajectory 715b, and singly placed in slot/tray 717.

Figure 7D:
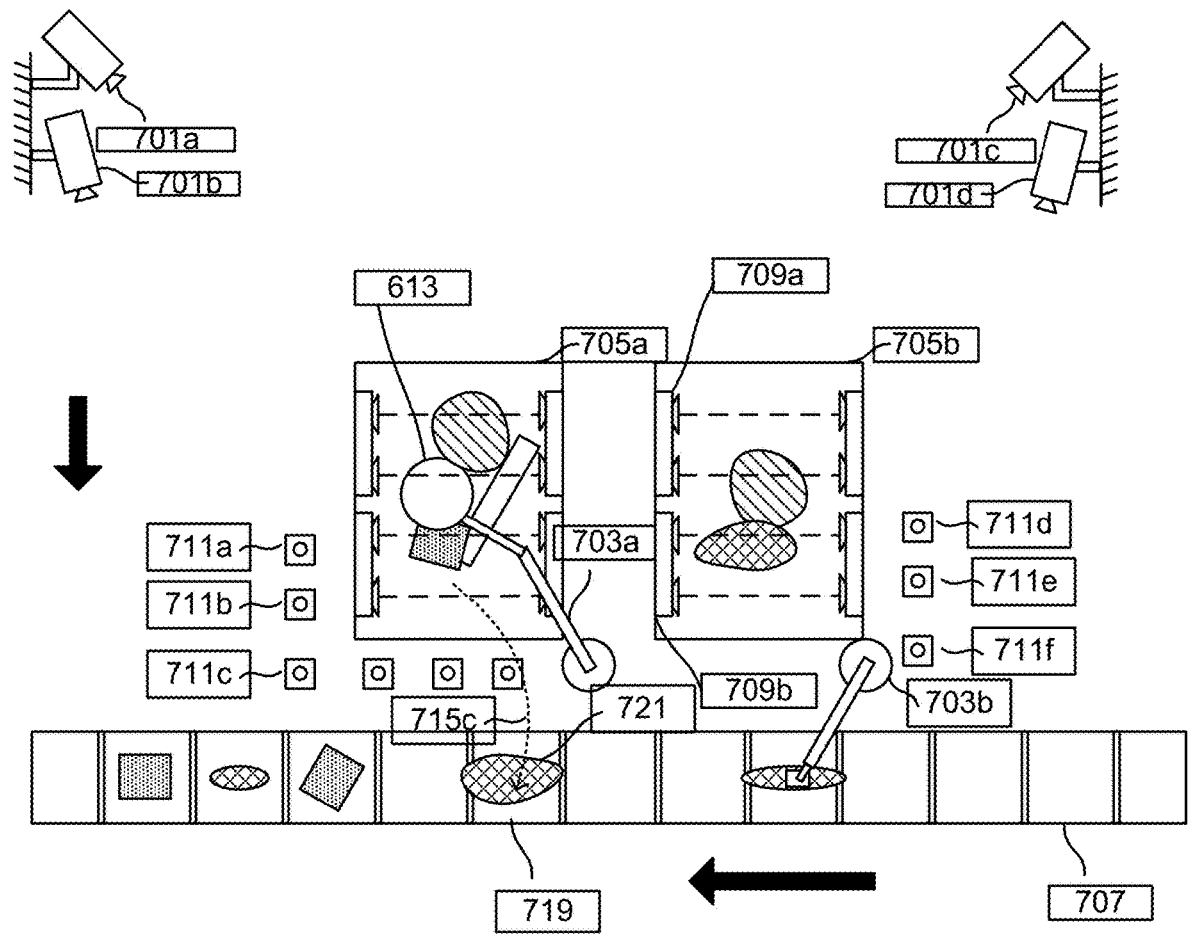
FIG. 7D is a diagram illustrating a robotic singulation system according to various embodiments.

FIG. 7D is a diagram illustrating a robotic singulation system according to various embodiments. In the example shown, system 700 of FIGS. 7A and 7B has been expanded to illustrate that item 721 was singulated from chute 705a to a different slot/tray 719 on the conveyance structure 707. Item 721 was picked from chute 705a, moved along path/trajectory 715c, and singly placed in slot/tray 719.

According to various embodiments, system 700 may select a different slot/tray at which the item is to be singulated in response to determining a state or condition of the item or workspace, or in response to determining a particular attribute associated with the item, another item within the workspace, or the workspace. For example, in response to picking up item 721, system 700 may determine that robotic arm 703a cannot move item 721 as quickly as expected according to the plan for singulation. In response to such a determination, system 700 may select a new slot/tray 719 within which the item is to be placed. In various embodiments, the new slot/tray is a slot/tray that is upstream on the conveyance structure 707 from the originally selected slot/tray 717.

In some embodiments, system 700 determines to select a new tray in response to determining a state/condition of the item or workspace, or in response to determining an attribute of the item. As example, system 700 determines to singulate item 721 to slot/tray 719 in response to picking up item 721 and determining a weight thereof. System 700 may determine that item 721 was too heavy to move at a speed necessary to place the item at slot/tray 717. As another example, system 700 determines to singulate item 721 to slot/tray 719 in response to determining that slot/tray 717 was occupied with an item, or in response to system 700 receiving an indication of a fault from a global scheduler that slot/tray 717 has been reserved by another robot. Various other instances in which system 700 may determine to singulate the item to a new slot/tray include a determination that a slot adjacent or within a threshold proximity of slot/tray 717 has another item or an item having a size that exceeds a predefined size threshold; a determination that a slot adjacent or within proximity of slot/tray 717 has an item that would block sensors within the workspace from reading a label or identifier on the item; etc.

Figure 8A:
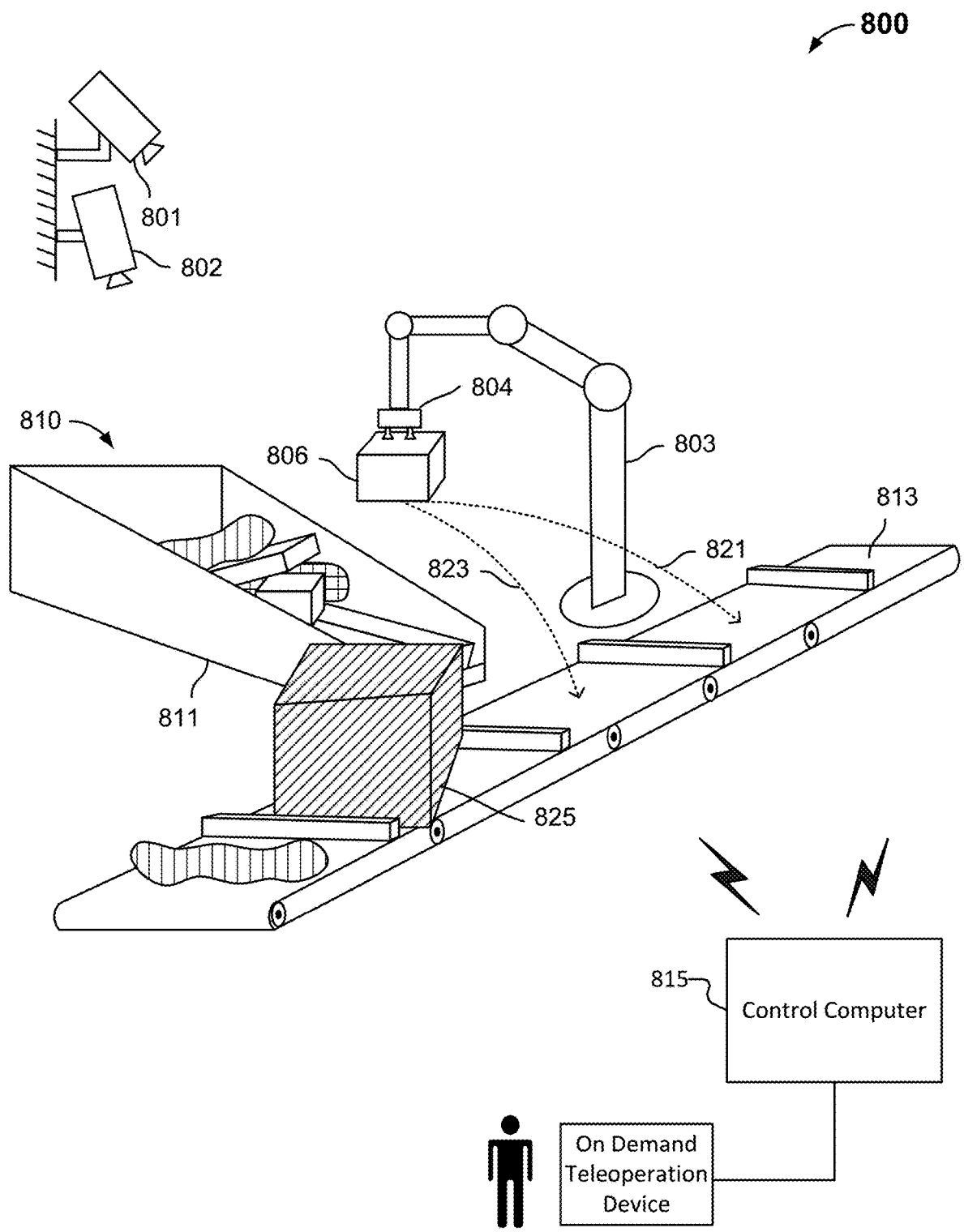
FIG. 8A is a diagram illustrating a robotic singulation system according to various embodiments.

FIG. 8A is a diagram illustrating a robotic singulation system according to various embodiments. In various embodiments, system 800 of FIG. 8A implements the hierarchical scheduling system 300 of FIG. 3, process 400 of FIG. 4A, process 420*a* of FIG. 4B, process 420*b* of FIG. 4C, process 600 of FIG. 6, process 850 of FIG. 8B, and process 875 of FIG. 8C.

The example illustrated in FIG. 8A illustrates system 800 determining to singulate item 806 according to a new path 821 based on a slot adjacent to the slot at which path 823 terminates having a relatively large item 825. In response to determining that item 825 is a relatively large item (e.g., exceeds a predetermined size, or has at least one dimension that exceeds a threshold), system 800 determines to not place item 806 adjacent to item 825, and determines new path 821 to singulate item 806. Robotic arm 803 is operated to grasp item 806 using end effector 804 and to move item 806 according to new path 821. In some implementations, system 800 determines to singulate item 806 into a different slot if the item to be singulated would block sensors from obtaining information from an item already placed on conveyance structure 813.

System 800 may include one or more sensors from which an environment of the workspace 810 is modeled. In the example shown in FIG. 8A, system 800 includes image sensors, including in this example 3D cameras 801 and 802. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As an example, system 800 may include one or more sensors arrays disposed within or around chute 811. System 800 may include one or more sensors or sensor arrays (not shown) disposed around the workspace.

According to various embodiments, system 800 includes one or more sensor arrays disposed at conveyance structure 813. For example, a sensor array can be disposed at the conveyance structure in a manner that a signal (e.g., an IR beam) is emitted across the conveyance structure. In various embodiments, a control computer (not shown) includes a workspace environment state system such as a vision system used to discern individual items, debris on the workspace, and the orientation of each item based on sensor data such as image data provided by image sensors, including in this example 3D cameras 801 and 802. The vision system may also include one or more sensors and/or sensors arrays (not shown). The one or more sensors or sensor arrays may obtain information from which sensor data pertaining to item 825 is determined. For example, the sensors/sensor arrays detect a size of item 825. The height of an item within chute 811 or on conveyance structure 813 may be determined based at least in part on a determination of a set of sensors within sensor arrays that are tripped by the item. In some embodiments, system 800 determines that item 825 is relatively large based on information stored in the distributed data structure in association with the slot in which item 825 is located.

According to various embodiments, the workspace environment state system produces output used by system 800 to determine and implement a plan to autonomously operate robotic arm 803 to pick one or more item 806 from chute 811 and place item 806 in a corresponding available defined location for machine identification and sorting, such as a partitioned section of segmented conveyance structure 813. In some embodiments, the workspace environment state system produces an output (e.g., sensor data or information otherwise characterizing the workspace and items within the workspace) used by the robotic system to detect a state/condition or attribute associated with one or more items in the workspace, and/or a state/condition or attribute associated with the robotic arm or other element of the workspace. According to various embodiments, in response to detecting (e.g., determining) the state/condition or attribute associated with one or more items in the workspace, the robotic system determines to implement a plan to singulate the item, which may include one or more active measures to improve singulating an item. As illustrated in the example of FIG. 8A, the active measure includes selecting a new path 821 along which item 806 is to be singulated. The active measure may include updating the plan to autonomously operate a robotic structure to pick one or more items from the workspace and place each item singly in a corresponding location in a singulation conveyance structure. In some embodiments, the active measure or the updating the plan includes operating the robotic structure to change or adapt to the detected state/condition or attribute of the item (e.g., implement a change with respect to a manner by which an item is singulated, implement to reconfigure items within the source pile/flow to make grasping a selected item easier, operate to reposition the robotic arm or end effector to increase the ability to grasp the item, etc.).

Figure 8B:
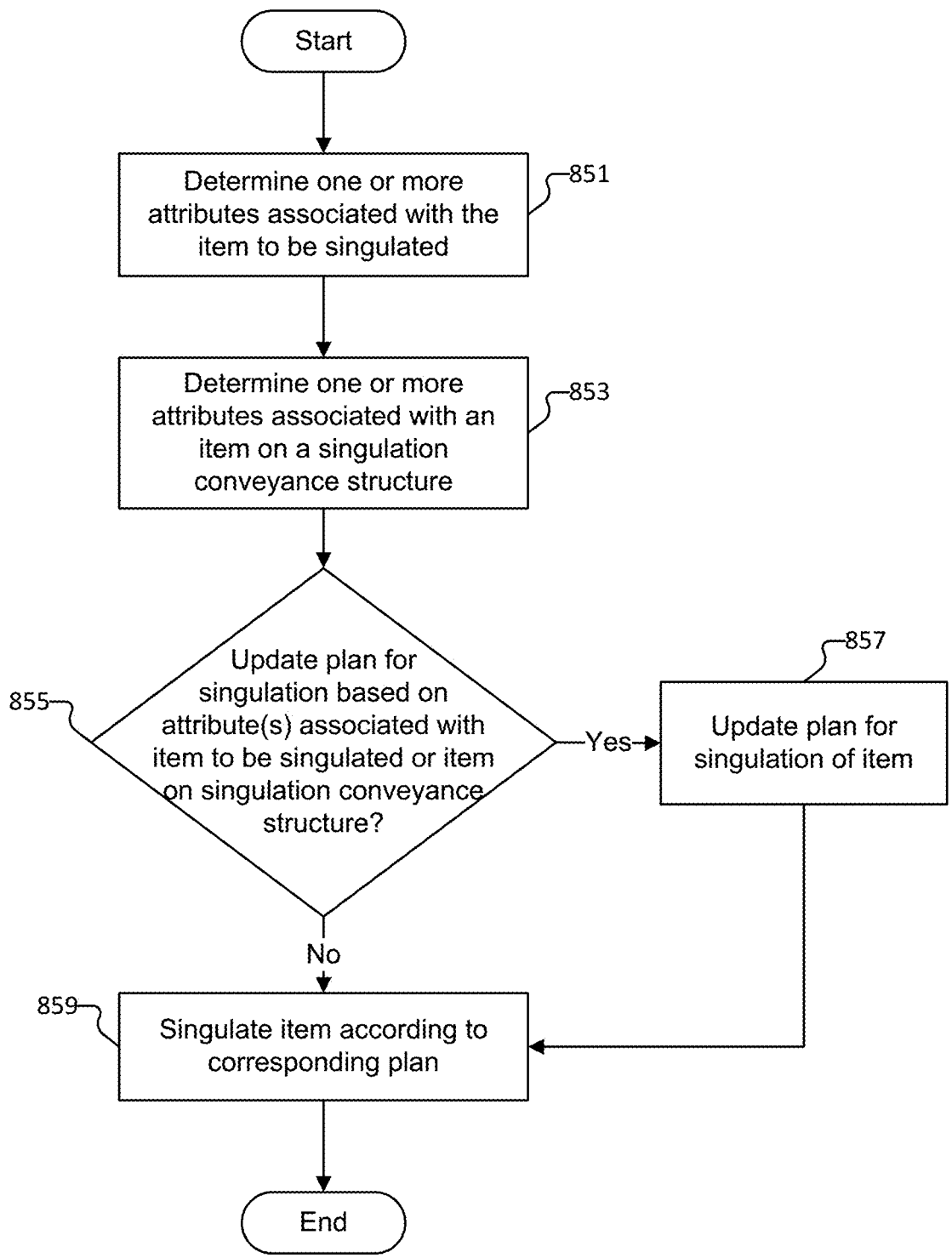
FIG. 8B is a diagram of a process to determine a plan or strategy to singulate one or more items using an attribute of an item within a workspace according to various embodiments.

FIG. 8B is a diagram of a process to determine a plan or strategy to singulate one or more items using an attribute of an item within a workspace according to various embodiments. Process 850 of FIG. 8B may be performed by system 200 of FIG. 2A and FIG. 2B, system 500 of FIGS. 5A and 5B, and/or system 800 of FIG. 8A. In some embodiments, process 850 is implemented by a robot system operating to singulate one or more items within a workspace. The robot system includes one or more processors that operate to cause a robotic structure (e.g., a robotic arm) to pick and place items for sorting.

At 851, one or more attributes associated with the item are determined. The one or more attributes associated with the item may be determined in a similar manner to the one or more attributes of 422 in process 420*a* of FIG. 4B, and/or the location of the label or identifier of 425 in process 420*b* of FIG. 4C. According to various embodiments, the one or more attributes associated with the item are determined after the item has been picked from the source pile/flow. For example, information obtained from one or more sensors/sensor arrays is used in connection with determining the one or more attributes. Examples of attributes that may be determined after the item is picked from the source pile/flow include a weight of the item, a size of the item, a location of an identifier/label on the item, etc.

At 853, one or more attributes associated with an item on a singulation conveyance structure are determined. The system determines one or more attributes associated with the item based at least in part on sensor data using information obtained by sensors in the workspace, or based on information stored in a distributed data structure (e.g., such information stored in association with the slot in which the item is located on the conveyor). As an example, the sensor data may include an image, and the determining the one or more attributes includes processing the image, such as performing OCR with respect to text comprised in the image, and determining the attribute(s) (e.g., routing data) from the text.

According to various embodiments, in response to determining a plan to singulate the item and after beginning to implement the plan, the system obtains the one or more attributes associated with the item. During singulation of the item, the system may dynamically receive information associated with the item and the workspace based at least in part on information received by sensors within the workspace. As an example, in response to picking up the item, the system may determine a weight of the item based at least in part on one or more of a measure of a change in weight on the chute after the item is removed from the chute, a force sensor coupled to the robotic arm, an amount of work/power required by the robotic arm to pick up or move the item, etc. As another example, in response to picking up the item, a label or identifier on the item can be located using information received from the vision system.

According to various embodiments, the one or more attributes associated with an item on the singulation conveyance structure (e.g., conveyor) are determined based on information stored in a distributed data structure. For example, in response to (or in connection with) a robotic arm placing the item on the conveyor, the system updates the distributed data structure with one or more attributes associated with the item, and associates such information with the slot of the conveyor in which the item is placed. As another example, after the item is placed on the conveyor, one or more sensors along the conveyor or otherwise within the workspace obtain information pertaining the item, such as routing data (e.g., destination data, service class, etc.). Attributes associated with the item can be obtained from such information, and the distributed data structure is correspondingly updated.

At 855, a determination of whether to update the plan for singulation of the item to be singulated is made. According to various embodiments, the system (e.g., a robotic system) determines whether to update the plan based at least in part on one or more attributes associated with the item and/or one more attributes associated with an item on the conveyor.

In some embodiments, the system determines, based on the attributes, that singulation of the item is expected to be more successful or more efficient if the plan is updated. Similarly, the system can determine that singulation of the item is expected to be impeded along a current path, and that singulation along a new path would improve singulation of the item. As an example, the system determines that a relatively large item is located in a slot within a predefined proximity (e.g., an adjacent slot) to a location at which the item is to be singulated, and thus determine to update the plan to change a location at which the item is to be singulated. The relatively large item could block sensors from reading information on another item, or otherwise obtaining information pertaining to such other item. In addition, the relatively large item may impede the robotic arm while placing the item in the initial location. As another example, the system determines that the speed at which the robotic arm would have to move the item in order to singulate the item in the initially planned location may increase the chance of a singulation failure (e.g., misplaced item, dropping of the item, etc.), and in response to such a determination, the system determines to use another slot further upstream to allow the robotic arm to operate at a relatively slower speed.

In response to determining to update the plan for singulation at 855, process 850 proceeds to 857 at which the plan for singulation of the item is updated. The system provides to a robotic arm updated instructions for carrying out singulation of the item, such updated instructions corresponding to the updated plan. In some embodiments, in response to updating the plan, the system provides information pertaining to the plan to the global scheduler and/or updates the distributed data structure accordingly. According to various embodiments, the updating of the plan includes one or more of updating the path for singulation of the item, changing to a new slot in which the item is to be singulated, a strategy for releasing the item to the desired location, a speed at which the robotic arm is to move the item, etc.

Conversely, in response to determining not to update the plan for singulation of the item at 855, process 850 proceeds to 859 at which the item is singulated according to the corresponding plan. According to various embodiments, the robotic system operates the robotic arm according to the plan in order to singulate the item based at least in part on the plan. In some embodiments, singulation of the item in 859 corresponds to 430 of process 400 of FIG. 4A.

Figure 8C:
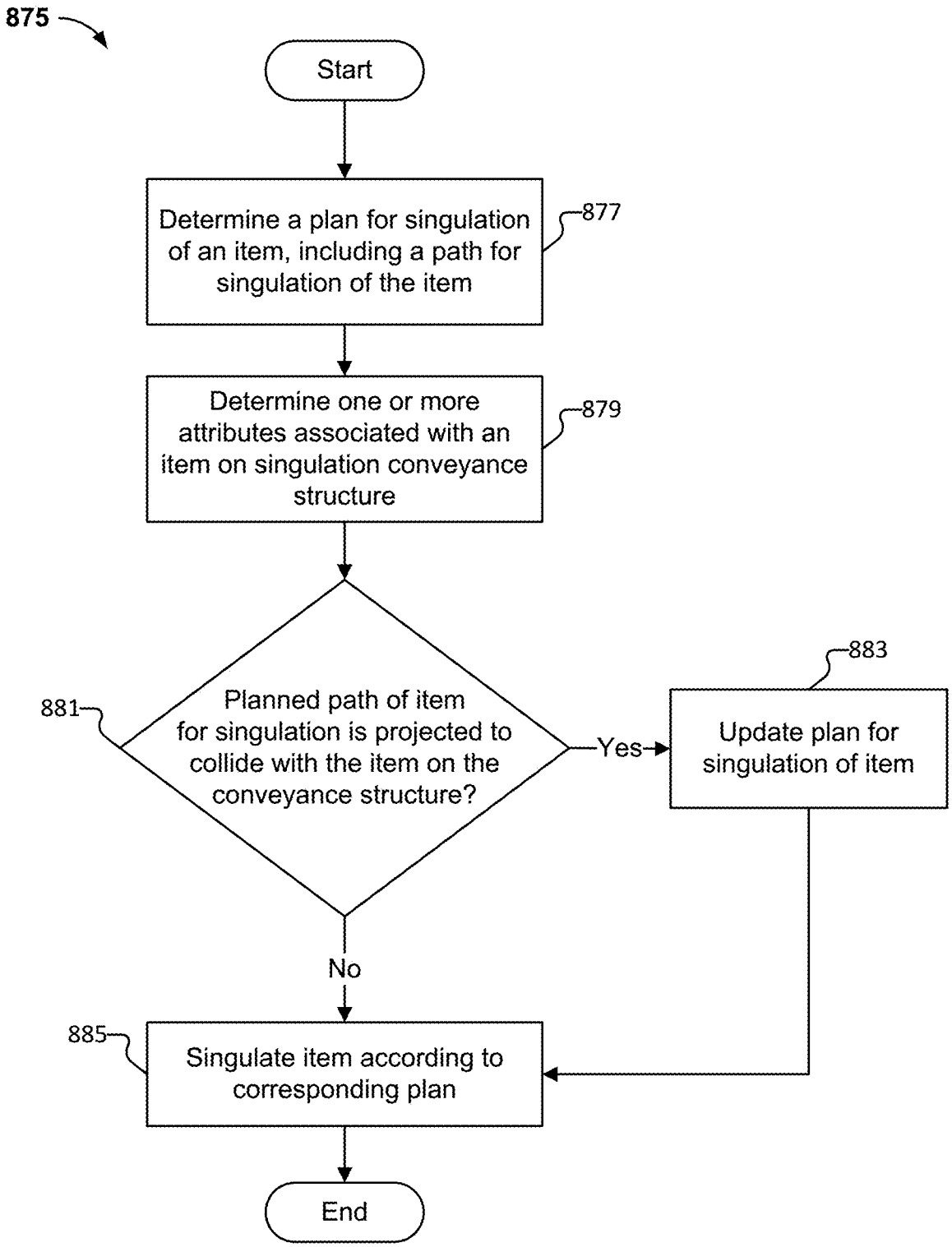
FIG. 8C is a diagram of a process to determine a plan or strategy to singulate one or more items using an attribute of an item within a workspace according to various embodiments.

FIG. 8C is a diagram of a process to determine a plan or strategy to singulate one or more items using an attribute of an item within a workspace according to various embodiments. Process 875 of FIG. 8C may be performed by system 200 of FIG. 2A and FIG. 2B, system 500 of FIGS. 5A and 5B, and/or system 800 of FIG. 8A. In some embodiments, process 875 is implemented by a robotic system operating to singulate one or more items within a workspace. The robotic system includes one or more processors that operate to cause a robotic structure (e.g., a robotic arm) to pick and place items for sorting.

At 877, a plan for singulating an item is determined. The plan includes an expected path along which the item is to be moved during singulation of the item.

At 879, one or more attributes associated with an item on a singulation conveyance structure are determined. In various embodiments, the system determines the one or more attributes associated with the item based on sensor data using information obtained by sensors in the workspace, or based on information stored in a distributed data structure (e.g., such information stored in association with the slot in which the item is located on the conveyor). The one or more attributes associated with the item may be determined in a similar manner to the attributes of 853 of process 850 of FIG. 8B, the attributes of 422 of process 420a of FIG. 4B, and/or the location of the label or identifier of 425 in process 420b of FIG. 4C.

At 881, a determination is made as to whether the path of the item is projected to collide with the item on the conveyance structure. According to various embodiments, the system determines whether the item is projected to collide with the item on the conveyance structure (e.g., conveyor) based at least in part on the path included in the plan, and on the one or more attributes associated with the item on the conveyor. The system may further determine whether the item is expected to collide with the item on the conveyor based on one or more attributes of the item being singulated.

In some embodiments, the system determines whether the item being singulated (or the robotic structure) is expected to intersect with the item on the conveyor at a point in time while the item is moving along the planned path. The system may use the speed of the conveyor, the location of the item on the conveyor, a size of the item on the conveyor, etc. in connection with determining whether the path of the item is projected to collide with the item on the conveyor. The size of the item being singulated may also be determined by the system and used in connection with determining whether a collision is expected.

In some implementations, the determining whether the path of the item is projected to collide with the item on the conveyance structure includes determining whether the item being singulated will be moved within a predetermined proximity threshold of the item on the conveyor. The system may implement a buffer to avoid moving the item being singulated too close to the item on the conveyor. In response to a determination that the item being singulated will, at any point along the path, be moved within the predetermined proximity threshold of the item on the conveyor, the system determines that the path of the item is projected to collide with the item on the conveyance structure.

In response to determining that the path of the item is projected to collide with the item on the conveyor at 881, process 875 proceeds to 883 at which the plan for singulating the item is updated. The updating the plan for singulating the item at 883 may correspond to the updating of the plan at 857 of process 850 of FIG. 8B.

Conversely, in response to determining that the path of the item is not projected to collide with the item on the conveyor at 881, process 875 proceeds to 885 at which the item is singulated according to the corresponding plan. According to various embodiments, the robotic system operates the robotic arm according to the plan in order to singulate the item based at least in part on the plan. In some embodiments, singulation of the item in 885 corresponds to 430 of process 400 of FIG. 4A and/or singulation of the item in 859 of process 850 of FIG. 8B.

Figure 9:
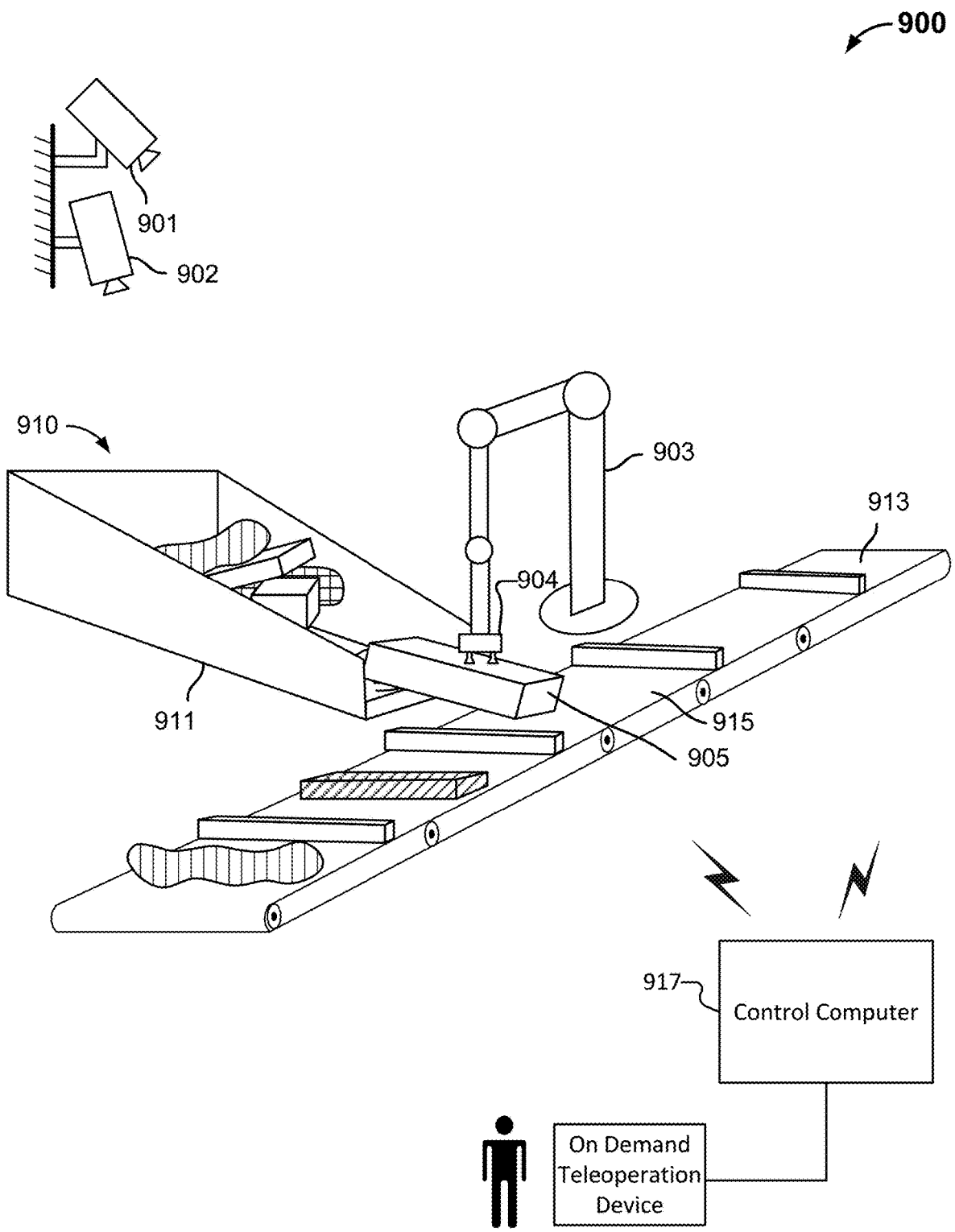
FIG. 9 is a diagram illustrating a robotic singulation system according to various embodiments.

FIG. 9 is a diagram illustrating a robotic singulation system according to various embodiments. In various embodiments, system 900 of FIG. 9 implements the hierarchical scheduling system 300 of FIG. 3, process 400 of FIG. 4A, process 420a of FIG. 4B, process 420b of FIG. 4C, process 600 of FIG. 6, process 850 of FIG. 8B, and process 875 of FIG. 8C.

According to various embodiments, system 900 partially lifts and pulls or drags an item from the source pile/flow to the corresponding location on the conveyor. As an example, system 900 (e.g., control computer 917) determines to partially drag the item in response to a determination that completely picking up the item and moving robotic arm 903 to place the item on the conveyor is not feasible. Some examples of instances in which the item may be dragged include: if the item is determined to be relatively heavy (e.g., has a weight greater than a predetermined threshold); if the item is relatively large; if the item is determined to have an irregular shape or a type of packaging that is difficult to grasp (e.g., if a successful grasp rate is less than a predetermined threshold); if an initial grasping strength is less than expected (e.g., if a subset of the plurality of suction cups on the end effector have failed); and if a path of dragging the item is determined to be more efficient than completely picking up the item.

In the example shown, system 900 determines to singulate item 905 according to a path corresponding to dragging the item 905 from chute 911 to slot 915 on the conveyor 913. In some instances, robotic arm 903 engages end effector 904 to item 905 at chute 911 and partially lift item 905 and move the item 905 towards conveyor 913 so as to drag item 905 from chute 911 to conveyor 913. In some instances, robotic arm 903 engages end effector 904 to item 905 at chute 911 to drag the item 905 (e.g., without partially lifting item 905) towards conveyor 913 so as to drag item 905 from chute 911 to conveyor 913.

System 900 may include one or more sensors from which an environment of the workspace 910 is modeled. In the example shown in FIG. 9, system 900 includes image sensors, including in this example 3D cameras 901 and 902. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, and the like. As an example, system 900 may include one or more sensors arrays disposed within or around chute 911. In various embodiments, system 900 includes one or more sensors or sensor arrays (not shown) disposed around the workspace.

According to various embodiments, workspace 910 is modeled and a model of the workspace 910 is used in connection with determining to drag item 905 from chute 911 to conveyor 913. For example, system 900 may determine a weight of item 905 based at least in part on the model of the workspace, and may determine to drag item 905 based at least in part on the weight.

Figure 10A:
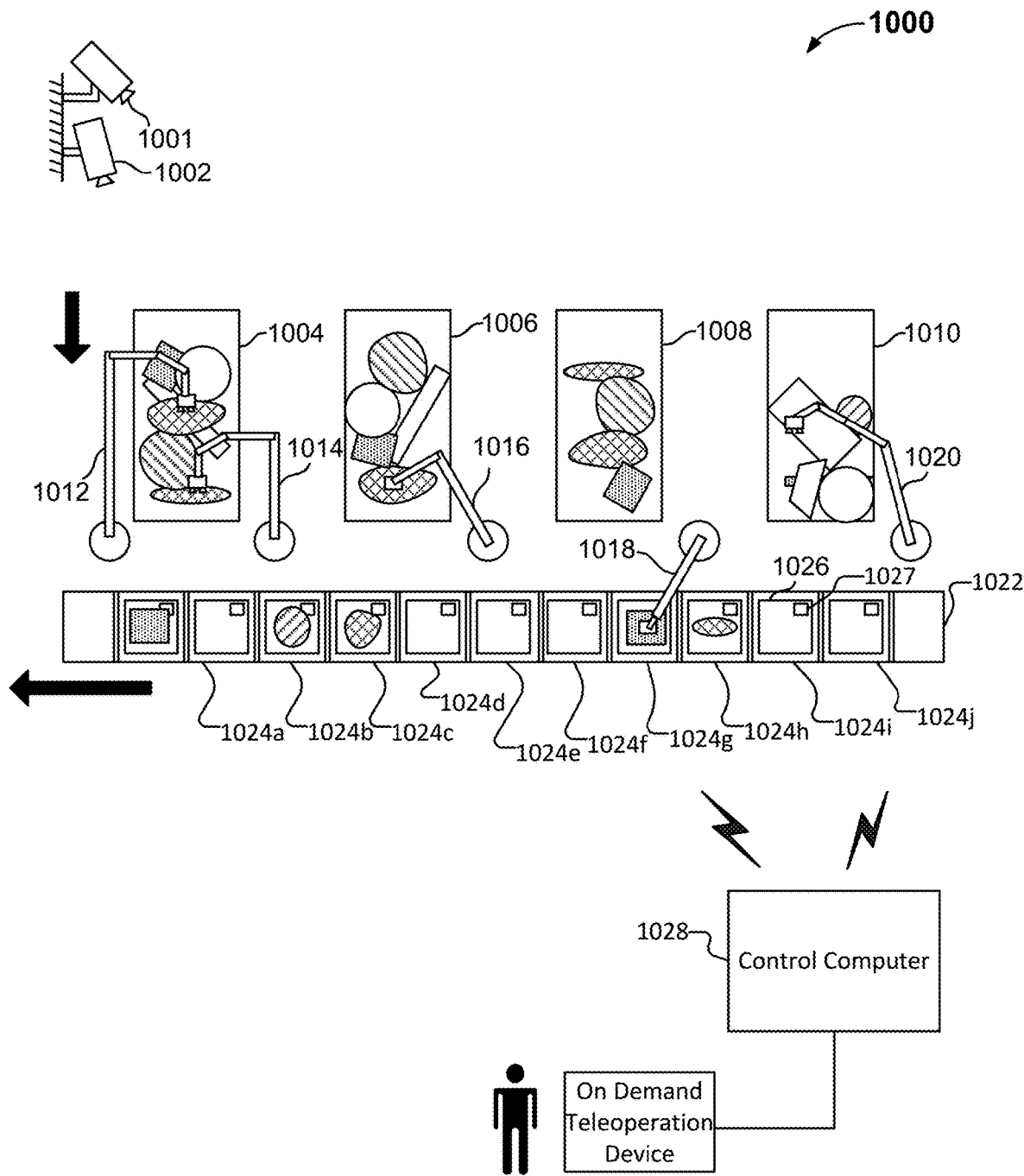
FIG. 10A is a diagram illustrating a robotic singulation system according to various embodiments.

FIG. 10A is a diagram illustrating a robotic singulation system according to various embodiments. In various embodiments, system 1000 of FIG. 10A implements the hierarchical scheduling system 300 of FIG. 3, process 400 of FIG. 4A, process 420a of FIG. 4B, process 420b of FIG. 4C, process 600 of FIG. 6, process 850 of FIG. 8B, process 875 of FIG. 8C, and process 1050 of FIG. 10B.

As illustrated in FIG. 10A, system 1000 includes three additional stations: robotic arms 1012, 1014, 1016, 1018, and 1020 positioned and configured to pick/place items from chutes 1004, 1006, 1008, and 1010. According to various embodiments, one or more robotic arms operate to singulate items from a same chute. For example, robotic arms 1012 and 1014 operate to pick/place items from chute 1004. System 1000 includes one or more sensors that provide information from which sensor data pertaining to a workspace is determined. System 1000 includes cameras 1001 and 1002 which may be configured or arranged to provide a 3D view of the full scene, including each of the four stations/chutes 1004, 1006, 1008, and 1010, as well as conveyor 1022.

In various embodiments, control computer 1028 coordinates operation of the robotic arms 1012, 1014, 1016, 1018, and 1020, and associated end effectors, along with conveyor 1022, to pick/place items from the chutes 1004, 1006, 1008, and 1010 to conveyor 1022 in a manner that achieves a desired collective throughput of the system (e.g., a collective throughput that satisfies a throughput threshold, etc.). Control computer 1028 may implement global scheduler 322 of hierarchical scheduling system 300 of FIG. 3. In some embodiments, control computer 1028 further implements robotic singulation station schedulers 324, 326, 328, and 330 of hierarchical scheduling system 300 of FIG. 3. As an example, global scheduler 322 may coordinate operation of robotic arms 1012, 1014, 1016, 1018, and 1020 to ensure that collision events are avoided during operation of robotic arms 1012, 1014, 1016, 1018, and 1020 to singulate items from chutes 1004, 1006, 1008, and 1010 to conveyor 1022. Robotic singulation station schedulers 324, 326, 328, and 330 may control to determine plans or strategies for robotic arms 1012, 1014, 1016, 1018, and 1020 to singulate items, and robotic singulation station schedulers 324, 326, 328, and 330 may provide the robotic arms with such plans or strategies to cause the robotic arms to implement such plans or strategies (or provide the robotic arms with instructions corresponding to plans or strategies).

According to various embodiments, system 1000 comprises a conveyor 1022 that includes a plurality of slots or trays 1024a-1024j. An item to be singulated is picked from a corresponding chute and singly placed in one of the plurality of slots. Each robotic arm (or scheduler thereof) may determine a slot of the slots 1024a-1024j in which an item is to be singulated. The selected slot in which the item is to be placed is stored in association with the plan for singulating the item. In addition, a distributed data structure associated with the state or conveyor may be updated to reflect that the robotic arm is to place an item in the slot. For example, the distributed data structure may have a field for indicating that a slot is reserved or occupied, and in response to determining the particular slot into which an item is to be placed, the corresponding field for the slot may be updated.

According to various embodiments, a slot corresponds to a segmented portion of the conveyor 1022. However, in some embodiments, conveyor 1022 may be configured to carry a tray(s) that is distinct from conveyor 1022. As an example, as illustrated in FIG. 10A, tray 1026 may be carried on the conveyor 1022 in slot 1024i. According to various embodiments, each of the plurality of slots or trays is associated with an identifier. As an example, as illustrated in FIG. 10A, slot 1024i comprises identifier 1027. The identifier may be unique within at least system 1000 (at least with respect to the conveyor 1022). Some examples of forms in which the identifier may be implemented include a barcode, a QR code, an alphanumeric string, a symbol, etc.

In some embodiments, system 1000 stores routing data for an item in association with the slot/tray identifier in which the item is placed. The system (or another sortation system) may correspondingly route/sort the items based at least in part on the routing data. In response to determining that a data structure for a particular slot/tray identifier does not include all the required routing data, system 1000 may obtain further information from one or more sensors in the workspace or further process the initially obtained information (e.g., the image comprising a representation of the item) to obtain the requisite routing data. For example, if system 1000 determines that the routing data associated with the slot/tray identifier includes a service class but not a destination, system 1000 obtains further sensor data or further processes the initially obtained sensor data, to determine a destination for the item.

In various embodiments, a system such as system 1000 uses the vision system to determine whether a particular tray is empty. The vision system may include image data from sensors directed at the conveyor 1022. As the conveyor 1022 moves and the slots/trays are moving, the vision system may obtain an image associated with a slot/tray (or generate a model of the slot/tray) and determine whether the image associated with the slot corresponds to an empty slot/tray. As an example, system 1000 determines that a slot is empty by comparing the image data to a model of an empty slot and performing an analysis to determine a difference between the image data and the model of the empty slot. System 1000 may further determine whether a difference between the image data and the model of the empty slot is indicative of an item being comprised in the slot. In some embodiments, a model of an empty slot is stored for each particular slot in the system to account for differences among slots. For example, system 1000 may store a mapping of models of empty slots to identifiers for the slots, and the mapping can be used in connection with obtaining the applicable model of the empty slot for use in determining whether a particular slot is empty.

According to various embodiments, system 1000 determines whether a particular slot is empty based on an image analysis of image data for the slot. The image analysis may include edge detection or object recognition.

According to various embodiments, system 1000 implements a dynamic model in connection with determining whether a particular slot is empty. Through normal use over time, one or more properties of a slot on the conveyor may change. For example, a side or surface of the slot may change color or have visible scratches/scuffing. As another example, one or more dimensions of a slot may change as a result of relatively oversized/overweight items being placed and carried in the slot. If the appearance or dimensions (or other properties) of the slot change over time, the robotic system may err in determining whether the slot is empty (and available to carry an item to be singulated). System 1000 determines that a slot is not empty because the slot appears different from the definition of what an empty slot looks like (e.g., different color, scratches or other markings on the surfaces, etc.). Accordingly, in some embodiments, the definition of an empty slot (e.g., a mapping of one or more properties of an empty slot) is updated over time. The updating of the definition of the empty slot may be performed periodically at predetermined time intervals, or in response to detecting one or more conditions being satisfied (e.g., an error rate threshold being attained by the robotic system). In various embodiments, the definition of the empty slot is continuously performed. For example, the system data obtains sensor data pertaining to a vision system that is captured with respect to a slot at a location on the conveyor where the slot is deemed to be empty (e.g., at the beginning of the conveyor, or at the end of the conveyor after a step where the slot is emptied), and uses the sensor data to update the definition of the empty slot. In some embodiments, the definition of an empty slot or tray is determined on a slot-by-slot or tray-by-tray basis such that each slot/tray has a corresponding definition of such a slot or tray. As an example, the definition for a particular slot are stored in association with a corresponding identifier for such slot. The updating of the definition of an empty slot may be implemented using a machine learning process.

In various embodiments two or more robots may be deployed at a station, operated under control of an associated control computer, such as the control computer, in a manner that avoids the robots interfering with each other's operation and movement and which maximizes their collective throughput, including by avoiding and/or managing contention to pick and place the same item. In some embodiments, a plurality of robotic arms operating at the same workspace work independently to singulate the plurality of items. One or more of the plurality of robotic arms may perform an active measure to avoid a collision between two robotic arms (or of items grasped by the robotic arms) in response to detecting a collision or a potential for a collision between the two robotic arms. For example, control computer 1028 coordinates operation of the plurality of robots to enable the plurality of robots to operate independently while ensuring that the plurality of robots and/or the items grasped by the plurality of robots do not collide with one another during singulation. In some embodiments, control computer 1028 implements/enforces "force fields" between two or more robots in order to prevent collisions between the two or more robots. As an example, the robots (or control computer 1028) access information from which their respective positions and the positions of one or more other robots are determined, and the robots are controlled to avoid an intersection between their respective positions or paths and the positions or paths of the one or more other robots at a certain time or at a certain stage of singulation. In some embodiments, a first robot reserves an airspace (e.g., a certain position) that is to be used by the first robot during singulation of an item. In connection with a second robot scheduling singulation of an item, the second robot determines the plan to singulate the item based at least in part on the airspace reserved by the first robot. For example, in connection with scheduling singulation of the item, the second robot determines that the plan cannot (or should not) include movement through the airspace reserved by the first robot and the second robot determines a plan that does not require the second robot or the item to move through the airspace reserved by the first robot during the time at which the airspace is so reserved.

In various embodiments, a scheduler coordinates operation of a plurality of robots, e.g., one or more robots working at each of a plurality of stations, to achieve desired throughput without conflict between robots, such as one robot placing an item in a location (e.g., a slot/tray) the scheduler has assigned to another robot. The scheduler may implement the conflict avoidance by sending faults to robotic structures or the associated schedulers in response to detecting a conflict arising associated with the singulation of items by different robotic arms.

In some embodiments, each of at least a subset of a plurality of robots working at a workspace picks an item independent from the other robots of the plurality of robots and a corresponding plan for singulation of the item is determined. The at least the subset of the plurality of robots may pick in a predefined order such that no two robots select or pick an item at the same time. Each of the at least the subset of the plurality of robots may select or pick an item based on items that are currently available at the time of such selection. Accordingly, a second robot of the at least two subset of the plurality of robots that picks after a first robot will select an item to singulate that is different from the item selected or picked by the first robot.

In some embodiments, multiple robots may pick from a same chute or other source receptacle. In the example shown in FIG. 10A, for example, robotic arm 1014 may be configured to pick from either chute 1004 or chute 1006. Likewise, robotic arm 1016 may pick from chute 1006 or chute 1008, etc. In some embodiments, two or more robotic arms configured to pick from the same chute may have different end effectors. A robotic singulation system as disclosed herein may select the robotic arm most suitable to pick and singulate a given item. For example, system 1000 determines which robotic arm(s) can reach the item and selects one with the most appropriate end effector and/or other attributes to successfully grasp the item.

While stationary robotic arms are shown in FIG. 10A, in various embodiments one or more robots may be mounted on a mobile conveyance, such as a robotic arm mounted on a chassis configured to be moved along a rail, track, or other guide, or a robotic arm mounted on a mobile cart or chassis. In some embodiments, a robotic instrumentality actuator other than a robotic arm may be used. For example, an end effector may be mounted on and configured to be moved along a rail, and the rail may be configured to be moved in one or more axes perpendicular to the rail to enable the end effector to be moved to pick, translate, and place an item as disclosed herein.

Figure 10B:
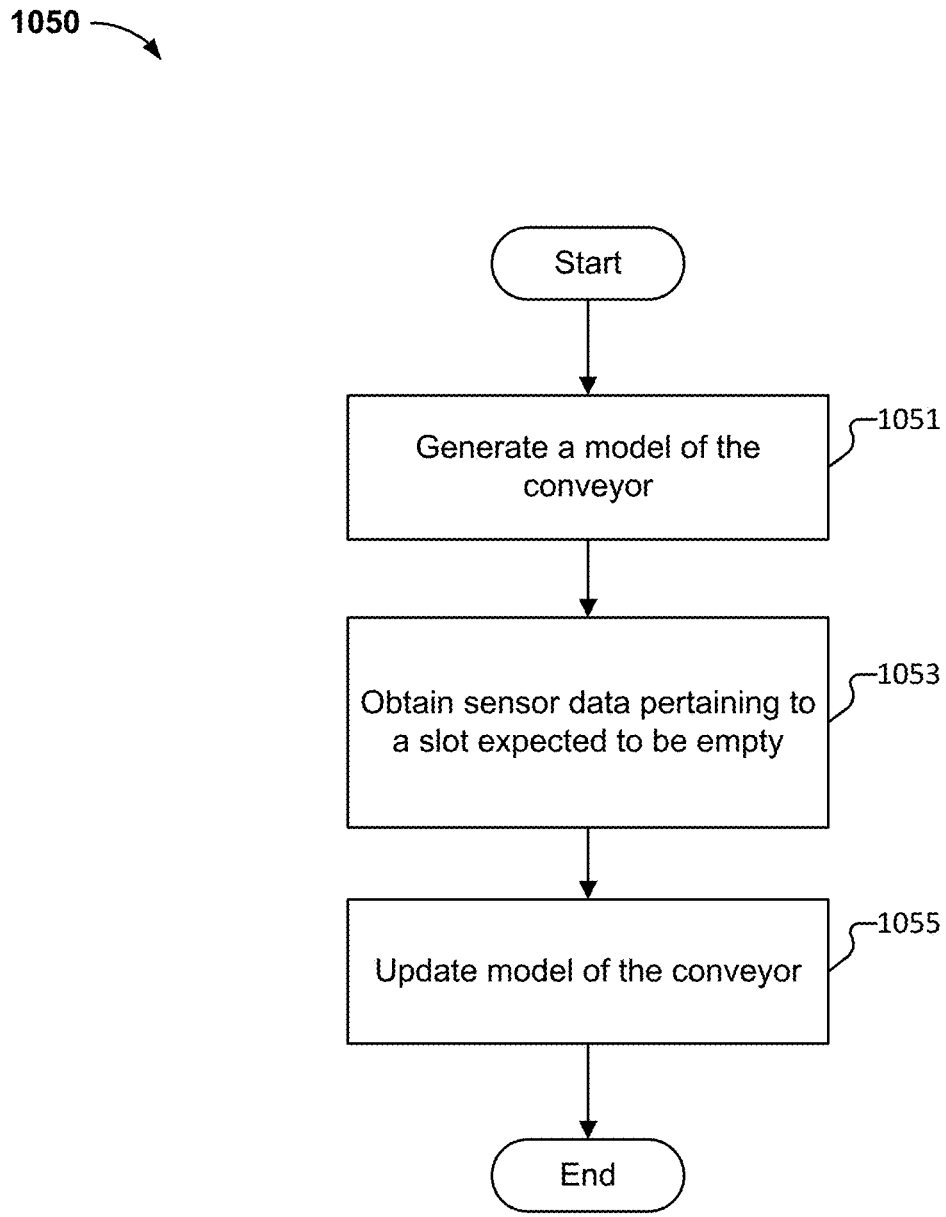
FIG. 10B is a diagram of a process to configure the robotic singulation system using properties of a conveyance structure according to various embodiments.

FIG. 10B is a diagram of a process to configure the robotic singulation system using properties of a conveyance structure according to various embodiments. Process 1050 of FIG. 10B can be performed by system 1000 of FIG. 10A. In some embodiments, process 1050 is implemented by a system (e.g., a robotic system) operating to singulate one or more items within one or more workspaces such as workspaces corresponding to chutes 1004, 1006, 1008, and 1010 of system 1000 of FIG. 10A. System 1000 includes one or more processors that operate to cause robotic arms 1012, 1014, 1016, 1018, and 1020 to pick and place items for sorting. System 1000 may implement a vision system and/or use sensor data pertaining to at least the slots/trays of conveyor 1022.

At 1051, a model of the conveyor is generated. According to various embodiments, the model of the conveyor is generated based at least in part on sensor data (e.g., image data from an image system). The model may be further based on information comprised in a distributed data structure that pertains to a state/condition of the conveyor.

System 1000 may include one or more sensors from which a conveyor is modeled. In the example shown in FIG. 10A, system 1000 includes image sensors, including in this example 3D cameras 1001 and 1002. In various embodiments, other types of sensors may be used (individually or in combination) in a singulation system as disclosed herein, including a camera, an infrared sensor array, a laser array, a scale, a gyroscope, a current sensor, a voltage sensor, a power sensor, a force sensor, a pressure sensor, a weight sensor, and the like. In various embodiments, a control computer of system 1000 includes a workspace environment state system such as a vision system used to discern individual slots/trays, items, debris on the workspace, label data (e.g., routing data for the item(s)) and orientation of items based on sensor data such as image data provided by image sensors, including in this example 3D cameras 1001 and 1002.

In some embodiments, control computer 1028 of system 1000 stores or otherwise has access to a distributed data structure comprising information pertaining to a state/condition of the workspace, including information pertaining to the conveyor. The distributed data structure may store one or more attributes associated with a particular slot/tray on the conveyor, including information such as an association between an identifier and a slot, an indication of whether the slot is occupied, an identifier corresponding to an item included in the slot (e.g., if the slot is occupied), and various other information associated with the slot. The distributed data structure may further store routing data for an item in association with the slot/tray identifier. The information comprised in the distributed data structure may be used in connection with generating the model. For example, the image data and the data stored in the distributed data structure can be aggregated to form a more holistic model of the conveyor.

At 1053, sensor data pertaining to a slot expected to be empty is obtained. During a singulation process, various locations or points in the process exist wherein a slot is expected to be empty. Examples of locations or points in the process where the slot is expected to be empty include upstream at the beginning of the conveyor (e.g., further upstream than any other robotic arm), at the end of the singulation process after items are removed from the slots on the conveyor, etc. According to various embodiments, system 1000 obtains sensor data (e.g., image data) for the slot at least at one location or point in the process where the slot is expected to be empty. In some implementations, system 1000 also obtains the identifier associated with the slot that is captured in the sensor data.

At 1055, the model of the conveyor is updated. According to various embodiments, in response to receiving current sensor data of an expected empty slot, system 1000 updates the model of the conveyor. Specifically, system 1000 may update a model for the particular slot associated with the sensor data. For example, system 1000 can store a definition of an empty slot in association with the identifier for the slot so that each slot has a corresponding definition.

According to various embodiments, the update to the model of the conveyor includes an update of the characteristics of an empty slot. For example, the updated model may include in its definition discoloration or scuffing that occurs through normal wear and tear of system 1000. Because the definition of the empty slot is updated over time, a current definition of the empty slot more precisely defines the expected characteristics of the empty slot. As such, when comparing image data pertaining to the slot with the definition of the empty slot, system 1000 can more accurately determine whether an item is in the slot (or whether a particular mark/irregularity in the image data is part of the current look of the slot).

Figure 11:
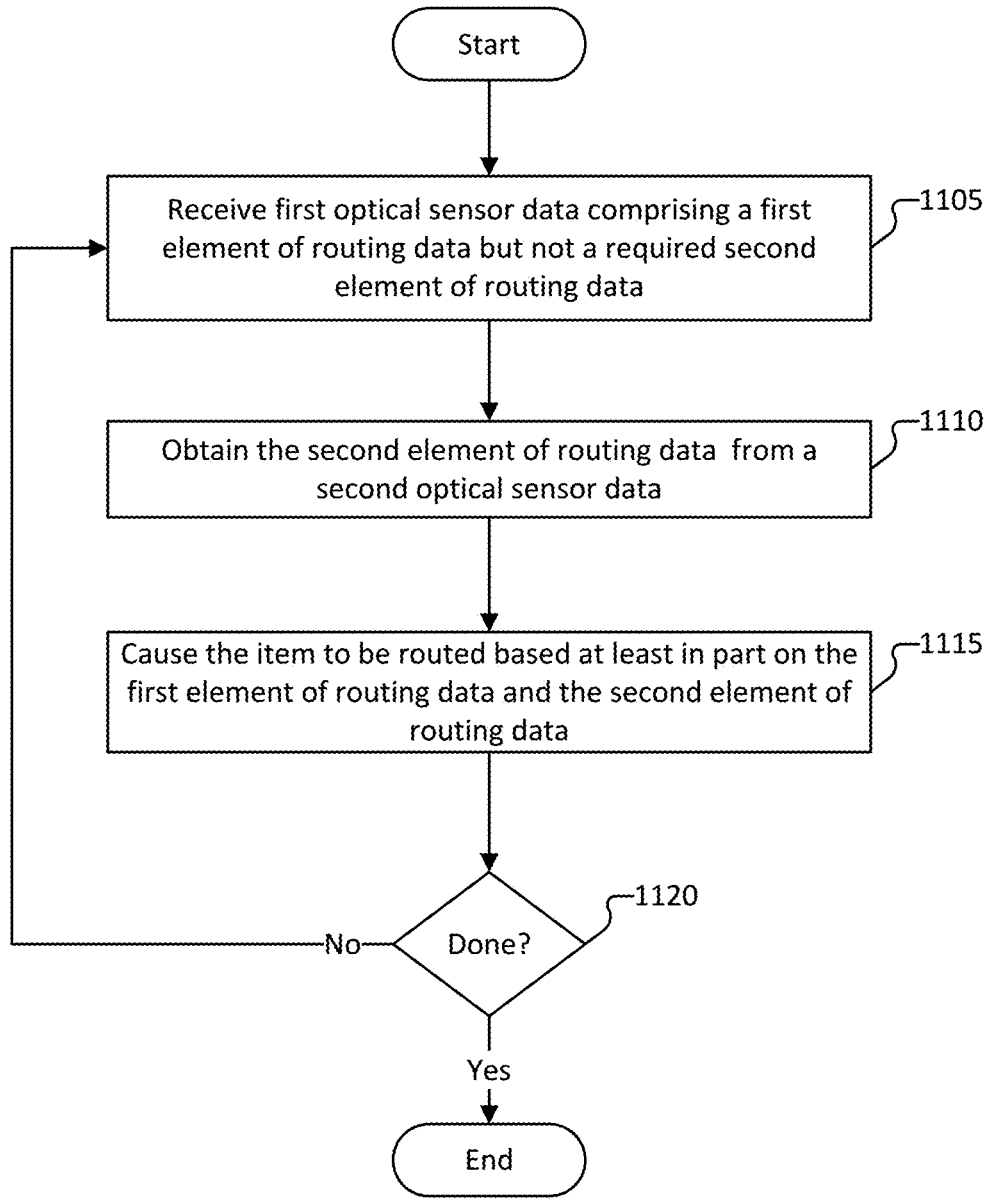
FIG. 11 is a flow diagram of a method for routing an item according to various embodiments.

FIG. 11 is a flow diagram of a method for routing an item according to various embodiments. In some embodiments, process 1100 is implemented at least in part by system 200 of FIGS. 2A and 2B, system 500 of FIGS. 5A and 5B, system 700 of FIGS. 7A-7C, system 800 of FIG. 8A, system 900 of FIG. 9, and/or system 1000 of FIG. 10A.

At 1105, the system receives first optical sensor data comprising a first element of routing data but not a required second element of routing data. The various required elements of routing data may be predefined. In some embodiments, the required various elements of the routing data include a destination and service class. Various other types of elements of routing data may be deemed required.

In some embodiments, the system obtains the first optical sensor data from a sensor (e.g., a first sensor) in the workspace of a robotic system that performs singulation with respect to a set of items. As an example, the first element of routing may be encoded in a code and may obtained by the system using a sensor to scan the code (e.g., a QR code, a barcode, etc.)

At 1110, the system obtains the second element of routing data from a second optical data. In some embodiments, in response to determining that the first optical sensor data does not include all requisite routing data (e.g., the second element of routing data), the system obtains the second element of routing data. As an example, the system obtains the second element of routing data by obtaining additional information from a sensor(s) in the workspace (e.g., the same sensor used to obtain the first optical sensor data, or another sensor such as a sensor further downstream the singulation/sorting process). As another example, the system further processes the information from which the first optical sensor data, and obtains the second optical data based on the further processing. The first optical sensor data may be detected from an image captured by a first sensor, and the system may obtain the second optical data by further processing the image and extracting such data based on the further processing (e.g., the system performs an OCR with respect to alphanumeric text in the image).

In some embodiments, in response to obtaining the second element of routing data, the system stores such data in association with the first element of routing data and other information pertaining to the item, such as item identifier, tray/slot identifier in which the item is placed, etc.

At 1115, the system causes the item to be routed based at least in part on the first element of routing data and the second element of routing data. In some embodiments, the causing the item to be routed based at least in part on the first element of routing data and the second element of routing data includes providing the routing data (e.g., first element of routing data and the second element of routing data) to another system that performs sorting/routing of items, or otherwise stores the routing data in a distributed data structure for the other system to access. In some embodiments, the causing the item to be routed based at least in part on the first element of routing data and the second element of routing data includes controlling the conveyor or other structure that moves the item(s) through the workspace to a destination determined based at least in part on the routing data.

At 1120, a determination is made as to whether process 1100 is complete. In some embodiments, process 1100 is determined to be complete in response to a determination that no further items are to be sorted or routed, no further items are to be singulated, the process has terminated, an administrator indicates that process 1100 is to be paused or stopped, etc. In response to a determination that process 1100 is complete, process 1100 ends. In response to a determination that process 1100 is not complete, process 1100 returns to 1105.

Figure 12:
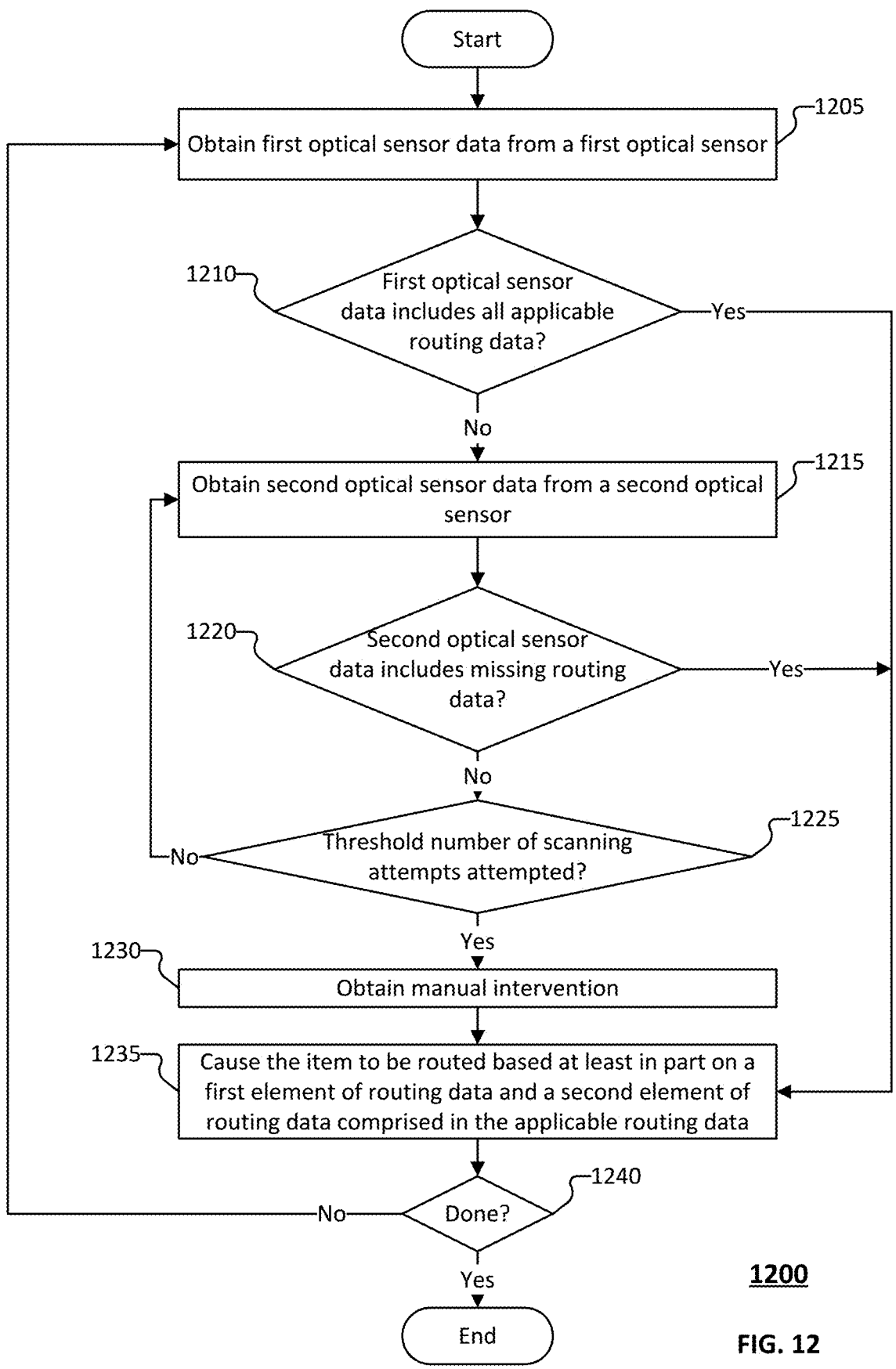
FIG. 12 is a flow diagram of a method for routing an item according to various embodiments.

FIG. 12 is a flow diagram of a method for routing an item according to various embodiments. In some embodiments, process 1200 is implemented at least in part by system 200 of FIGS. 2A and 2B, system 500 of FIGS. 5A and 5B, system 700 of FIGS. 7A-7C, system 800 of FIG. 8A, system 900 of FIG. 9, and/or system 1000 of FIG. 10A.

At 1205, first optical sensor data is obtained from a first optical sensor. In some embodiments, 1205 corresponds to, or is similar to, 1105 of process 1100. The first optical sensor data may include an image, such as an image of a label on the item.

At 1210, the system determines whether the first optical sensor data includes all applicable routing data. For example, the system determines whether the first optical sensor data comprises all required routing data (e.g., both the destination and the service class for the item). In response to determining that the first optical sensor data includes all the applicable routing data (e.g., all required routing data) at 1210, process 1200 proceeds to 1235. Conversely, in response to determining that the first optical sensor data does not include all the applicable routing data (e.g., does not include all required routing data) at 1210, process 1200 proceeds to 1215.

At 1215, second optical sensor data is obtained from a second optical sensor. The second optical sensor may be located in a different part of the workspace. For example, the first optical sensor may be disposed near a chute or induction zone at which items to be singulated are input to the system, and the second optical sensor may be disposed further downstream such as on the robotic arm or end effector, or in proximity of a conveyor that carries the singulated items to another area in the shipping facility.

At 1220, the system determines whether the second optical sensor data includes the missing routing data. In response to determining that the second optical sensor data includes the missing routing data (e.g., the element(s) of the routing data not included in the first optical sensor data) at 1220, process 1200 proceeds to 1235. Conversely, in response to determining that the second optical data does not include the missing routing data, then process 1200 proceeds to 1225.

At 1225, the system determines whether a threshold number of scanning attempts have been attempted. In some embodiments, the system attempts to rescan the item to obtain the missing routing data until a threshold number of attempts has been achieved or a threshold period of time has elapsed. In response to determining that the system has not attempted to rescan the item a threshold number of times (e.g., that a number of attempts is less than a threshold number of scanning attempts) at 1225, process 1200 returns to 1215 and process 1200 iterates over 1215-1220 until the missing routing data is obtained or a the system has attempted to obtain the missing a threshold number of times. Conversely, in response to determining that the system has attempted to scan the item to obtain the missing routing data a threshold number of times (e.g., a number of attempts is equal to the threshold number of scanning attempts) at 1225, process 1200 proceeds to 1230.

At 1230, manual intervention is obtained. In some embodiments, in response to determining that a threshold number of scanning attempts has been attempted or that a threshold period of time has elapsed during the rescanning of the item, the system invokes human/manual intervention. For example, the system communicates a prompt/alert to a client system used by a human operator, such as a teleoperation device. The human operator may be prompted to determine and input the missing routing data.

At 1235, the system causes the item to be routed based at least in part on the first element of routing data and the second element of routing data comprised in the applicable routing data (e.g., obtained from the same image, or from different images, such as via second optical sensor data).

At 1240, a determination is made as to whether process 1200 is complete. In some embodiments, process 1200 is determined to be complete in response to a determination that no further items are to be sorted or routed, no further items are to be singulated, the process has terminated, an administrator indicates that process 1200 is to be paused or stopped, etc. In response to a determination that process 1200 is complete, process 1200 ends. In response to a determination that process 1200 is not complete, process 1200 returns to 1205.

Figure 13:
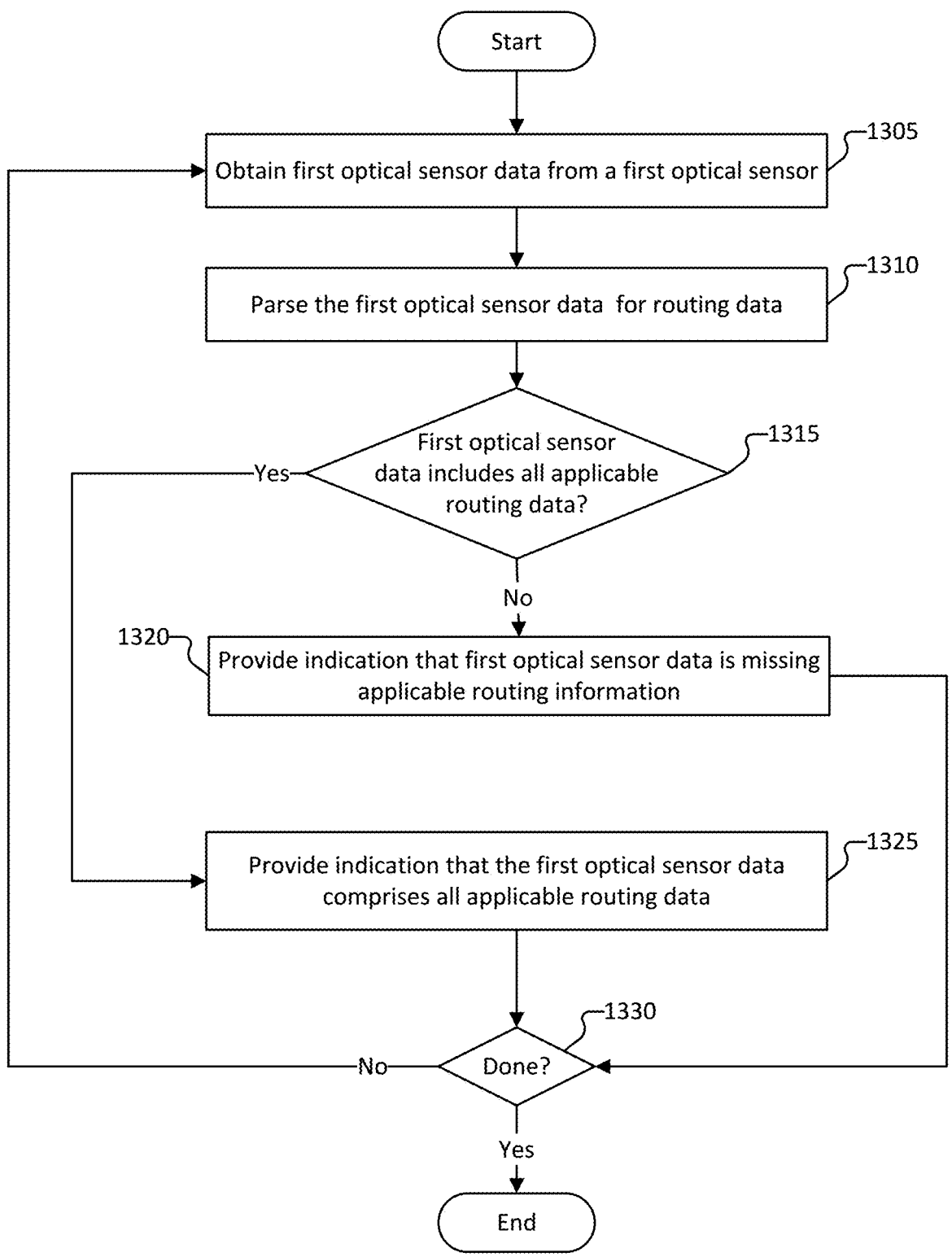
FIG. 13 is a flow diagram of a method for capturing routing data for routing an item according to various embodiments.

FIG. 13 is a flow diagram of a method for capturing routing data for routing an item according to various embodiments. In some embodiments, process 1300 is implemented at least in part by system 200 of FIGS. 2A and 2B, system 500 of FIGS. 5A and 5B, system 700 of FIGS. 7A-7C, system 800 of FIG. 8A, system 900 of FIG. 9, and/or system 1000 of FIG. 10A. In some embodiments, process 1300 is invoked by 1210.

At 1305, first optical sensor data is obtained from a first optical sensor or from a dataset of information collected by the vision system.

At 1310, the first optical sensor data is parsed for routing data. In some embodiments, the first optical sensor data corresponds to an image comprising a representation of an item (or at least a representation of the label on the item). As an example, the label may comprise one or more fields, such as data encoded into codes (e.g., barcodes, QR codes, Z codes, etc.) and alphanumeric fields.

At 1315, the system determines whether the first optical sensor data comprises all applicable routing data. For example, the system determines whether all required routing data is comprised/recognized from the first optical sensor data. In response to determining that the first optical sensor data comprises all the applicable routing data at 1315, process 1300 proceeds to 1325. Conversely, in response to determining that the first optical sensor data does not comprise all the applicable routing data at 1315, process 1300 proceeds to 1320.

At 1320, the system provides an indication that the first optical sensor data is missing applicable routing information. In some embodiments, the system provides the indication to another system/service or process that invoked process 1300, such as 1210 of process 1200.

At 1325, the system provides an indication that the first optical sensor data comprises all applicable routing data. In some embodiments, the system provides the indication to another system/service or process that invoked process 1300, such as 1210 of process 1200.

At 1330, a determination is made as to whether process 1300 is complete. In some embodiments, process 1300 is determined to be complete in response to a determination that no further items are to be sorted or routed, no further items are to be singulated, the process has terminated, an administrator indicates that process 1300 is to be paused or stopped, etc. In response to a determination that process 1300 is complete, process 1300 ends. In response to a determination that process 1300 is not complete, process 1300 returns to 1305.

Figure 14:
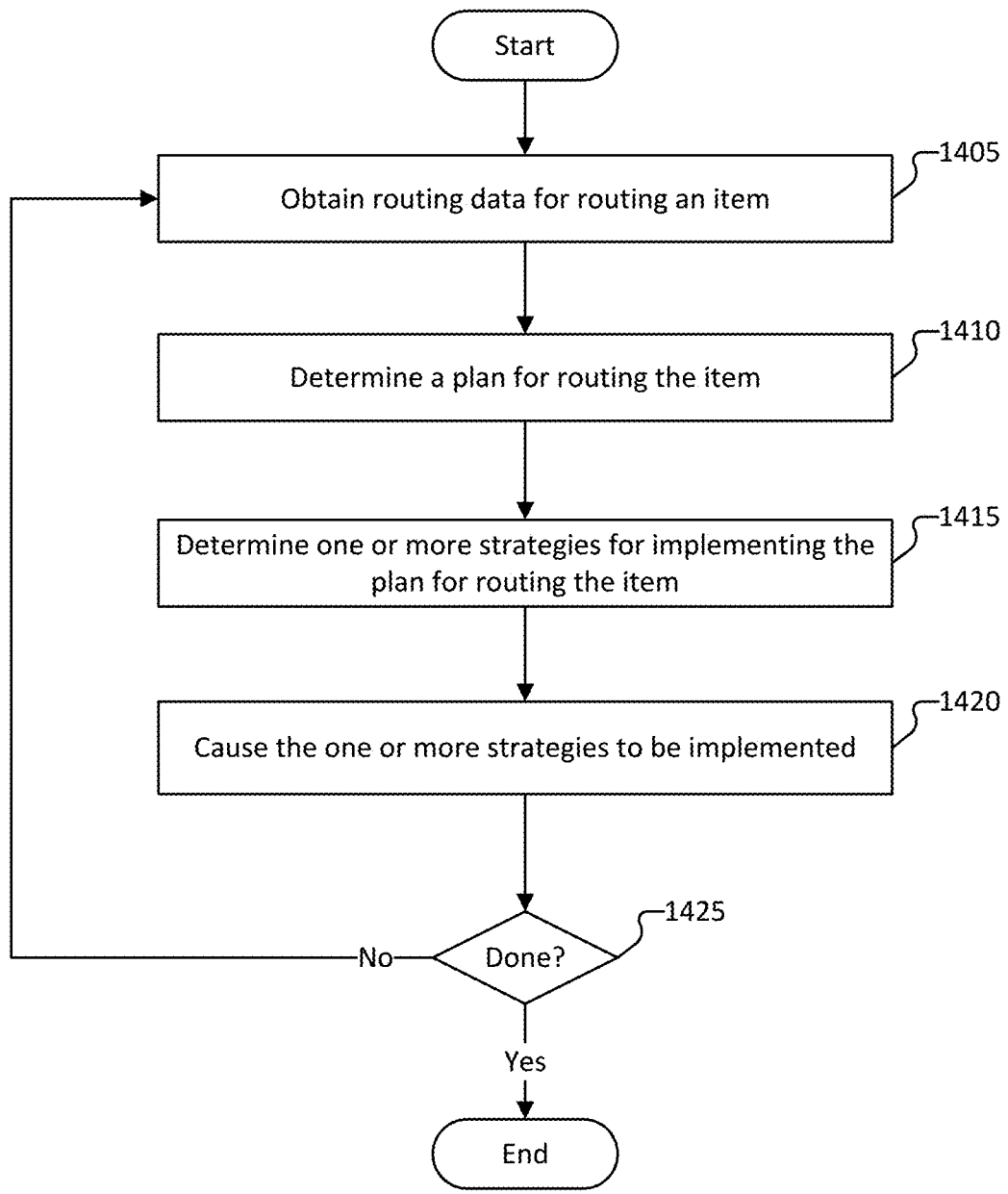
FIG. 14 is a flow diagram of a method for routing an item according to various embodiments.

FIG. 14 is a flow diagram of a method for routing an item according to various embodiments. In some embodiments, process 1400 is implemented at least in part by system 200 of FIGS. 2A and 2B, system 500 of FIGS. 5A and 5B, system 700 of FIGS. 7A-7C, system 800 of FIG. 8A, system 900 of FIG. 9, and/or system 1000 of FIG. 10A.

At 1405, routing data for routing an item is obtained. In some embodiments, the routing data comprises a plurality of elements of routing data, such as destination, service class, addressee, description, sender, etc.

At 1410, a plan for routing the item is determined. In some embodiments, the system determines the plan for routing the item based at least in part on the routing data stored in association with the item (e.g., in association with the item identifier, or a tray/slot identifier in which the item is placed). The plan for routing the item may include an indication of a manner by which the item is carried, and an indication of a location in the shipping facility to which the item is to be carried. For example, the system may determine the plan for routing the data in connection with determining the various pathways that the item is to traverse in order to reach the destination (or at least a destination within the shipping facility from which a transport carrier will transport the item to the destination identified on the label of the item).

At 1415, one or more strategies for implementing the plan for routing the item are determined. In some embodiments, the system determines the one or more strategies based at least in part on the plan. For example, the system determines a direction and speed at which a conveyor carrying the item is to be operated. As another example, the system determines the configuration of gates to various pathways within the shipping facility, such as whether to open a gate to enable the item to switch paths (e.g., to a different conveyor system, etc.).

At 1420, the system causes the one or more strategies to be implemented. In some embodiments, the system causes a robotic system (e.g., one or more singulation robots or conveyance systems) to implement the one ore strategy.

At 1425, a determination is made as to whether process 1400 is complete. In some embodiments, process 1400 is determined to be complete in response to a determination that no further items are to be sorted or routed, no further items are to be singulated, the process has terminated, an administrator indicates that process 1400 is to be paused or stopped, etc. In response to a determination that process 1400 is complete, process 1400 ends. In response to a determination that process 1400 is not complete, process 1400 returns to 1405.

Figure 15:
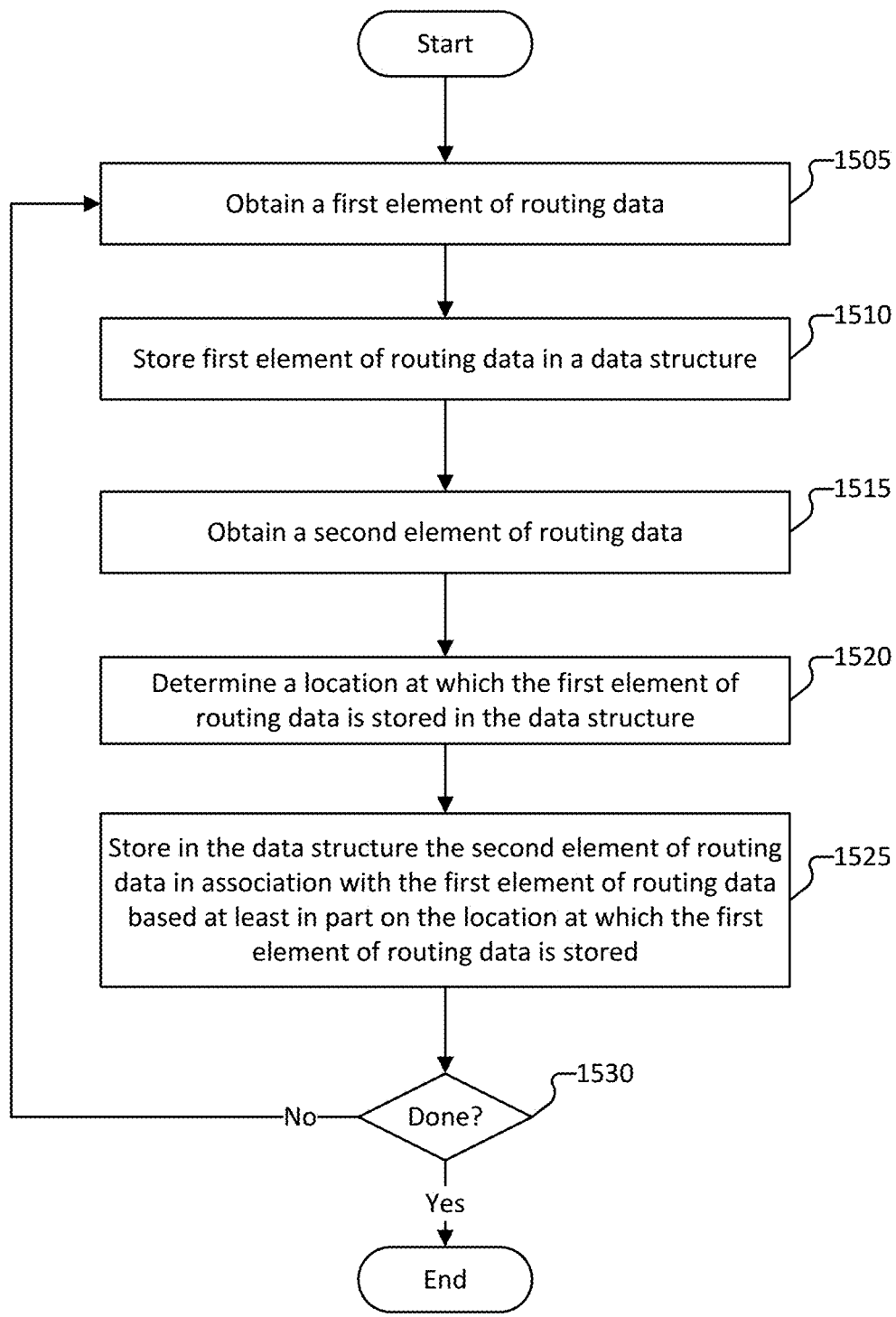
FIG. 15 is a flow diagram of a method for correlating routing data for an item according to various embodiments.

FIG. 15 is a flow diagram of a method for correlating routing data for an item according to various embodiments. In some embodiments, process 1400 is implemented at least in part by system 200 of FIGS. 2A and 2B, system 500 of FIGS. 5A and 5B, system 700 of FIGS. 7A-7C, system 800 of FIG. 8A, system 900 of FIG. 9, and/or system 1000 of FIG. 10A.

At 1505, a first element of routing data is obtained. In some embodiments, the system obtains the first element of routing data from information captured by a sensor (e.g., first optical sensor data captured by a first optical sensor). The first element of routing data may be obtained based on decoding a code on a label of the item (e.g., the label being represented in the information captured by the sensor, such as via an image).

At 1510, the first element of routing data is stored in a data structure. In some embodiments, the data structure comprises a plurality of fields for a particular item. The plurality of fields may include fields for elements of routing data, fields for tray/slot identifiers in which the item is placed, attributes of the item, or other information that may be used in connection with routing the data to the destination. The system may store the first element of routing data in a corresponding field associated with the item (e.g., a field in a record for the item).

At 1515, a second element of routing data is obtained. In some embodiments, the system obtains the second element of routing data based on further processing the information captured by the sensor. For example, if the decoding one or more codes on the label of the item does not result in the system determining the second element of routing data, the system may perform image processing, such as OCR, to characterize alphanumeric text from which the system extracts the second element of routing data. As another example, the system may identify another code represented in the image (e.g., in the first optical sensor data), and the system may then decode the other code to obtain the second element routing data. The first element of routing data may be extracted from a QR code, and the second element of routing data may be extracted from another code, such as a barcode, in a different part of the label on the item.

At 1520, the system determines the location at which the first element of routing data is stored in the data structure. For example, the system identifies an item record for storing routing data and other relevant information (e.g., attributes of the item, etc.).

At 1525, the system stores in the data structure, the second element of routing data in association with the first element of routing data based at least in part on the location at which the first element of routing data is stored. For example, the system stores the second element of routing data in a corresponding field for the record associated with the item.

At 1530, a determination is made as to whether process 1500 is complete. In some embodiments, process 1500 is determined to be complete in response to a determination that no further items are to be sorted or routed, no further items are to be singulated, the process has terminated, an administrator indicates that process 1500 is to be paused or stopped, etc. In response to a determination that process 1500 is complete, process 1500 ends. In response to a determination that process 1500 is not complete, process 1500 returns to 1505.

Figure 16:
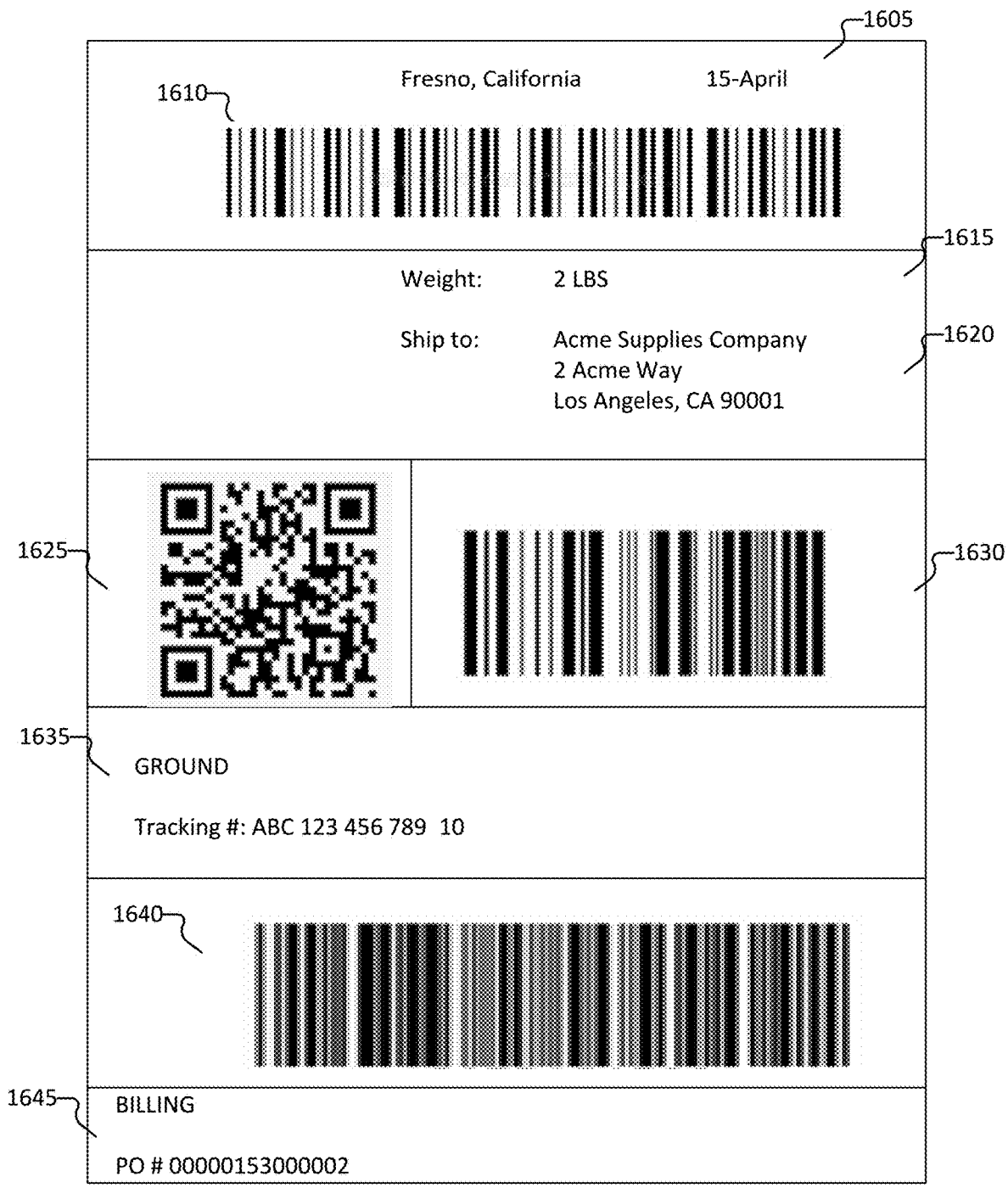
FIG. 16 is a diagram illustrating an example of a shipping label.

FIG. 16 is a diagram illustrating an example of a shipping label. In the example shown, label 1600 comprises a plurality of fields (e.g., fields 1605-1645). The plurality of fields may comprise different types of information or the same type of information as another field but presented in a different format such as a different encoding of the information into a QR code, barcode, etc.

In some embodiments, label 1600 comprises an date and location field 1605 in which information pertaining to a date and location associate with the intake of the item to the shipping system (e.g., a store location and date of receipt at the store, etc.). Label 1600 further comprises code 1610, which may be a barcode. As an example, code 1610 comprises information pertaining to an order or record under which the item is entered into the shipping system.

Label 1600 may further comprise field in which package weight (or other attributes) are identified. Label 1600 may further comprise addressee field 1620 in which an address to which the item is to be delivered is identified.

In some embodiments, label 1600 comprises code field 1625 in which a maxi code or QR code is printed. The maxi code or QR code comprises rich information, such as an indication of all required routing data (e.g., shipping facility destination, service class, etc.). However, the maxi code or QR code is relatively difficult to read. Proper reading of the maxi code or QR code generally requires a clear image of label 1600. Accordingly, although code field 1625 may comprise sufficient information from which the system may determine the required routing data, the system may not always be able to properly read/decode the information comprised in code field 1625. Therefore, the system relies on extraction of information from other fields of label 1600 to determine the routing data (e.g., if the system has been unable to extract the information from code field 1625).

In some embodiments, label 1600 comprises code field 1630 in which a barcode (e.g., a 420 code) is printed. A 520 code is generally the easiest for the system to read using barcode scanners, etc. The barcode in code field 1630 may encode the destination, but does not include the service class. Accordingly, the information extracted from code field 1630 yields incomplete routing data. If the system is unable to extract the routing data from code field 1625 and extracts the destination element of the routing data from code field 1630, the system may extract the remaining/missing routing data (e.g., the service class).

In some embodiments, label 1600 comprises text field 1635. Text field 1635 includes information printed in alphanumeric format. Text field 1636 may include an indication of a service class, a tracking number, etc. In some embodiments, in response to determining that the system is unable to extract the service class from a code on label 1600, the system may perform OCR with respect to label 1600 and use the text comprised in text field 1635 to determine the service class and/or the tracking number, etc. In some embodiments, the tracking number encodes the service class. For example, a predetermined set of digits corresponds to a code for a service class.

In some embodiments, label 1600 comprises code field 1640 in which a barcode such as an IZ code is printed. As an example, an IZ code encodes destination information but and service class information. The IZ code may comprise human readable code, and a subset of the digits in the IZ code identify the service class. Accordingly, the information extracted from code field 1640 yields complete routing data (or at least all required routing data). If the system is unable to extract the routing data from code field 1625 and extracts only part of the routing data from code field 1640, the system may extract the remaining/missing routing data (e.g., the service class) from another field.

In some embodiments, label 1600 comprises account field 1645 in which billing information is provided (e.g., a PO number, billing terms, etc.).

Referring to FIG. 16, the system may determine destination information by scanning a 420 code, such as the code printed in code field 1630. The destination information extracted from the 420 code may be combined with other elements of routing data, such as service class information obtained by OCR processing of an image to read text printed in text field 1635. The text included in text field 1635 may indicate a service class, such as "Ground" or "Next Day Air". Additionally or alternatively, text field 1635 may comprise text pertaining to a tracking number comprising a numerical or alphanumerical code or portion thereof that indicates a class of service.

According to various embodiments, the system intelligently parses label information captured in images of labels (e.g., images obtained by the vision system) to determine the required routing data to facilitate robotic sortation and routing of items. The system iterates over the different fields to obtain the various elements of routing data (e.g., until all required routing data is obtained). In response to determining the routing data, the system stores the routing data in association with the item.

Although various embodiments are described herein in the context of singulating a set of items, various embodiments may similarly be implemented in palletization/depalletization systems, kitting systems, and/or systems that load the set of items among one or more transport containers.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
one or more processors configured to:
receive via the communication interface a first optical sensor data comprising a first element of routing data required to route an item but not a second element of routing data required, in addition to the first element, to route the item;
obtain the second element of routing data from a second optical sensor data; and
cause the item to be routed based at least in part on the first element of routing data and the second element of routing data;

wherein:
causing the item to be routed based at least in part on the first element of routing data and the second element of routing data comprises placing the item in a singulation destination; and
the item is placed in the singulation destination before the second element of routing data is known.

2. The system of claim 1, wherein the first optical sensor data comprises output of a first optical scanner.

3. The system of claim 1, wherein the first optical sensor data is obtained based on scanning an optical code associated with the item.

4. The system of claim 3, wherein the optical code comprises the first element of routing data and second element of routing data.

5. The system of claim 4, wherein a first optical sensor obtains the first element of routing data but not the second element of routing data.

6. The system of claim 5, wherein the second element of routing data was not successfully scanned.

7. The system of claim 1, wherein:
the first optical sensor data is obtained based on scanning an optical code associated with the item; and
the optical code comprises first element of routing data and second element of routing data; and
the one or more processors are further configured to:
determine that the second element of routing data is not included in the first optical sensor data.

8. The system of claim 7, wherein the one or more processors are further configured to:
obtain the second optical data in response to determining that the second element of routing data is not included in the first optical sensor data.

9. The system of claim 8, wherein the second optical sensor data comprises an image.

10. The system of claim 9, wherein the image comprises a representation of a label on the item.

11. The system of claim 9, wherein the image includes alphanumeric data.

12. The system of claim 11, wherein the alphanumeric data is human readable.

13. The system of claim 9, wherein: the one or more processors are further configured to:
perform optical character recognition (OCR) with respect to the image; and
obtain the second routing data based at least in part on the OCR performed with respect to the image.

14. The system of claim 9, wherein the image is obtained using the same sensor that obtained the first optical sensor data.

15. The system of claim 9, wherein the first element of routing data is obtained from a first optical code in a first region of the image, and the second element of routing data is obtained from another region of the image.

16. The system of claim 1, wherein causing the item to be routed based at least in part on the first element of routing data and the second element of routing data comprises:
generating, based at least in part on the first element of routing data and the second element of routing data, a control signal for a singulation system to route the item.

17. The system of claim 1, further comprising:
a robotic arm;
wherein causing the item to be routed based at least in part on the first element of routing data and the second element of routing data comprises:
controlling the robotic arm to perform a pick and place operation with respect to the item to route the item.

18. The system of claim 17, wherein the controlling the robotic arm to perform a pick and place operation with respect to the item comprises picking the item from a pick up zone and placing the item in a tray within a workspace of the robotic arm.

19. The system of claim 1, wherein one or both of the first element of routing data and the second element of routing data are associated with a tray or segment of a conveyance structure as the item proceeds downstream via the conveyance structure.

20. The system of claim 19, wherein the one or both of the first element of routing data and the second element of routing data are associated with the tray or segment before the item is routed according to the first element of routing data and the second element of routing data.

21. The system of claim 19, wherein the second element of routing data is obtained from second optical sensor data captured by a downstream sensor that is downstream from a robotic arm that placed the item into the tray or segment.

22. The system of claim 1, wherein the second element of routing data is obtained based on an image captured at an induction station before the item is placed in the singulation destination.

23. The system of claim 1, wherein the first element of routing data corresponds to a part of destination information.

24. The system of claim 23, wherein the second element of routing data completes the destination information.

25. The system of claim 1, wherein the first element of routing data indicates a destination, and the second element of routing data indicates a service class.

26. The system of claim 25, wherein:
the first optical sensor data is obtained from a first optical sensor;
the second optical sensor data is obtained from a second optical sensor; and
the second optical sensor data is indicative of an item attribute.

27. The system of claim 26, wherein the service class is determined based at least in part on the item attribute.

28. A method, comprising:
receiving, by one or more processors, a first optical sensor data comprising a first element of routing data required to route an item but not a second element of routing data required, in addition to the first element, to route the item;
obtaining the second element of routing data from a second optical sensor data; and
causing the item to be routed based at least in part on the first element of routing data and the second element of routing data;
wherein:
causing the item to be routed based at least in part on the first element of routing data and the second element of routing data comprises placing the item in a singulation destination; and
the item is placed in the singulation destination before the second element of routing data is known.

29. A computer program product embodied in a non-transitory computer readable medium and comprising computer instructions for:
receiving, by one or more processors, a first optical sensor data comprising a first element of routing data required to route an item but not a second element of routing data required, in addition to the first element, to route the item;
obtaining the second element of routing data from a second optical sensor data; and
causing the item to be routed based at least in part on the first element of routing data and the second element of routing data;
wherein:
causing the item to be routed based at least in part on the first element of routing data and the second element of routing data comprises placing the item in a singulation destination; and
the item is placed in the singulation destination before the second element of routing data is known.

30. A system, comprising:
a communication interface; and
one or more processors configured to:
receive via the communication interface a first optical sensor data comprising a first element of routing data required to route an item but not a second element of routing data required, in addition to the first element, to route the item;
obtain the second element of routing data from a second optical sensor data; and
cause the item to be routed based at least in part on the first element of routing data and the second element of routing data;
wherein the first optical sensor data is obtained based on scanning an optical code associated with the item.

31. A system, comprising:
a communication interface; and
one or more processors configured to:
receive via the communication interface a first optical sensor data comprising a first element of routing data required to route an item but not a second element of routing data required, in addition to the first element, to route the item;
obtain the second element of routing data from a second optical sensor data;
determine that the second element of routing data is not included in the first optical sensor data; and
cause the item to be routed based at least in part on the first element of routing data and the second element of routing data;
wherein:
the first optical sensor data is obtained based on scanning an optical code associated with the item; and
the optical code comprises first element of routing data and second element of routing data.

32. A system, comprising:
a communication interface; and
one or more processors configured to:
receive via the communication interface a first optical sensor data comprising a first element of routing data required to route an item but not a second element of routing data required, in addition to the first element, to route the item;
obtain the second element of routing data from a second optical sensor data; and
cause the item to be routed based at least in part on the first element of routing data and the second element of routing data;
wherein the first element of routing data indicates a destination, and the second element of routing data indicates a service class.

* * * * *